United States Patent
Mukherjee et al.

(10) Patent No.: US 11,196,081 B2
(45) Date of Patent: Dec. 7, 2021

(54) AQUEOUS ALUMINUM ION BATTERIES, HYBRID BATTERY-CAPACITORS, COMPOSITIONS OF SAID BATTERIES AND BATTERY-CAPACITORS, AND ASSOCIATED METHODS OF MANUFACTURE AND USE

(71) Applicant: Everon24, Inc., Woburn, MA (US)

(72) Inventors: Rahul Mukherjee, Winchester, MA (US); Kripa Kiran Varanasi, Lexington, MA (US); Trevor John Simmons, Concord, MA (US); Mukesh Chatter, Concord, MA (US); Nikhil Ashok Koratkar, Clifton Park, NY (US)

(73) Assignee: Everon24, Inc., Woburn, MA (US)

( * ) Notice: Subject to any disclaimer, the term of this patent is extended or adjusted under 35 U.S.C. 154(b) by 0 days.

(21) Appl. No.: 17/184,484

(22) Filed: Feb. 24, 2021

(65) Prior Publication Data
US 2021/0184245 A1 Jun. 17, 2021

Related U.S. Application Data

(63) Continuation of application No. 16/812,261, filed on Mar. 6, 2020, now Pat. No. 10,978,734.
(Continued)

(51) Int. Cl.
*H01M 10/054* (2010.01)
*H01M 4/136* (2010.01)
(Continued)

(52) U.S. Cl.
CPC ......... *H01M 10/054* (2013.01); *H01M 4/136* (2013.01); *H01M 4/505* (2013.01);
(Continued)

(58) Field of Classification Search
None
See application file for complete search history.

(56) References Cited

U.S. PATENT DOCUMENTS

| | | |
|---|---|---|
| 2,838,591 A | 6/1958 | Stokes |
| 4,324,846 A | 4/1982 | Kaun et al. |

(Continued)

FOREIGN PATENT DOCUMENTS

| | | |
|---|---|---|
| JP | 2002/298862 A | 10/2002 |
| WO | WO-2014/132251 A1 | 9/2014 |

(Continued)

OTHER PUBLICATIONS

Arora, P., et al., Battery Separators, Chemical Reviews, 104(10):4419-4462, (2004).
(Continued)

*Primary Examiner* — Christopher P Domone
(74) *Attorney, Agent, or Firm* — Choate, Hall & Stewart LLP; William R. Haulbrook; Michael D. Schmitt

(57) ABSTRACT

Described herein is an aqueous aluminum ion battery featuring an aluminum or aluminum alloy/composite anode, an aqueous electrolyte, and a manganese oxide, aluminosilicate or polymer-based cathode. The battery operates via an electrochemical reaction that entails an actual transport of aluminum ions between the anode and cathode. The compositions and structures described herein allow the aqueous aluminum ion battery described herein to achieve: (1) improved charge storage capacity; (2) improved gravimetric and/or volumetric energy density; (3) increased rate capability and power density (ability to charge and discharge in shorter times); (4) increased cycle life; (5) increased mechanical strength of the electrode; (6) improved electrochemical stability of the electrodes; (7) increased electrical
(Continued)

conductivity of the electrodes, and (8) improved ion diffusion kinetics in the electrodes as well as the electrolyte.

29 Claims, 33 Drawing Sheets

Related U.S. Application Data

(60) Provisional application No. 62/815,770, filed on Mar. 8, 2019.

(51) Int. Cl.
| | | |
|---|---|---|
| *H01M 4/505* | (2010.01) | |
| *H01M 4/58* | (2010.01) | |
| *H01M 4/62* | (2006.01) | |
| *H01M 4/66* | (2006.01) | |
| *H01M 4/78* | (2006.01) | |

(52) U.S. Cl.
CPC ............. *H01M 4/58* (2013.01); *H01M 4/622* (2013.01); *H01M 4/661* (2013.01); *H01M 4/78* (2013.01)

(56) References Cited

U.S. PATENT DOCUMENTS

| | | | |
|---|---|---|---|
| 5,077,152 A | 12/1991 | Yoshino et al. | |
| 5,554,458 A | 9/1996 | Noda et al. | |
| 5,571,600 A | 11/1996 | Licht | |
| 6,103,421 A | 8/2000 | Torata et al. | |
| 6,428,766 B1 | 8/2002 | Fujino et al. | |
| 6,589,692 B2 | 7/2003 | Takami | |
| 7,179,310 B2 | 2/2007 | Jiang et al. | |
| 8,298,701 B2 | 10/2012 | Whitacre et al. | |
| 8,652,672 B2 | 2/2014 | Whitacre et al. | |
| 9,577,264 B2 | 2/2017 | Hatanaka et al. | |
| 9,819,220 B2 | 11/2017 | Mukherjee et al. | |
| 10,008,723 B1 | 6/2018 | Zhamu et al. | |
| 10,056,198 B2 | 8/2018 | Outlaw et al. | |
| 2001/0028979 A1 | 10/2001 | Takami | |
| 2002/0068222 A1 | 6/2002 | Ishii | |
| 2003/0219650 A1 | 11/2003 | Saruwatari et al. | |
| 2006/0068289 A1 | 3/2006 | Paulsen et al. | |
| 2006/0174938 A1 | 8/2006 | Di Palma et al. | |
| 2006/0257728 A1 | 11/2006 | Mortensen et al. | |
| 2009/0081546 A1 | 3/2009 | Ogasawara et al. | |
| 2009/0253025 A1 | 10/2009 | Whitacre | |
| 2010/0151303 A1 | 6/2010 | Marple et al. | |
| 2011/0076564 A1 | 3/2011 | Yu | |
| 2011/0171524 A1 | 7/2011 | Shimamura et al. | |
| 2012/0082904 A1 | 4/2012 | Brown et al. | |
| 2012/0082905 A1 | 4/2012 | Brown et al. | |
| 2012/0171574 A1 | 7/2012 | Zhamu et al. | |
| 2013/0036603 A1 | 2/2013 | Christian | |
| 2013/0280579 A1 | 10/2013 | Wright et al. | |
| 2014/0045055 A1 | 2/2014 | Nakano et al. | |
| 2014/0197684 A1 | 7/2014 | Masato et al. | |
| 2014/0234715 A1 | 8/2014 | Fasching et al. | |
| 2014/0242457 A1 | 8/2014 | Archer et al. | |
| 2015/0021516 A1 | 1/2015 | Kwon | |
| 2015/0062782 A1 | 3/2015 | Rzany et al. | |
| 2015/0249261 A1 | 9/2015 | Dai et al. | |
| 2015/0364789 A1 | 12/2015 | Ogawa et al. | |
| 2016/0104891 A1* | 4/2016 | Holme .................. | H01M 4/667 429/303 |
| 2016/0285095 A1 | 9/2016 | Kang | |
| 2017/0104363 A1 | 4/2017 | Mukherjee et al. | |
| 2017/0214095 A1 | 7/2017 | Mukherjee et al. | |
| 2017/0301960 A1 | 10/2017 | Menard et al. | |
| 2018/0138554 A1 | 5/2018 | Mukherjee et al. | |
| 2018/0226831 A9 | 8/2018 | Mukherjee et al. | |
| 2018/0233748 A1* | 8/2018 | Zhamu .................. | H01M 4/38 |
| 2019/0305290 A1* | 10/2019 | Singh .................. | H01M 4/625 |

FOREIGN PATENT DOCUMENTS

| | | |
|---|---|---|
| WO | WO-2014/137207 A1 | 9/2014 |
| WO | WO-2015/089272 A2 | 6/2015 |
| WO | WO-2017/062977 A1 | 4/2017 |
| WO | WO-2017/136545 A1 | 8/2017 |
| WO | WO-2018/071602 A1 | 4/2018 |
| WO | WO-2018/176063 A2 | 9/2018 |
| WO | WO-2020/185631 A1 | 9/2020 |

OTHER PUBLICATIONS

Cho, Young-Joo, et al., Aluminum anode for aluminum-air battery—Part I: Influence of aluminum purity, Journal of Power Sources 277:370-378, (2015).

Cui, H. et al., Factors Governing the Formation of Lithiophorite at Atmospheric Pressure, Clays and Clay Minerals, 57(3):353-360, (2009).

Egan, D. R., et al., Developments in electrode materials and electrolytes for aluminium-air batteries, Journal of Power Sources, 236:293-310, (2013).

Gheytani, S. et al., Chromate conversion coated aluminium as a lightweight and corrosion-resistant current collector for aqueous lithium-ion batteries, J. Mater. Chem. A, 4(2):395-399, (2016).

Hey, M. J. et al., The salting-out effect and phase separation in aqueous solutions of electrolytes and poly(ethylene glycol), Polymer, 46:2567-2572, (2005).

Jayaprakash, S. K. D. and Archer, L. A., The rechargeable aluminum-ion battery, Chem. Common., 47:12610-12612, (2011).

Jiang, Y. et al., Pseudocapacitive layered birnessite sodium manganese dioxide for high-rate non-aqueous sodium ion capacitors, Royal Society of Chemisty, Journal of Materials Chemistry A, DOI: 10.1039/c8ta02516a, 8 pages, (2018).

Jiao, F. and Bruce, P. G., Mesoporous Crystalline $\beta$-$MnO_2$—a Reversible Positive Electrode for Rechargeable Lithium Batteries**, Advanced Materials, 19:657-660, (2007).

Li, Z. et al., Reversible Aluminum-Ion Intercalation in Prussian Blue Analogs and Demonstration of a High-Power Aluminum-Ion Asymmetric Capacitor, Advanced Energy Materials, 1401410:1-6, (2014) with 5 pages of Supporting Information.

Lin, M.-C., et al., An ultrafast rechargeable aluminium-ion battery, Nature, 520(7547):324-328, (2015).

Lin, Meng-Chang et al., An ultrafast rechargeable aluminium-ion battery, Nature, doi:10.1038/nature14340, 520:324-328, (2015).

Mori, R., A new structured aluminium-air secondary battery with a ceramic aluminium ion conductor, RSC Advances, 3:11547-11551, (2013).

Mukherjee, R. et al., Defect-induced plating of lithium metal within porous graphene networks, Nature Communications, 5(3710):1-26, Apr. 22, 2014 [retrieved on Jan. 13, 2017].

Peng, T. et al., Control Growth of Mesoporous Nickel Tungstate Nanofiber and Its Application as Anode Material for Lithium-Ion Batteries, Electrochimica Acta 224:460-467, (2017).

Reed, Luke, Aluminum ion batteries: electrolytes and cathodes, Ph.D. Thesis, University of California, Merced, 127 pages, (2015).

Sander, J. S. et al., High-performance battery electrodes via magnetic templating, Nature Energy, Article 16099, 1:1-7, (2016).

Tan, Y., et al., Facile Synthesis of Manganese-Oxide-Containing Mesoporous Nitrogen-Doped Carbon for Efficient Oxygen Reduction, Advanced Functional Materials, 22:4584-4591, (2012).

Thackeray, M. M. et al., Electrochemical Extraction of Lithium From $LiMn_2O_4$, National Institute for Material Research, 19(2):179-187, (1984).

Van Der Kuijp, T. J., et al.,. Health hazards of China's lead-acid battery industry: a review of its market drivers, production processes, and health impacts, Environmental Health, 12(61):1-10, (2013).

Whittingham, M.S.,. Lithium batteries and cathode materials, Chemical Reviews, 104(10):4271-4302, (2004).

Wu, C. et al., Electrochemically activated spinel manganese oxide for rechargeable aqueous aluminum battery, Nature Communications, 10(1): 1-10, (2019).

(56) References Cited

OTHER PUBLICATIONS

Yang, Z., et al. Electrochemical Energy Storage for Green Grid, Chemical Reviews, 111(5):3577-3613, (2011).
International Partial Search Report with Provisional Opinon, PCT/US2020/021594, ISA/EPO, 9 pages, dated Jul. 10, 2020.
Professional Machine translation of Kim—KR2015-00309979 cited in IDS (Year:2015).
Written Opinion for PCT/US2020/021594, filed Mar. 6, 2020, ISA/EPO, 13 pages, (dated Sep. 1, 2020).
International Search Report for PCT/US2020/021594, filed Mar. 6, 2020, ISA/EPO, 8 pages, (dated Sep. 1, 2020).

\* cited by examiner

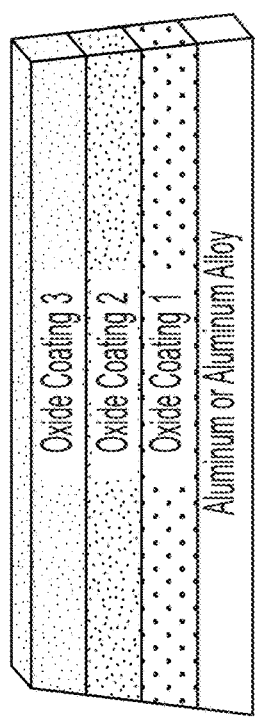
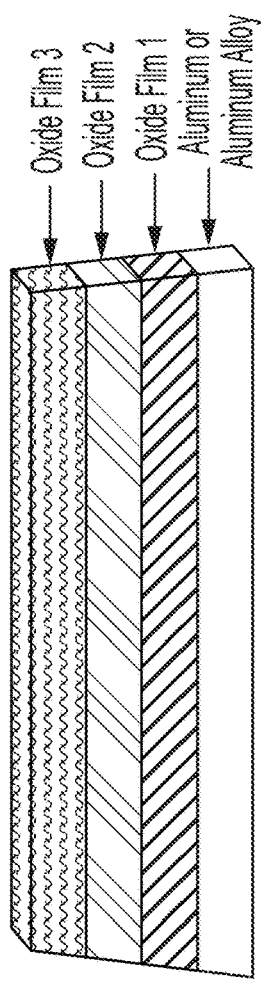
FIG. 4A
FIG. 4B

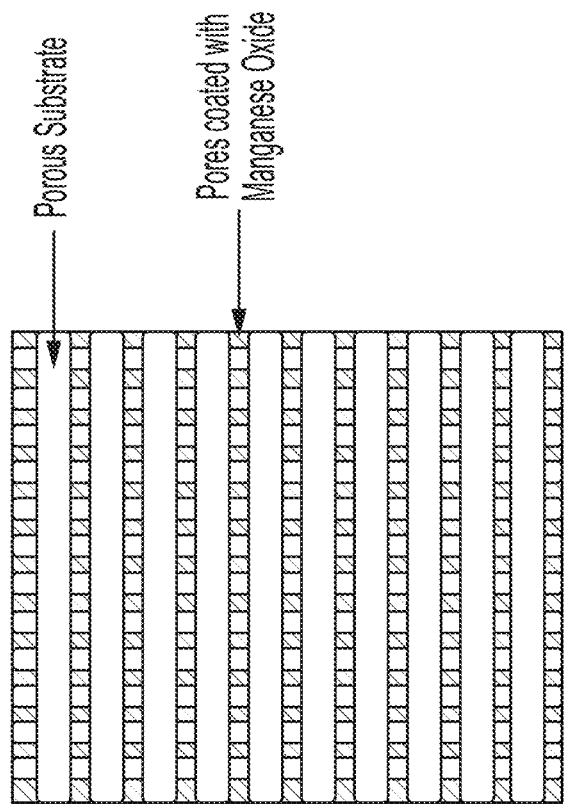
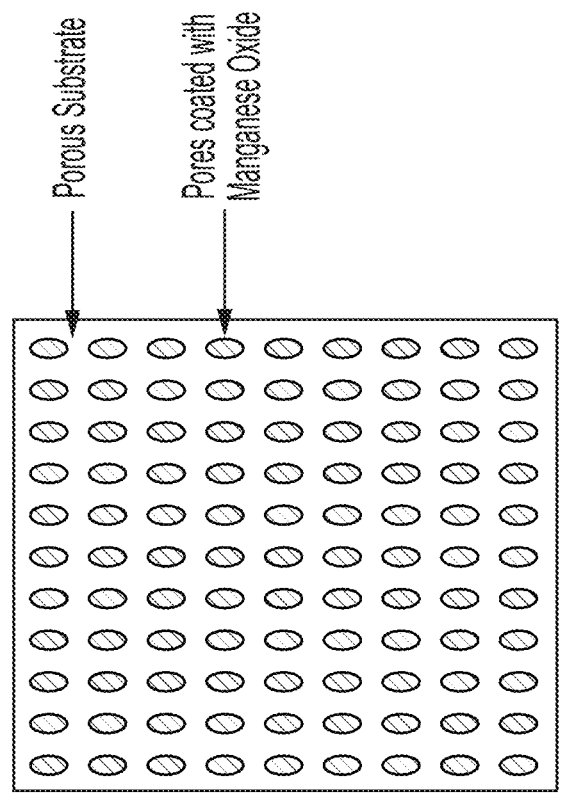
FIG. 10B
FIG. 10A

External & Internal Surface of Carbon Nanotube
Coated with Films (or Particles) of $MnO_2$ External Surface of Carbon Nanotube
Coated with Films (or Particles) of $MnO_2$ Pristine Carbon Nanotube

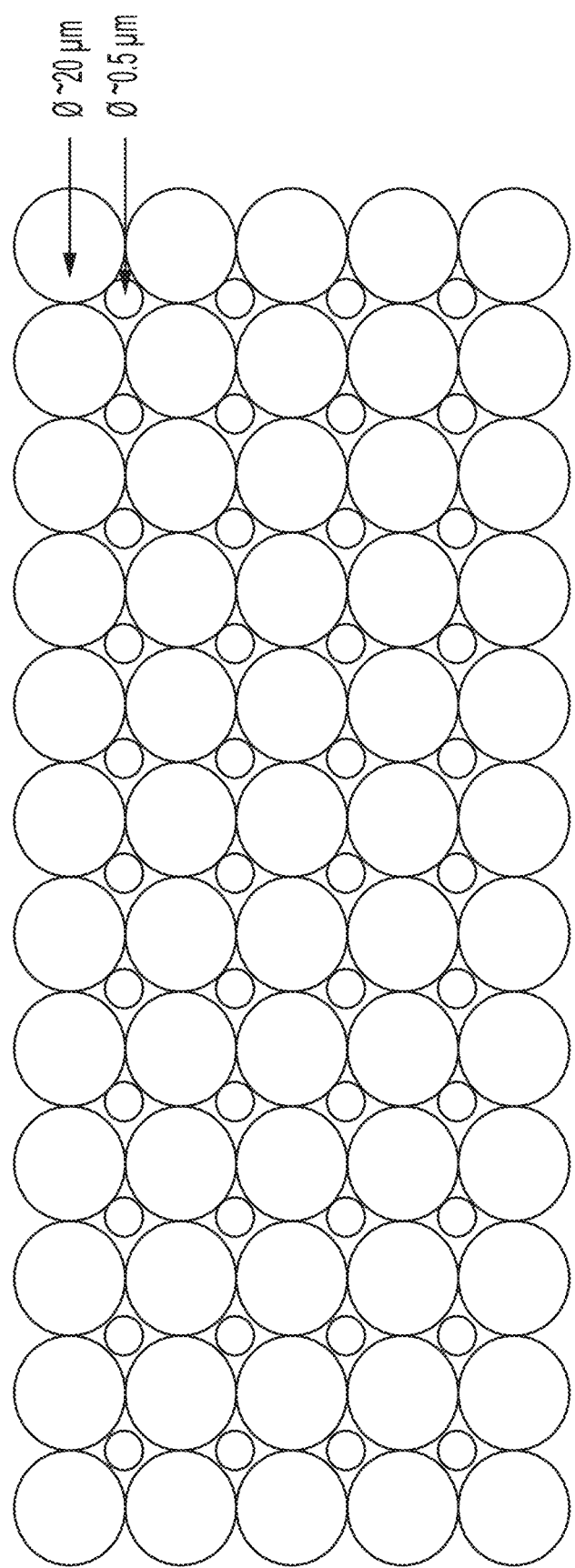

AQUEOUS ALUMINUM ION BATTERIES, HYBRID BATTERY-CAPACITORS, COMPOSITIONS OF SAID BATTERIES AND BATTERY-CAPACITORS, AND ASSOCIATED METHODS OF MANUFACTURE AND USE

PRIORITY APPLICATION

The present application is a continuation of U.S. patent application Ser. No. 16/812,261, filed on Mar. 6, 2020, which claims the benefit of U.S. Provisional Patent Application No. 62/815,770, filed on Mar. 8, 2019, the content of which is hereby incorporated by reference herein in its entirety.

TECHNICAL FIELD

This disclosure relates generally to aqueous aluminum ion batteries, hybrid battery-capacitors, cathode compositions, anode compositions, binder compositions, and methods of their manufacture and use.

SUMMARY

The present disclosure includes aqueous aluminum ion batteries, hybrid battery-capacitors, cathode compositions, anode compositions, binder compositions, and methods of their manufacture and use.

For example, described herein is an aqueous aluminum ion battery featuring an aluminum or aluminum alloy/composite anode, an aqueous electrolyte, and a manganese oxide-based [e.g., MnO or $MnO_2$ or $Mn_xO_y$ (e.g., Mn(II), Mn(II-x), Mn(III), Mn(III-x), Mn(IV), Mn(IV-x), Mn(V), Mn(V-x), Mn(VI), Mn(VI-x), Mn(VII) and Mn(VII-x), where x is between 0 and 1)], an aluminosilicate-based (e.g., $Al_2SiO_5$), or a polymer-based cathode. The battery operates via an electrochemical reaction that entails an actual transport of aluminum ions between the anode and cathode. In certain embodiments, the compositions and structures described herein allow aqueous aluminum ion batteries described herein to achieve: (1) improved charge storage capacity; (2) improved gravimetric and/or volumetric energy density; (3) increased rate capability and power density (ability to charge and discharge in shorter times); (4) increased cycle life; (5) increased mechanical strength of the electrode; (6) improved electrochemical stability of the electrodes; (7) increased electrical conductivity of the electrodes, and (8) improved ion diffusion kinetics in the electrodes as well as the electrolyte.

In one aspect, the invention is directed to an aluminum ion battery comprising: an anode comprising one or more members selected from the group consisting of aluminum, an aluminum alloy, and an aluminum composite; an aqueous electrolyte; and a cathode comprising one or more members selected from the group consisting of a manganese oxide [e.g., MnO or $MnO_2$ or $Mn_xO_y$ (e.g., Mn(II), Mn(II-x), Mn(III), Mn(III-x), Mn(IV), Mn(IV-x), Mn(V), Mn(V-x), Mn(VI), Mn(VI-x), Mn(VII) and Mn(VII-x), where x is between 0 and 1)], an aluminosilicate (e.g., $Al_2SiO_5$), and a polymer. In certain embodiments the cathode comprises one or more manganese oxides selected from the group consisting of MnO [manganese(II) oxide], $Mn_3O_4$ [manganese(II, III) oxide], $Mn_2O_3$ [manganese(III) oxide], $MnO_2$ [manganese dioxide, aka manganese(IV) oxide], $MnO_3$ [manganese (VI) oxide], and $Mn_2O_7$ [manganese(VII) oxide].

In certain embodiments, the anode, the aqueous electrolyte, and the cathode are arranged to facilitate transport of aluminum ions (e.g., $Al^{3+}$) between the anode and the cathode.

In certain embodiments, the battery has a charge storage capacity in a range from 25 mAh/g to 500 mAh/g (with units of milliAmp-hr per gram of active material in the battery).

In certain embodiments, the battery delivers charge at a rate in a range from 1 C to 0.01 C (where a rate of nC is defined as charge or discharge in 1/n hours).

In certain embodiments, the battery delivers stable cycling performance over at least 100 (e.g., at least 150) charge-discharge steps. (e.g., wherein stable cycling performance means having a repeatable voltage profile with no or insubstantial noise attributable to pulverization, delamination, corrosion, or other side-reactions) (e.g., wherein one cycle equals 1 charge plus 1 discharge) (e.g., wherein the aluminum ion battery has a minimum cycle life of 50 cycles, 100 cycles, 150 cycles, or 200 cycles).

In certain embodiments, aluminum ions ($Al^{3+}$) are released into the aqueous electrolyte from an electrode (e.g., the cathode or the anode) upon application of an external load. In some embodiments, the released $Al^{3+}$ ions travel through the aqueous electrolyte, a membrane separator, and to a counter electrode (e.g., the anode or the cathode, respectively) (e.g., wherein the electrode is from 0.001 to 100 wt. % aluminum). For example, the anode can comprise up to 100 wt. % aluminum in a fully charged battery (with the cathode comprising negligible aluminum at this point). In a discharged state, the concentration of aluminum in anode and cathode depends on the depth of discharge.

In certain embodiments, in or at a surface of the counter electrode, the $Al^{3+}$ ions intercalate and/or otherwise react with one or more members selected from the group consisting of (i) an oxygen-containing moiety, for example, (a) an oxide, (b) a hydroxide, (c) a nitrate, (d) a sulfate, (e) an acetate, (f) a phosphate (g) a chlorate, (h) a bromate, or (i) an iodate; (ii) a halogen-containing moiety, for example, (a) a chloride, (b) a fluoride, (c) a bromide, (d) an iodide; and (iii) a metallic moiety, for example, (a) manganese, (b) sodium, (c) lithium, (d) aluminum, (e) potassium, (f) calcium, or (g) magnesium, thereby forming a stable aluminum phase within or at the surface of a structure of the counter electrode. In certain embodiments, one or more transition metals at the counter electrode undergoes a change in oxidation state, thereby stabilizing the structure of the counter electrode.

In certain embodiments, the released $Al^{3+}$ ions travel through the aqueous electrolyte, the membrane separator, and to the counter electrode and are stored on a surface of the counter electrode (e.g. as dielectric charge).

In certain embodiments, aluminum ions ($Al^{3+}$) are released into the aqueous electrolyte from an electrode (e.g., the cathode or the anode) upon application of an external load, wherein the released $Al^{3+}$ ions react with ions present in the aqueous electrolyte to form a transportation phase (e.g., a stable transportation phase) for transport of ions (e.g., charge carriers) through the aqueous electrolyte (e.g., and through a membrane separator) to a counter electrode (e.g., the anode or the cathode, respectively) (e.g., wherein the electrode is from 0.001 to 100 wt. % aluminum). For example, the anode can comprise up to 100 wt. % aluminum in a fully charged battery (with the cathode comprising negligible aluminum at this point). In a discharged state, the concentration of aluminum in anode and cathode depends on the depth of discharge. In certain embodiments, in a fully charged state, preferable range of aluminum in the anode lies between 70-100 wt. % while the preferable range of aluminum in the cathode lies between 0-20 wt. %. In certain embodiments, the released $Al^{3+}$ ions react with $OH^{-1}$ ions present in the aqueous electrolyte to form $Al(OH)_4^{-1}$ charge carriers (e.g., wherein the $Al(OH)_4^{-1}$ charge carriers prevent or decrease the ability of $Al^{3+}$ ions from further reacting in the aqueous electrolyte). In certain embodiments, at least a portion of the charge carriers undergo one or both of (i) and (ii) following transport to the counter electrode, as follows: (i) dissociation to form individual anions and cations; and (ii) remaining in a stable charge carrier phase. In certain embodiments, at least a portion of the charge carriers dissociate to form individual anions and cations following transport to the counter electrode, and wherein the individual anions and/or cations undergo one or more processes selected from the group consisting of: (i) intercalating and/or reacting with one or more members selected from the group consisting of (I) an oxygen-containing moiety, for example, (a) an oxide, (b) a hydroxide, (c) a nitrate, (d) a sulfate, (e) an acetate, (f) a phosphate (g) a chlorate, (h) a bromate, or (i) an iodate; (II) a halogen-containing moiety, for example, (a) a chloride, (b) a fluoride, (c) a bromide, (d) an iodide; and (III) a metallic moiety, for example, (a) manganese, (b) sodium, (c) lithium, (d) aluminum, (e) potassium, (f) calcium, or (g) magnesium, at the counter electrode (e.g., thereby forming a stable phase within or at the surface of a structure of the counter electrode), and (ii) being stored on the surface of the counter electrode as dielectric charge.

In certain embodiments, at least a portion of the charge carriers remain in a stable charge carrier phase following transport to the counter electrode, and wherein the charge carriers undergo one or both of the following at the counter electrode: (i) intercalation within a structure of the counter electrode, and (ii) transition to a non-ionic stable phase comprising aluminum and one or more members selected from the group consisting of oxide, hydroxide, chloride, nitrate, sulfate, phosphate, lithium, sodium, potassium and magnesium, and intercalation and/or reaction of the non-ionic stable phase within the counter electrode structure.

In certain embodiments, any one, two, or all three of mechanisms (A), (B), and (C) take place: (A) aluminum ions ($Al^{3+}$) are released into the aqueous electrolyte from an electrode (e.g., the cathode or the anode) upon application of an external load, wherein the released $Al^{3+}$ ions travel through the aqueous electrolyte, a membrane separator, and to a counter electrode (e.g., the anode or the cathode, respectively) (e.g., wherein the electrode is from 0.001 to 100 wt. % aluminum), wherein, in or at a surface of the counter electrode, the $Al^{3+}$ ions intercalate and/or otherwise react with one or more members selected from the group consisting of (i) an oxygen-containing moiety, for example, (a) an oxide, (b) a hydroxide, (c) a nitrate, (d) a sulfate, (e) an acetate, (f) a phosphate (g) a chlorate, (h) a bromate, or (i) an iodate; (ii) a halogen-containing moiety, for example, (a) a chloride, (b) a fluoride, (c) a bromide, (d) an iodide; and (iii) a metallic moiety, for example, (a) manganese, (b) sodium, (c) lithium, (d) aluminum, (e) potassium, (f) calcium, or (g) magnesium, thereby forming a stable aluminum phase within or at the surface of a structure of the counter electrode; (B) wherein aluminum ions ($Al^{3+}$) are released into the aqueous electrolyte from an electrode (e.g., the cathode or the anode) upon application of an external load, wherein the released $Al^{3+}$ ions travel through the aqueous electrolyte, a membrane separator, and to a counter electrode (e.g., the anode or the cathode, respectively) (e.g., wherein the electrode is from 0.001 to 100 wt. % aluminum) and are stored on a surface of the counter electrode (e.g., as dielectric charge); and (C) aluminum ions ($Al^{3+}$) are released into the aqueous electrolyte from an electrode (e.g., the cathode or the anode) upon application of an external load, wherein the released $Al^{3+}$ ions react with ions present in the aqueous electrolyte to form a transportation phase (e.g., a stable transportation phase) for transport of ions (e.g., charge carriers) through the aqueous electrolyte (e.g., and through a membrane separator) to a counter electrode (e.g., the anode or the cathode, respectively) (e.g., wherein the electrode is from 0.001 to 100 wt. % aluminum). For example, the anode can comprise up to 100 wt. % aluminum in a fully charged battery (with the cathode comprising negligible aluminum at this point). In a discharged state, the concentration of aluminum in anode and cathode depends on the depth of discharge. In certain embodiments, in a fully charged state, preferable range of aluminum in the anode lies between 70-100 wt. % while the preferable range of aluminum in the cathode lies between 0-20 wt. %.

In certain embodiments, the anode comprises an aluminum alloy that comprises one or more non-aluminum members selected from the group consisting of sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, cobalt, tellurium, antimony, arsenic, tungsten, and selenium.

In certain embodiments, the aqueous electrolyte comprises one or more non-aluminum members selected from the group consisting of sodium, lithium, calcium, potassium, nickel, cobalt, iron, manganese, vanadium, titanium, tin, zinc, copper and magnesium.

In certain embodiments, the cathode comprises sheets of one or more members selected from the group consisting of a manganese oxide (e.g., MnO or $MnO_2$ or $Mn_xO_y$), an aluminosilicate (e.g., $Al_2SiO_5$), and a polymer. In certain embodiments the manganese oxide is a member selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide]. In certain embodiments, the cathode comprises non-aluminum guest ions and/or molecules stored between the sheets (e.g., wherein the sheets comprise a manganese oxide (e.g., MnO or $MnO_2$ or $Mn_xO_y$) and/or an aluminosilicate (e.g., $Al_2SiO_5$) and/or a polymer), said guest ions and/or molecules comprising one or more members selected from the group consisting of sodium, lithium, calcium, potassium, rubidium, cesium, beryllium, strontium, barium, magnesium, nickel, zinc, bismuth, cobalt, copper, and protons. In certain embodiments the manganese oxide is a member selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, at least one of the cathode, the anode, and the aqueous electrolyte comprises non-aluminum ions that participate in an electrochemical reaction upon application of an external load (e.g., charging or discharging), and/or through an ion-exchange process between the cathode and the electrolyte and/or between the anode and the electrolyte, and/or between the cathode and the anode.

In certain embodiments, at least one of the cathode, the anode, and the aqueous electrolyte (e.g., at least one, at least two, or all three of the cathode, the anode, and the aqueous electrolyte) does not contain cobalt.

In certain embodiments, at least one of the cathode, the anode, and the aqueous electrolyte (e.g., at least one, at least two, or all three of the cathode, the anode, and the aqueous electrolyte) is non-toxic.

In certain embodiments, at least one of the cathode, the anode, and the aqueous electrolyte (e.g., at least one, at least two, or all three of the cathode, the anode, and the aqueous electrolyte) is non-flammable.

In certain embodiments, at least one of the cathode, the anode, and the aqueous electrolyte (e.g., at least one, at least two, or all three of the cathode, the anode, and the aqueous electrolyte) does not contain any heavy metal (e.g., does not contain any of antimony, cerium, dysprosium, erbium, europium, gadolinium, gallium, germanium, holmium, indium, lanthanum, lutetium, neodymium, niobium, praseodymium, samarium, tantalum, terbium, thulium, tungsten, uranium, ytterbium, iridium, osmium, palladium, platinum, rhodium, ruthenium, chromium, cobalt, copper, iron, lead, molybdenum, nickel, tin, and zinc).

In another aspect, the invention is directed to a cathode for an ion battery (e.g., an aluminum ion battery or an aqueous aluminum ion battery, e.g., the battery of any one of claims 1 to 24), the cathode comprising: a current collector (e.g., a conductive substrate); and one or more structures (e.g., one or more thin films or particles) each comprising one or more members selected from the group consisting of a manganese oxide (e.g., MnO or $MnO_2$ or $Mn_xO_y$), aluminosilicate (e.g., $Al_2SiO_5$) (e.g., layered aluminosilicate), and an aluminum-accepting polymer, wherein the one or more structures are disposed on (e.g., directly on) the current collector and are in electrical contact with the current collector (e.g., wherein a thickness of the cathode is from 10 nm to 1 mm, e.g., from 10 μm to 100 μm, e.g., from 1 μm to 10 μm, e.g., from 1 μm to 5 μm, e.g., with a tolerance of ±20% or better).

In certain embodiments, the one or more structures each comprise a manganese oxide (e.g., MnO or $MnO_2$ or $Mn_xO_y$). In certain embodiments the manganese oxide is a member selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, the one or more structures comprises a plurality of sheets comprising (e.g. consisting of, consisting essentially of, or comprising at least 20 wt. % (e.g., from 20 wt. % to 40 wt. %, e.g., from 40 wt. % to 60 wt. %, e.g., from 60 wt. % to 80 wt. %, e.g., at least 80 wt. %) manganese oxide (e.g., MnO or $MnO_2$ or $Mn_xO_y$) with an intersheet (e.g., interlayer) separation distance (e.g., a d-spacing of adjacent [001] manganese oxide sheets) no less than 1 Angstrom (e.g., no less than 5 Angstroms) (e.g., no less than 10 Angstroms) (e.g., and no more than 100 Angstroms). In certain embodiments, there are contributions from guest ions and molecules (for example, in some instances there is as much as 15 wt. % of water molecules trapped within manganese oxide crystals). Furthermore, in certain embodiments, in preparing a cathode slurry, a polymer binder (2-20 weight %) and conductive carbon additive (2-20 weight %) is added.

In certain embodiments, the one or more structures comprises a spinel, tunnel, sandwich, encapsulated, or entrapped structure.

In certain embodiments, the one or more structures comprises a turbostratic structure.

In certain embodiments, the one or more structures comprises one or a combination of a lithiophorite structure (e.g., comprising alternating sheets of a manganese oxide and an aluminum hydroxide) (e.g., wherein the one or more structures comprises sheets of a manganese oxide with a dimension in a range from 10 nm to 500 micrometers), a phyllomanganate structure (e.g. comprising hydrated metal oxides), and a tectomanganate structure, wherein one or more of these structures may be pristine or disordered and may comprise of vacancies.

In certain embodiments, the one or more structures comprises (e.g., are) particles, wherein at least 80% of the particles of the cathode have dimension (e.g., diameter) within (at least) one of the following ranges (e.g., with a ±20% tolerance or better): (i) no less than 50 nm (e.g. at least 80% of the particles have dimension no less than 40-60 nm); (ii) from 100 nm to 250 nm (e.g., at least 80% of the particles have dimension between 80-120 nm and 200-300 nm); (iii) from 500 nm to 5 micrometers (e.g., at least 80% of the particles have dimension between 400-600 nm and 4-6 micrometers); (iv) from 1 micrometer to 10 micrometers; (v) from 5 micrometers to 30 micrometers.

In certain embodiments, the one or more structures comprises a multimodal (e.g., bimodal) distribution of particles (e.g., manganese oxide particles) in terms of one or more of shape and size. In certain embodiments, at least 80% of the particles of the cathode have dimension (e.g., diameter) within at least two of the following ranges (e.g., with a ±20% tolerance or better for each modality): (i) no less than 50 nm; (ii) from 100 nm to 250 nm; (iii) from 500 nm to 5 micrometers; (iv) from 1 micrometer to 10 micrometers; and (v) from 5 micrometers to 30 micrometers [for example, a cathode with a bimodal distribution of particles (e.g., manganese oxide particles), with a first portion of particles having particle size about 20 micrometers (±20%) and a second portion of particles having particle size about 0.5 micrometers (±20%), said first and second portions making up at least 80% of the particles of the cathode]. In addition to a bimodal or multimodal distribution of particle size, anode and/or cathode may also comprise of a bimodal or multimodal distribution of particle shape. For example, anode and/or cathode may consist of ~20 wt. % distribution of spherical particles and ~80 wt. % distribution of sheets.

In certain embodiments, the one or more structures comprises (e.g., are) sheets, wherein at least 80% of the sheets of the cathode have dimension (e.g., thickness) within (at least) one of the following ranges (e.g., with a ±20% tolerance or better): (i) no less than 50 nm (e.g. at least 80% of the sheets have dimension no less than 40-60 nm); (ii) from 100 nm to 250 nm (e.g., at least 80% of the sheets have dimension between 80-120 nm and 200-300 nm); (iii) from 500 nm to 5 micrometers (e.g., at least 80% of the sheets have dimension between 400-600 nm and 4-6 micrometers); (iv) from 1 micrometer to 10 micrometers; (v) from 5 micrometers to 30 micrometers.

In certain embodiments, the cathode comprises one or more non-aluminum guest ions stored between sheets of a manganese oxide.

In certain embodiments, the cathode comprises one or more non-aluminum guest ions disposed in sites (e.g., interstitial sites) and/or vacancies of a manganese oxide crystal lattice.

In certain embodiments, the guest ions comprise one or more members selected from the group consisting of protons, sodium, lithium, potassium, calcium, zinc, bismuth, copper, lead, cobalt, nickel, magnesium, hydrogen, hydronium, hydroxide, oxide-hydroxide, sulfate, sulfide, nitride, nitrate, phosphide, phosphate, acetate, polyoxometallates (POMs), and pillaring agents (e.g., aliphatic and/or aromatic compounds). In some embodiments, a cathode comprises one or more aluminum guest ions stored between sheets of a manganese oxide.

In certain embodiments, the cathode comprises one or more non-aluminum guest molecules stored between sheets of a manganese oxide.

In certain embodiments, the cathode comprises one or more non-aluminum guest ions disposed in sites (e.g., interstitial sites) and/or vacancies of a manganese oxide crystal lattice.

In certain embodiments, the guest molecules comprise one or more members selected from the group consisting of an oxide, a hydroxide, an oxide-hydroxide, a sulfide, a sulfate, a nitride, a nitrate, chloride, chlorate, phosphate, and a phosphide.

In certain embodiments, the guest molecules comprise one or more phosphates. In certain embodiments, the one or more phosphates are members selected from the group consisting of a phosphate of sodium, a phosphate of lithium, a phosphate of potassium, a phosphate of calcium, a phosphate of magnesium, and a phosphate of manganese.

In certain embodiments, the cathode comprises a phosphate of aluminum stored between sheets of a manganese oxide or disposed in sites (e.g., interstitial sites) and/or vacancies of a manganese oxide crystal lattice.

In certain embodiments, the cathode comprises one or more pillaring agents stored between sheets of a manganese oxide. In certain embodiments, the one or more pillaring agents comprise one or more members selected from the group consisting of a polyoxometallate (POM), an amphiphilic molecule, a polar organic molecule, and a non-polar organic molecule.

In certain embodiments, the one or more structures each comprises an aluminum-accepting polymer. In certain embodiments, the aluminum-accepting polymer comprises a member selected from the group consisting of alizarin, alginate, amidinate, quinone, quinolone, hydroxyquinone, and hydroxyquinoline. In certain embodiments, the aluminum-accepting polymer exists as a complex with one or more members selected from the group consisting of lithium, sodium, potassium, calcium, magnesium, manganese, iron, cobalt, titanium, tin, vanadium, and tungsten [e.g., wherein the complex participates in an electrochemical reaction through an ion exchange process with aluminum ions from an electrolyte and/or an aluminum source electrode (e.g., anode) in a battery during charge/discharge].

In certain embodiments, the one or more structures comprise particles (e.g., comprising a manganese oxide (e.g., MnO or $MnO_2$ or $Mn_xO_y$)) (e.g., wherein the particles are nanoparticles, microparticles, or a combination of nanoparticles and microparticles) (e.g., wherein the particles are spherical having a diameter in a range from 10 nm to 500 micrometers). In certain embodiments, the cathode comprises a plurality of conductive pillars protruding from the current collector, wherein the particles are disposed on the plurality of conductive pillars.

In certain embodiments, the one or more structures comprise a thin film (e.g., a patterned thin film). In certain embodiments, the cathode comprises a plurality of conductive pillars protruding from the current collector, wherein the thin film is disposed on the plurality of conductive pillars (e.g., and the thin film is patterned corresponding to distribution of the pillars on the current collector).

In certain embodiments, the current collector is porous (e.g., is a mesh, a foam, a plurality of interconnected fibers, a plurality of tubes and sheets, a plurality of nanotubes, or a graphene-like structure). In certain embodiments, the one or more structures are disposed (e.g., coated) in or on pores of the current collector.

In certain embodiments, the one or more structures are coated on one or more porous carbon structures. In certain embodiments, the one or more porous carbon structures comprise one or more members selected from the group consisting of a carbon fiber, a nanofiber, carbon nanotube (CNT), fullerene, graphene, partially reduced graphene oxide, aerogel, xerogel, and an interpenetrating multiphasic material.

In certain embodiments, the cathode further comprises a binder (e.g., a polymer binder) that physically maintains (e.g., adheres) the one or more structures in contact with the current collector. In certain embodiments, the binder is selected from the group consisting of carboxymethyl cellulose, styrene butadiene rubber, polyvinyl alcohol, alginate, polypropylene, and polytetrafluoroethylene (PTFE).

In some embodiments, the binder is selected from the group consisting of alginate, PVDF, PTFE, polyaniline, epoxies, carboxymethyl cellulose, rubber, styrene butadiene rubber, polyacrylic acid, polyvinyl alcohol and polyvinyl propylene.

In some embodiments, the binder has been pre-treated with one or more species of multivalent ion.

In some embodiments, the one or more species of multivalent ion comprises ions of one or more of manganese, magnesium, calcium, zinc, barium, and aluminum.

In some embodiments, the binder has been pre-treated with one or more species of monovalent ion.

In some embodiments, the one or more species of monovalent ion comprises ions of one or more of lithium, sodium, and potassium.

In some embodiments, the binder comprises ions of one or more members selected from the group consisting of sodium, potassium, magnesium, manganese, aluminum, calcium, barium, strontium and zinc.

In some embodiments, the binder has been deposited from a solution comprising one or more of water, n-methyl pyrrolidone, a ketone, a glycol, dimethyl sulfoxide (DMSO), and an ester, and, optionally, a co-solvent selected from the group consisting of water, n-methyl pyrrolidone, a ketone, a glycol, DMSO, and an ester.

In certain embodiments, the cathode is binder-free (e.g., wherein the one or more structures have been formed on the current collector using one or more of chemical vapor deposition, physical vapor deposition, atomic layer deposition, spin-coating, and electrochemical deposition).

In certain embodiments, the cathode further comprises a conductive additive (e.g., a carbon-containing additive) in electrical contact with the current collector and the one or more structures.

In certain embodiments, the current collector comprises one or more members selected from the group consisting of stainless steel, copper, carbon, silver, gold, platinum, tin, vanadium, zinc, tin oxide, indium, indium tin oxide (ITO), aluminum, nickel, tungsten, chromium, and titanium.

In certain embodiments, the current collector comprises a coating of an adhesion promoter, a conductivity promoter, or both an adhesion promoter and a conductivity promoter.

In some embodiments, the cathode comprises one or more phases of a manganese oxide, wherein the one or more phases are selected from the group consisting of an alpha phase, a beta phase, a lambda phase, a Ramsdellite phase, an amorphous phase, a gamma phase, a delta phase and a epsilon phase.

In some embodiments, the one or more phases is two or more phases (e.g., three or more phases).

In some embodiments, a primary one of the two or more phases is at least 40 wt % of the cathode and all remaining ones of the two or more phases total no more than 50 wt % of the cathode.

In some embodiments, the manganese oxide is disposed to undergo at least one phase change during charge and discharge of the cathode (e.g., ion insertion and removal).

In some embodiments, the cathode comprises a manganese oxide having a layered structure (e.g., phyllomanganate), a tunnel structure (e.g., tectomanganate), a spinel, a ramsdellite, or an amorphous structure.

In some embodiments, the cathode comprises a manganese oxide, wherein manganese in the manganese oxide has one or more oxidation states selected from the group consisting of Mn(II), Mn(II-x), Mn(III), Mn(III-x), Mn(IV), Mn(IV-x), Mn(V), Mn(V-x), Mn(VI), Mn(VI-x), Mn(VII) and Mn(VII-x), where x is between 0 and 1.

In some embodiments, the one or more structures comprises a manganese oxide and the manganese oxide is largely (e.g., at least 70 wt %, at least 80 wt %, or at least 90 wt %) delta phase manganese oxide.

In some embodiments, the current collector comprises a coating of one or more of carbon, metal (e.g. tin, zinc, aluminum, chromium, copper, nickel, iron, zirconium, silver, gold, platinum), metal oxide (e.g. indium tin oxide, tin oxide, titanium oxide, vanadium oxide, zirconium oxide) or polymer (e.g. PEDOT, PAN, parylene) and the coating serves as one or more of an adhesion promoted, an electron conductivity promoter and an ionic conductivity inhibitor.

In another aspect, the invention is directed to a cathode for an ion battery (e.g., an aluminum ion battery or an aqueous aluminum ion battery), the cathode made by a process comprising: depositing an amount of a solution on a current collector, wherein the solution comprises: one or more members selected from the group consisting of a manganese oxide (e.g., MnO or $MnO_2$ or $Mn_xO_y$), a layered aluminosilicate (e.g., $Al_2SiO_5$), and an aluminum-accepting polymer, and one or more solvents (e.g., selected from the group consisting of water, N-methyl pyrrolidone, and ethanol). In certain embodiments the one or more members comprises a manganese oxide selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, the one or more members comprises a manganese oxide (e.g., MnO or $MnO_2$ or $Mn_xO_y$) that has been made by a process comprising: reacting one or more manganese oxide precursors with a base in the presence of a source of oxygen (e.g., and, optionally, an oxidant chemical catalyst); and optionally, hydrothermally treating the manganese oxide after the reacting step, wherein the one or more precursors are each selected from the group consisting of a manganese salt, a lithium salt, a sodium salt, a magnesium salt, nickel, zinc, aluminum, mineral acids, and a permanganate, wherein the manganese salt comprises one or more of a sulfate, (i) a nitrate, (ii) a chloride, (iii) an acetate, (iv) a phosphate, (v) a perchlorate, (vi) a fluoride, and (vii) a bromide, wherein the permanganate comprises one or more of (i) sodium and (ii) potassium.

In certain embodiments, the base comprises lithium hydroxide, sodium hydroxide, potassium hydroxide, calcium hydroxide.

In certain embodiments, the source of oxygen is a dissolved oxygen gas or a peroxide (e.g., hydrogen peroxide).

In certain embodiments, the solution further comprises one or more of: a binder (e.g., a polymer binder, e.g., a polymer binder penetrable by an electrolyte solution comprising one or more aluminum salts) and a conductive additive (e.g., a carbon-containing additive).

In certain embodiments, the depositing step comprises doctor blading, spin coating, comma coating, or slot-die coating.

In certain embodiments, the process further comprises calendering the deposited solution and the current collector.

In some embodiments, the solution comprises one or more members selected from the group consisting of water, n-methyl pyrrolidone, a ketone, a glycol, dimethyl sulfoxide (DMSO), and an ester, and, optionally, a co-solvent selected from the group consisting of water, n-methyl pyrrolidone, a ketone, a glycol, DMSO, and an ester.

In some embodiments, the solution comprises a (i) binder selected from the group consisting of alginate, PVDF, PTFE, polyaniline, epoxies, carboxymethyl cellulose, rubber, styrene butadiene rubber, polyacrylic acid, polyvinyl alcohol and polyvinyl propylene, and (ii) a species of ion selected from the group consisting of sodium, lithium, potassium, magnesium, manganese, aluminum, calcium, barium, strontium and zinc.

In another aspect, the invention is directed to a cathode for an ion battery (e.g., an aluminum ion battery or an aqueous aluminum ion battery), the cathode made by a process comprising: simultaneously depositing a manganese oxide (e.g., MnO or $MnO_2$ or $Mn_xO_y$) and one or more sacrificial materials onto a current collector; and removing the one or more sacrificial materials. In certain embodiments the manganese oxide is a member selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, the one or more sacrificial materials comprise one or more members selected from the group consisting of: alizarin, amidinate, quinone, alginate, zeolite, quinolone, hydroxyquinone, hydroxyquinoline, silicon, copper, cobalt, chromium, nickel, iron, an oxide, a hydroxide, a sulfate, a nitrate, and a phosphate (e.g., of silicon, copper, cobalt, chromium, nickel, or iron).

In certain embodiments, the simultaneously depositing step comprises simultaneous thermal evaporation, simultaneous sputtering, co-extrusion, or simultaneous coating (e.g., spin-coating, doctor blading, or slot-die coating).

In another aspect, the invention is directed to a process for manufacturing a cathode for an ion battery (e.g., an aluminum ion battery or an aqueous aluminum ion battery), the process comprising: depositing an amount of a solution on a current collector, wherein the solution comprises: one or more members selected from the group consisting of a manganese oxide (e.g., MnO or $MnO_2$ or $Mn_xO_y$), a layered aluminosilicate (e.g., $Al_2SiO_5$), and an aluminum-accepting polymer, and one or more solvents (e.g., selected from the group consisting of water, N-methyl pyrrolidone, and ethanol). In certain embodiments the one or more members comprises a manganese oxide selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, the process further comprises manufacturing a manganese oxide (e.g., MnO or $MnO_2$ or $Mn_xO_y$) by: reacting one or more manganese oxide precursors with a base in the presence of a source of oxygen (e.g., and, optionally, an oxidant chemical catalyst); and optionally, hydrothermally treating the manganese oxide after the reacting step, wherein the one or more precursors are each selected from the group consisting of a manganese salt, a lithium salt, a sodium salt, a magnesium salt, nickel, zinc, aluminum, mineral acids, and a permanganate, wherein the manganese salt comprises one or more of a sulfate, (i) a nitrate, (ii) a chloride, (iii) an acetate, (iv) a phosphate, (v) a perchlorate, (vi) a fluoride, and (vii) a bromide, wherein the permanganate comprises one or more of (i) sodium and (ii) potassium. In certain embodiments, the base comprises one or more of lithium hydroxide, sodium hydroxide, potassium hydroxide, and calcium hydroxide. In certain embodiments, the source of oxygen is a dissolved oxygen gas or a peroxide (e.g., hydrogen peroxide).

In certain embodiments, the solution further comprises one or more of: a binder (e.g., a polymer binder, e.g., a polymer binder penetrable by an electrolyte solution comprising one or more aluminum salts) and a conductive additive (e.g., a carbon-containing additive).

In certain embodiments, the depositing step comprises doctor blading, spin coating, or slot-die coating.

In certain embodiments, the process further comprises calendering the deposited solution and the current collector.

In another aspect, the invention is directed to a process for manufacturing a cathode for an ion battery (e.g., an aluminum ion battery or an aqueous aluminum ion battery), the process comprising: simultaneously depositing a manganese oxide (e.g., MnO or $MnO_2$ or $Mn_xO_y$) and one or more sacrificial materials onto a current collector; and removing the one or more sacrificial materials. In certain embodiments, the one or more sacrificial materials comprise one or more members selected from the group consisting of: alizarin, amidinate, quinone, alginate, zeolite, quinolone, hydroxyquinone, hydroxyquinoline, silicon, copper, cobalt, chromium, nickel, iron, an oxide, a hydroxide, a sulfate, a nitrate, and a phosphate (e.g., of silicon, copper, cobalt, chromium, nickel, or iron). In certain embodiments the manganese oxide is a member selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, the simultaneously depositing step comprises one or more members selected from the group consisting of simultaneous thermal evaporation, simultaneous sputtering, co-extrusion, and simultaneous coating (e.g., spin-coating, doctor blading, or slot-die coating).

In another aspect, the invention is directed to an anode for an ion battery (e.g., an aluminum ion battery or an aqueous aluminum ion battery), the anode comprising: one or more structures (e.g., one or more foils, thin films, or particles), wherein each of the one or more structures comprises one or more aluminum-containing members selected from the group consisting of aluminum, an aluminum alloy, and an aluminum composite, wherein the anode is from 0.001 wt. % to 100 wt. % aluminum (e.g., from 70 wt. % to 100 wt. % aluminum, e.g., at least 95 wt. % aluminum) (e.g., wherein the anode comprises at least 95 wt. % aluminum and up to 5 wt. % non-aluminum species, e.g., said non-aluminum species comprising one or more alloying metals and/or oxides intentionally incorporated in the anode) (e.g., wherein a purity of the aluminum is at least 99.9 atomic %, e.g., at least 99.99 atomic %, e.g., from 99.99 atomic % to 99.99999 atomic %, e.g., wherein impurities are present in a range from 0.01 atomic % to 0.00001 atomic %, e.g., said impurities comprising iron and/or sodium and/or magnesium and/or silica, e.g., impurities commonly found in metal foils). In some embodiments, the anode comprises a surface layer comprising (e.g., consisting of) one or more of aluminum, oxygen, hydrogen, nitrogen, lithium manganese and carbon.

In certain embodiments, each of the one or more structures comprises an aluminum alloy or mixture that comprises one or more non-aluminum members selected from the group consisting of sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, cobalt, tellurium, antimony, arsenic, tungsten, and selenium.

In certain embodiments, the anode comprises a film comprising the one or more structures, wherein each of the one or more structures is a particle (e.g., wherein the particle has a diameter in a range from 10 nm to 100 micrometers) (e.g., wherein the film has a thickness in a range from 10 nm to 1 mm). In certain embodiments, at least 80% of the particles of the anode have dimension (e.g., diameter) within (at least) one of the following ranges (e.g., with a ±20% tolerance or better): (i) no less than 50 nm (e.g., at least 80% of the particles have dimension no less than 40-60 nm); (ii) from 100 nm to 500 nm (e.g., at least 80% of the particles have dimension between 80-120 nm and 400-600 nm); (iii) from 250 nm to 1 micrometer (e.g., at least 80% of the particles have dimension between 200-300 nm and 0.8-1.2 micrometers); (iv) from 500 nm to 5 micrometers (e.g., at least 80% of the particles have dimension between 400-600 nm and 4-6 micrometers); (v) from 1 micrometer to 10 micrometers; (vi) from 5 micrometers to 25 micrometers; (vii) from 10 micrometers to 50 micrometers; and (viii) from 50 micrometers to 100 micrometers.

In certain embodiments, the film further comprises a polymer binder in physical contact with the plurality of particles, wherein the polymer binder is selected from the group consisting of carboxymethyl cellulose, styrene butadiene rubber, polyvinyl alcohol, polypropylene, and polytetrafluoroethylene.

In certain embodiments, the film further comprises one or more conductive carbon additives.

In certain embodiments, the one or more structures comprises a thin film, the thin film having a thickness in a range from 1 nm to 1 mm. In certain embodiments, the thin film has a thickness within (at least) one of the following ranges (e.g., with a ±20% tolerance or better): (i) no less than 50 nm (e.g., a thickness no less than 40-60 nm); (ii) from 100 nm to 500 nm (e.g., a thickness between 80-120 nm and 400-600 nm); (iii) from 250 nm to 1 micrometer (e.g., a thickness between 200-300 nm and 0.8-1.2 micrometers); (iv) from 500 nm to 5 micrometers (e.g., a thickness between 400-600 nm and 4-6 micrometers); (v) from 1 micrometer to 10 micrometers; (vi) from 5 micrometers to 25 micrometers; (vii) from 10 micrometers to 50 micrometers; and (viii) from 50 micrometers to 100 micrometers.

In certain embodiments, the thin film is coated on a current collector (e.g., a conductive substrate) (e.g., wherein the conductive substrate comprises one or more members selected from the group consisting of carbon, steel, nickel, iron, zinc, aluminum, titanium, tungsten, copper, silver, tin, indium, and chromium). In some embodiments, the thin film is coated on a current collector (e.g., a conductive substrate) that further includes a coating of one or more of carbon, metal (e.g. tin, zinc, aluminum, chromium, copper, nickel, iron, zirconium, silver, gold, platinum), metal oxide (e.g. indium tin oxide, tin oxide, titanium oxide, vanadium oxide, zirconium oxide) or polymer (e.g. PEDOT, PAN, parylene) and the coating serves as one or more of an adhesion promoted, an electron conductivity promoter and an ionic conductivity inhibitor.

In certain embodiments, the thickness is sufficient to provide the anode with a capacity that matches a capacity of a cathode in a battery comprising the anode and the cathode.

In certain embodiments, the one or more structures comprises a foil having a polished surface (e.g., mechanically or electrochemically polished). In certain embodiments, the foil comprises polished aluminum with a native oxide layer having a thickness of 10 nanometers and less. In certain embodiments, the polished aluminum has a mirror finish (qualitative property).

In certain embodiments, the one or more structures comprises a porous structure (e.g., wherein the porous structure comprises pores having a circular or rectangular cross section).

In certain embodiments, the one or more structures comprise a plurality of pillars, the plurality of pillars protruding from a current collector (e.g., a conductive substrate) (e.g., wherein the conductive substrate comprises one or more members selected from the group consisting of carbon, stainless steel, nickel, titanium, tungsten, copper, and chromium).

In certain embodiments, the anode further comprises a non-native transitional aluminum oxide layer (e.g., having a thickness in a range from 0.1 nm to 10 micrometers) (e.g., formed by atomic layer deposition, chemical vapor deposition, thermal reaction, hydrothermal reaction, etching, electrochemical reaction, oxygen plasma reaction, or hydroxide treatment). In certain embodiments, the non-native transitional aluminum oxide layer has thickness within (at least) one of the following ranges (e.g., with a ±20% tolerance or better): (i) no less than 1 nm; (ii) from 1 nm to 10 nm; (iii) from 5 nm to 20 nm; (iv) from 20 nm to 50 nm; (v) from 50 nm to 250 nm; (vi) from 100 nm to 500 nm; (vii) from 500 nm to 1 micrometer; and (viii) from 1 micrometer to 10 micrometers. In certain embodiments, the non-native transitional aluminum oxide layer is disposed on the one or more structures (e.g., that comprise a thin film or foil).

In certain embodiments, the anode further comprises an oxide film disposed on the one or more structures (e.g., having a thickness in a range from 0.1 nm to 100 micrometers) [e.g., wherein the oxide film is patterned (e.g., wherein the oxide film is patterned corresponding to a distribution of pillars on the current collector)]. In certain embodiments, the oxide film has thickness within (at least) one of the following ranges (e.g., with a ±20% tolerance or better): (i) no less than 1 nm; (ii) from 1 nm to 10 nm; (iii) from 5 nm to 20 nm; (iv) from 20 nm to 50 nm; (v) from 50 nm to 250 nm; (vi) from 100 nm to 500 nm; (vii) from 500 nm to 1 micrometer; and (viii) from 1 micrometer to 10 micrometers.

In certain embodiments, the oxide film is a thin film.

In certain embodiments, the oxide film is a coating comprising a plurality of oxide particles. In certain embodiments, the plurality of oxide particles comprise nanoparticles, microparticles, or both nanoparticles and microparticles. In certain embodiments, at least 80% of the oxide particles have dimension (e.g., diameter) within (at least) one of the following ranges (e.g., with a ±20% tolerance or better): (i) from 1 nanometers to 500 micrometers; and (ii) from 10 nanometers to 20 micrometers.

In certain embodiments, the oxide film further comprises a polymer binder selected from the group consisting of carboxymethyl cellulose, styrene butadiene, polyvinyl alcohol, polypropylene, and polytetrafluorethylene.

In certain embodiments, the oxide film further comprises one or more conductive carbon additives.

In certain embodiments, the anode comprises a plurality of oxide films, wherein each of the plurality of oxide films comprises a different oxide.

In certain embodiments, the anode comprises a plurality of oxide layers of the same or different type, optionally with one or more layers of aluminum between said oxide layers (e.g., an anode with at least one instance of the following sequence of layers: $Al/Al_2O_3/ZrO_2/Al_2O_3$) (e.g., an anode with at least one instance of the following sequence of layers $Al/Al_2O_3/Al/Al_2O_3$).

In certain embodiments, the one or more structures comprises a thin film or foil and each of the plurality of oxide films is in contact with the one or more structures [e.g., arranged in an array (e.g., a regular array) on the thin film or foil].

In certain embodiments, the plurality of oxide films are disposed as layers on the one or more structures.

In certain embodiments, the one or more structures comprises a plurality of thin films or foils and one or more of the plurality of thin films or foils is disposed between two or more of the oxide films.

In certain embodiments, the anode comprises a plurality of oxide pillars protruding from the one or more structures. In certain embodiments, the plurality of oxide pillars are porous. In certain embodiments, the plurality of oxide pillars comprise one or more of fibers, nanotubes, and nanocolumns. In certain embodiments, the plurality of oxide pillars are formed by physical vapor deposition, chemical vapor deposition, atomic layer deposition, hydrothermal reaction, electrochemical reaction, electrochemical deposition, or thermal reaction. In certain embodiments, the plurality of oxide pillars are formed by depositing a film and etching the film, wherein the etching comprises plasma etching, wet chemical etching, reactive ion etching, or buffer oxide etching.

In certain embodiments, the anode further comprises a non-oxide film disposed on the one or more structures (e.g., directly on the one or more structures or with one or more oxide films disposed between the non-oxide film and the one or more structures). In certain embodiments, the non-oxide film comprises one or more non-oxide members selected from the group consisting of a sulfide of an element, a sulfate of the element, a nitride of the element, a nitrate of the element, a phosphide of the element, a phosphate of the element, and a halide of the element, wherein the element is selected from the group consisting of zirconium, tungsten, indium, chromium, cobalt, magnesium, iron, nickel, vanadium, titanium, zinc, manganese, iron, tin, silicon, sulfur, copper, hafnium and cobalt. In certain embodiments, the non-oxide film is a thin film. In certain embodiments, the non-oxide film is a coating comprising a plurality of non-oxide particles (e.g., comprising the one or more non-oxide members). In certain embodiments, the plurality of non-oxide particles comprise nanoparticles, microparticles, or both nanoparticles and microparticles.

In certain embodiments, the anode comprises a polymer layer disposed on the one or more structures (e.g., wherein a surface coverage of the one or more structures by the polymer layer is from 1% to 100%, e.g., wherein at least 50% of the surface of the one or more structures is covered by the polymer layer) (e.g., wherein the polymer layer has a thickness in a range from 0.1 nm to 100 micrometers) [e.g., wherein the polymer layer has a thickness within (at least) one of the following ranges (e.g., with a ±20% tolerance or better): (i) no less than 1 nm; (ii) from 1 nm to 10 nm; (iii) from 5 nm to 20 nm; (iv) from 20 nm to 50 nm; (v) from 50 nm to 250 nm; (vi) from 100 nm to 500 nm; (vii) from 500 nm to 1 micrometer; and (viii) from 1 micrometer to 10 micrometers]. In certain embodiments, the polymer layer comprises one or more members selected from the group consisting of: parylene, polyvinyl alcohol, alginic acid, PTFE, polyethylene oxide, cellulose (and its derivatives), polysulfone (PES), a polymer of one or more acrylates, alginate (e.g., comprising sodium, calcium, aluminum, potassium, magnesium, or zinc), quinone, hydroquinone, quinolone, hydroxyquinoline, and alizarin (e.g., comprising alizarin Red S).

In another aspect, the invention is directed to an electrode (e.g., a cathode or an anode) for an ion battery (e.g., an aluminum ion battery or an aqueous aluminum ion battery), the electrode comprising: electroactive material (e.g., disposed as particles or a film comprising one or more of a manganese oxide (e.g., MnO or $MnO_2$ or $Mn_xO_y$), aluminosilicate, and an aluminum-accepting polymer), a polymer binder, and conductive carbon (e.g., comprising carbon particles or carbon ribbons). In certain embodiments the manganese oxide is a member selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, the polymer binder is from 0.5 wt. % to 50 wt. % of the total solids in the electrode.

In certain embodiments, the polymer binder comprises one or more members selected from the group consisting of a cellulose (e.g., carboxymethyl cellulose or cellulose acetate), styrene butadiene rubber, polysulfone, an alginate (e.g., alginic acid, calcium alginate, sodium alginate, aluminum alginate, zinc alginate, or magnesium alginate), alizarin, quinone, hydroquinone, quinolone, hydroquinoline, and polyvinyl alcohol (PVA).

In certain embodiments, the electrode further comprises a current collector, wherein the polymer binder is disposed as a thin film (e.g., having a thickness in a range of 1 nm to 10 micrometers) on a current collector such that the thin film of the polymer binder is disposed between the electroactive material and the current collector [e.g., wherein the thin film of the polymer binder has a thickness within (at least) one of the following ranges (e.g., with a ±20% tolerance or better): (i) no less than 1 nm; (ii) from 1 nm to 10 nm; (iii) from 5 nm to 20 nm; (iv) from 20 nm to 50 nm; (v) from 50 nm to 250 nm; (vi) from 100 nm to 500 nm; (vii) from 500 nm to 1 micrometer; and (viii) from 1 micrometer to 10 micrometers]. In certain embodiments, the electrode further comprises a conductive layer (e.g., having a thickness in a range of 1 nm to 10 micrometers), wherein the conductive layer is disposed between the electroactive material and the binder and in electrical and/or physical contact with the electroactive material and the binder. In certain embodiments, the conductive layer comprises a member selected from the group consisting of carbon, tin, tin oxide, indium tin oxide, titanium, chromium, nickel, gold, silver, and platinum.

In certain embodiments, the electrode comprises a multilayer structure comprising (e.g., and positionally arranged in the order listed here) a current collector, a first thin film of the polymer binder, a first conductive layer, a first layer of the electroactive material, a second thin film of the polymer binder, a second conductive layer, and a second layer of the electroactive material.

In certain embodiments, the electrode comprises (e.g., positionally arranged in the order listed here) a current collector, a first thin film of the polymer binder, a first layer of the electroactive material, a second thin film of the polymer binder, and a second layer of the electroactive material.

In another aspect, the invention is directed to an aqueous electrolyte for an ion battery (e.g., an aqueous aluminum ion battery), the electrolyte comprising water (e.g., deionized water) and an aluminum salt (e.g., one or more members selected from the group consisting of a sulfate, a phosphate, a nitrate and a halide salt of aluminum) [wherein the water serves as a solvent and wherein the aluminum salt is a primary additive (e.g., said electrolyte having a total aluminum salt concentration in a range from 0.01 M to 5 M, e.g., from 0.05 M to 1 M) (e.g., said aluminum salt being dissolved in said water)].

In certain embodiments, the aqueous electrolyte further comprises an additive comprising a sodium, lithium, potassium or calcium salt (e.g., one or more members selected from the group consisting of a sulfate, a phosphate, a nitrate and a halide salt of sodium, lithium, potassium, or calcium) (e.g., said electrolyte having a total sodium, lithium, potassium or calcium salt concentration in a range from 0.01 M to 5 M, e.g., from 1 M to 3 M) (e.g., said sodium, lithium, potassium or calcium salt being dissolved in said water).

In certain embodiments, the aqueous electrolyte further comprises a polymer (e.g., said polymer comprising one or more members selected from the group consisting of an alginate, a quinone, a quinolone, a hydroxyquinone, an alizarin, and a hydroxyquinoline) (e.g., said electrolyte having a total polymer wt. % in a range from 0.01 to 50 wt. %, e.g., from 0.5 to 10 wt. %).

In certain embodiments, the aqueous electrolyte further comprises a wetting agent to increase wettability of the cathode (e.g., said wetting agent comprising one or more members selected from the group consisting of a ketone, an alcohol, an aldehyde, an ether, an ester, and a cyclohexane) (e.g., said electrolyte having a total wt. % wetting agent in a range from 0.01 to 50 wt. %, e.g., from 0.5 to 10 wt. %).

In certain embodiments, the aqueous electrolyte comprises a manganese salt (e.g., one or more members selected from the group consisting of a sulfate, a phosphate, an acetate, a nitrate and a halide salt of manganese) (e.g., said electrolyte having a total manganese salt concentration in a range from 0.01 M to 5 M, e.g., from 0.05 M to 1 M) (e.g., said manganese salt being dissolved in said water).

In another aspect, the invention is directed to an aluminum battery-capacitor hybrid comprising: an anode comprising one or more members selected from the group consisting of aluminum, an aluminum alloy, and an aluminum composite; an aqueous electrolyte; and a cathode comprising one or more members selected from the group consisting of a manganese oxide (e.g., MnO or $MnO_2$ or $Mn_xO_y$), aluminosilicate, and a polymer, wherein one or more components of the aluminum battery-capacitor hybrid (e.g., the anode and/or the cathode) comprises one or more additives selected from the group consisting of a pseudocapacitor additive and a dielectric additive, wherein: the pseudocapacitor additive comprises one or more members selected from the group consisting of graphene, graphene oxide, carbon nanotubes, fullerenes, carbon aerogels, vanadium oxide, titanium oxide, molybdenum oxide, ruthenium oxide, polypyrrole, and poly(3,4-ethylenedioxythiophene); and the dielectric additive comprises one or more members selected from the group consisting of titanium oxide, silicon oxide, zirconium oxide, parylene or other conjugated polymers, polystyrene, and polypropylene. In certain embodiments the manganese oxide is a member selected from the group consisting of MnO [manganese(II) oxide], $Mn_3O_4$ [manganese(II,III) oxide], $Mn_2O_3$ [manganese(III) oxide], $MnO_2$ [manganese dioxide, aka manganese(IV) oxide], $MnO_3$ [manganese(VI) oxide], and $Mn_2O_7$ [manganese(VII) oxide].

In certain embodiments, the one or more additives comprises a pseudocapacitor additive, and wherein the pseudocapacitor additive makes up about 0.1 weight % to about 90 weight % of the combined net weight of the anode and cathode.

In certain embodiments, the one or more additives comprises a pseudocapacitor additive, and wherein the pseudocapacitor additive is in the form of a thin film, a nanostructure, a microstructure, a particle, or a combination thereof.

In certain embodiments, the one or more additives comprises a dielectric additive, and wherein the dielectric additive makes up about 0.1 weight % to about 90 weight % of the combined net weight of the anode and cathode. In certain embodiments, an additive concentration is determined based on end use. For example, an energy-dense battery-capacitor hybrid will likely have a dielectric additive concentration less than 30 weight %. On the other hand, a power-dense battery capacitor hybrid will likely have a dielectric additive concentration greater than 50 weight %.

In certain embodiments, the one or more additives comprises a dielectric additive, and wherein the dielectric additive is in the form of a thin film, a nanostructure, a microstructure, a particle, or a combination thereof.

In certain embodiments, the anode comprises: a first aluminum layer comprising one or more members selected from the group consisting of aluminum, an aluminum alloy, or an aluminum composite; a dielectric layer comprising a dielectric additive; a second aluminum layer comprising one or more members selected from the group consisting of aluminum, an aluminum alloy, or an aluminum composite; and a protective oxide layer.

In certain embodiments, the first aluminum layer comprises aluminum foil.

In certain embodiments, the dielectric layer comprises a metal oxide. In certain embodiments, the metal oxide is zirconium oxide. In certain embodiments, the zirconium oxide is in the form of a thin film.

In certain embodiments, the second aluminum layer comprises a thin film of aluminum foil.

In certain embodiments, the dielectric additive is aluminum oxide. In certain embodiments, the aluminum oxide is in the form of a thin film.

In certain embodiments, the cathode comprises: a stainless-steel substrate; an aluminum layer comprising one or more members selected from the group consisting of aluminum, an aluminum alloy, or an aluminum composite; a dielectric layer comprising a dielectric additive; and a manganese oxide layer. In certain embodiments, the dielectric additive comprises a metal oxide. In certain embodiments, the metal oxide is zirconium oxide.

In certain embodiments, the anode and cathode are arranged to facilitate transport of aluminum ions from the second aluminum layer of the anode to the cathode.

In certain embodiments, the anode and cathode are arranged to facilitate transport of aluminum ions from the manganese oxide layer of the cathode to the second aluminum layer of the anode during charging.

BRIEF DESCRIPTION OF THE DRAWINGS

Drawings are presented herein for illustration purposes, not for limitation. The foregoing and other objects, aspects, features, and advantages of the disclosure will become more apparent and may be better understood by referring to the following description taken in conjunction with the accompanying drawings, in which:

FIGS. 4A and 4B show a plurality of oxide films, coatings or a combination of films and oxides on an aluminum or aluminum-based anode, according to illustrative embodiments of the present disclosure;

FIG. 10A shows an example of a manganese oxide coated on an interconnected porous substrate where the pores are regular or irregular circular pores, according to illustrative embodiments of the present disclosure;

FIG. 10B shows an example of a manganese oxide coated on an interconnected porous substrate where the pores are regular or irregular rectangular (e.g., woven) pores, according to illustrative embodiments of the present disclosure;

FIG. 31 shows an illustration of a bimodal distribution of cathode particle sizes (e.g., 20 µm and 0.5 µm), according to illustrative embodiments of the present disclosure.

DETAILED DESCRIPTION OF CERTAIN EMBODIMENTS

Figure 1:
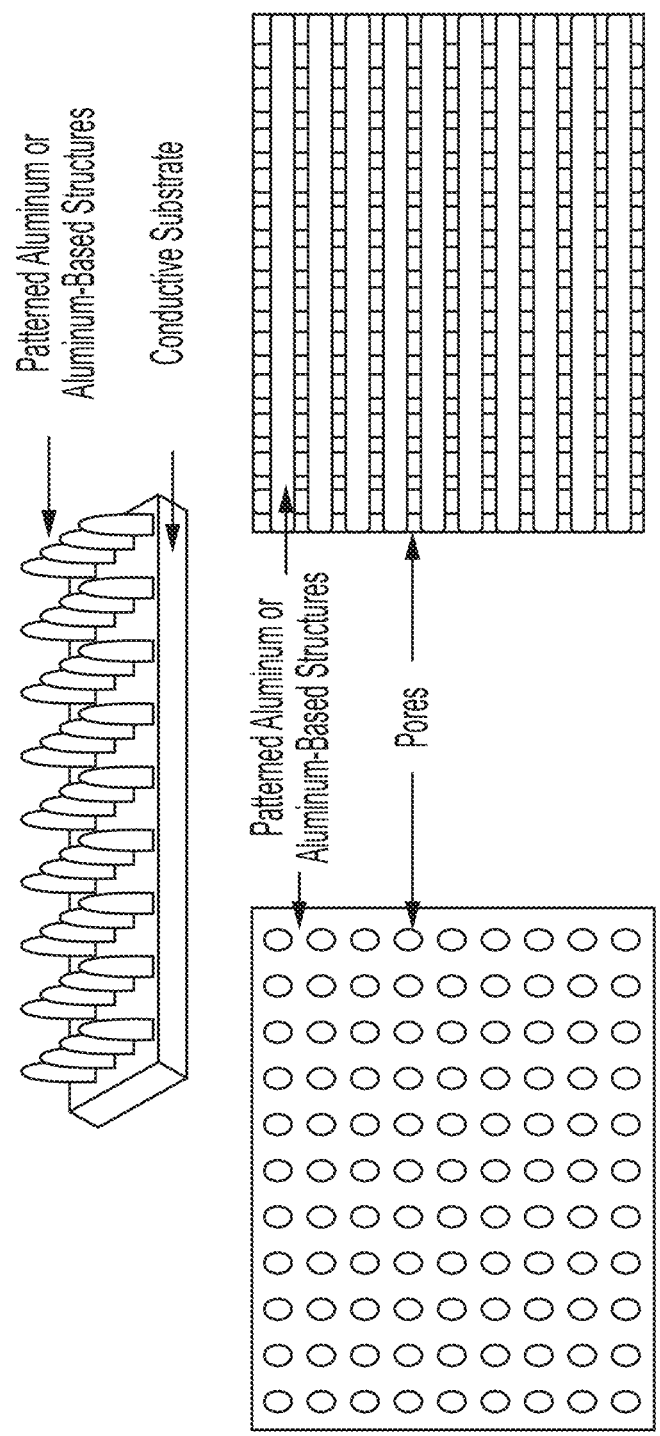
FIG. 1 shows examples of distinct or interconnected porous aluminum or aluminum-based alloy or mixture anode structure deposited on a conductive substrate, according to illustrative embodiments of the present disclosure.

Throughout the description, where compositions and devices are described as having, including, or comprising specific components, or where processes and methods are described as having, including, or comprising specific steps, it is contemplated that, additionally, there are compositions and devices that consist essentially of, or consist of, the recited components, and that there are processes and methods that consist essentially of, or consist of, the recited processing steps. It should be understood that the order of steps or order for performing certain action is immaterial so long as the invention remains operable. Moreover, two or more steps or actions may be conducted simultaneously. Headers are provided for the convenience of the reader and are not intended to be limiting with respect to the claimed subject matter. The presence of material in the Background section is not an admission that such material is prior art. Headers are provided for the convenience of the reader and are not intended to be limiting with respect to the claimed subject matter.

In this application, unless otherwise clear from context or otherwise explicitly stated, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; (iv) the terms "about" and "approximately" may be understood to permit standard variation as would be understood by those of ordinary skill in the relevant art; and (v) where ranges are provided, endpoints are included. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Disclosed herein are aqueous aluminum ion batteries, hybrid battery-capacitors, cathode compositions, anode compositions, binder compositions, and methods of their manufacture and use.

Aqueous Aluminum Ion Battery

Certain preferred embodiments of an aqueous aluminum ion battery described herein feature an aluminum or aluminum alloy/composite anode, an aqueous electrolyte, and a manganese oxide, an aluminosilicate, or a polymer-based cathode. The electrochemical reaction entails an actual transport of aluminum ions between the anode and cathode. Described herein are various desirable compositions and material properties of anode and cathode, along with their structural configuration. These compositions and structures allow the aqueous aluminum ion battery described herein to achieve: (1) improved charge storage capacity; (2) improved gravimetric and/or volumetric energy density; (3) increased rate capability and power density (ability to charge and discharge in shorter times); (4) increased cycle life; (5) increased mechanical strength of the electrode; (6) improved electrochemical stability of the electrodes; (7) increased electrical conductivity of the electrodes, and (8) improved ion diffusion kinetics in the electrodes as well as the electrolyte.

The presently described aqueous-based aluminum ion battery is shown to deliver capacities between 25 mAh/g and 300 mAh/g at rates ranging from 1 C to 0.01 C (where a rate of nC is defined as charge or discharge in 1/n hours). From cycle life analysis, the cells appear to deliver stable cycling performance over 150+ charge-discharge steps. All tests were conducted in 2032 coin cell form factors and used standard separators such as Celgard (polypropylene) and glass microfiber.

Without wishing to be bound to a particular theory, certain preferred embodiments of the electrochemical cell described herein is believed to rely on one or more of reaction mechanisms (i) to (iv) described below.

Reaction mechanism (i): Aluminum ions ($Al^{+3}$) are released into the electrolyte from an electrode comprising 0.001 weight % to 100 weight % aluminum upon the application of an external load. The $Al^{3+}$ ions travel through the aqueous electrolyte, a membrane separator and to the counter electrode. At the counter electrode, the aluminum ions may intercalate within the electrode structure or otherwise react with one or more of (i) oxide, (ii) hydroxide, (iii) nitrate, (iv) chloride, (v) sulfate, (vi) acetate, (vii) phosphate, (viii) manganese, (ix) sodium, (x) lithium, (xi) aluminum and (xii) potassium, to form a stable aluminum phase within or at the surface of the counter electrode structure. In addition, one or more transition metals at the counter electrode may undergo a change in their oxidation states to stabilize the structure.

Reaction mechanism (ii): Aluminum ions ($Al^{+3}$) are released into the electrolyte from an electrode comprising 0.001 weight % to 100 weight % aluminum upon the application of an external load. The $Al^{3+}$ ions travel through the aqueous electrolyte, a membrane separator and to the counter electrode. At the counter electrode, aluminum ions are stored on the surface of the counter electrode as dielectric charge.

Reaction mechanism (iii): Aluminum ions ($Al^{+3}$) are released into the electrolyte from an electrode comprising 0.001 weight % to 100 weight % upon the application of an external load. The $Al^{3+}$ ions travel through the aqueous electrolyte and react with ions present in the electrolyte to form a stable transportation phase. For example, such a phase can be achieved through a combination of $Al^{3+}$ ions with $OH^{-1}$ ions to form $Al(OH)_4^{-1}$ charge carriers. These charge carriers prevent $Al^{3+}$ ions from further reacting in the aqueous electrolyte. Once transported to the counter electrode, the charge carriers may undergo one or both the following processes: (a) dissociate to form individual anions and cations, and (b) remain in the stable charge carrier phase. If dissociated, the individual anions and/or cations may further undergo one or more of the following processes: (a) intercalating and/or reacting with the counter electrode as described in reaction mechanism (i), and (b) stored on the surface of the counter electrode as dielectric charge, as described in reaction mechanism (ii). If the charge carriers remain in their stable phase, they may undergo one or more of the following processes: (a) intercalate within the counter electrode structure, (b) transition to a non-ionic stable phase comprising of aluminum and one or more of oxide, hydroxide, chloride, nitrate, sulfate, phosphate, lithium, sodium, potassium and magnesium, and intercalate and/or react within the counter electrode structure, as per the mechanism listed in reaction mechanism (i).

Reaction mechanism (iv): Aluminum ions ($Al^{3+}$) from the electrolyte travel to the counter electrode upon the application of an external load and interact with the counter electrode, as per one or more of the mechanisms listed in reaction mechanisms (i), (ii), and (iii).

The precise nature of electrochemical reaction(s) relies on several factors including (a) electrolyte pH, (b) voltage window, (c) state of charge, (d) depth of discharge, and (e) cell composition (anodes, cathodes and electrolyte salts and solvents).

In some approaches, the electrochemical reaction may involve one or more ions in addition to the aforementioned interactions. The additional ions may involve one or more of sodium, lithium, calcium, potassium and magnesium and can come from an alloy aluminum anode, electrolyte salt or from the guest ions or molecules stored between the sheets of a manganese oxide, an aluminosilicate, or a polymer cathode. The additional ions may participate in the electrochemical reaction upon the application of an external load (charging or discharging) or through ion-exchange process between the cathode and electrolyte, anode and electrolyte, cathode and anode or a combination thereof.

Transportation Mechanism (and Features of the Charge Carrier) in the Electrolyte:

In some embodiments, the $Al^{3+}$ ion released from the anode or cathode during electrochemical cycling may coordinate at the surface of the electrode and/or in the electrolyte to form complexes of varying size, with specific common examples being polyoxometalate clusters $Al_{13}$ and $Al_{30}$ Keggin-type complexes, but not limited to this size or degree of order.

These complexes may comprise of either exclusively aluminum, oxygen, and hydrogen, such as $Al_xO_yH_z$; or together with other metals in the form $X_nAl_xO_yH_z$, wherein X may be any metal or combination of metals from the group comprising: sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, cobalt, tellurium, antimony, arsenic, tungsten, and selenium.

In the electrolyte these complexes may exist in any one of the following states: a fully dissociated state wherein the $Al^{3+}$ ion is present, in a complex molecule, or in a complex cluster in the form $X_nAl_xO_yH_z$. These complexes may retain their structure throughout the charge transport process or may undergo transformation between the anode and cathode, inside and outside of the separator layer.

Aluminum Insertion, Storage and Transportation within the Cathode and/or Anode:

In some embodiments, the $Al^{3+}$ ion diffusing into an anode or cathode may coordinate in the electrolyte and/or at the surface of the anode and/or cathode and/or within the anode/cathode structure to form complexes of varying size, with specific common examples being polyoxometalate clusters $Al_{13}$ and $Al_{30}$ Keggin-type complexes, but not limited to this size or degree of order.

These complexes may comprise of either exclusively aluminum, oxygen, and hydrogen, such as $Al_xO_yH_z$; or together with other metals in the form $X_nAl_xO_yH_z$, wherein X may be any metal or combination of metals from the group comprising: sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, cobalt, tellurium, antimony, arsenic, tungsten, and selenium.

At the cathode these complexes may form a surface layer, which is of a varying composition during charge, discharge, and rest. This layer can be of a varying density and crystalline order, ranging from highly ordered layers and clusters to completely amorphous. The components of the cathode, including the polymeric binder, conductive carbon additives, and the active metal oxide material can interact with this surface layer to enable the mobility of both electrons and a variety of aluminum ions (e.g., $Al^+$, $Al^{2+}$, $Al^{3+}$, $Al(OH)_4^{1-}$) as charge carriers. Other metal ions may also be present and diffuse through such layers on the cathode surface, including but not limited to the group comprising: sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, lum, cobalt, tellurium, antimony, arsenic, tungsten, and selenium.

These complexes may be present within or at the surface or edges of the crystal lattice of the cathode active material. These complexes may transport and/or stabilize the aluminum charge carriers within the cathode active materials. These complexes may remain intact or in part within or at the surface or edges of the crystalline lattice of the cathode active material throughout the states of charge, discharge, and/or rest.

Anode

In certain preferred embodiments, the anode is primarily composed of aluminum, an aluminum composite, and/or an aluminum alloy, in the form of a foil, film, structures, or particles. An aluminum composite or alloy anode, in the form of a foil, film, structures or particles, is referred to herein as aluminum-based anodes. The anode may be free-standing in nature (such as in a foil) or be coated on a conductive substrate.

In certain embodiments, the aluminum anode comprises an aluminum foil with 0.00001 weight % to 99.99999 or higher weight % aluminum and with purity ranging between 50% and 99.99999 or higher %. In addition, the foil may further comprise an alloy or mixture of one or more of carbon, manganese, magnesium, cobalt, nickel, tin, iron, silicon, sodium, potassium, lithium, calcium, phosphorus, sulfur, zinc, copper, titanium, vanadium and chromium. In certain embodiments, the thickness of the aluminum foil, including alloys or mixtures if any, can range from 10 nm to 100 micrometers.

In some embodiments, the aluminum anode comprises a film composed of aluminum nanoparticles and/or microparticles. The aluminum particles may possess diameter in a range between 10 nm and 50 micrometers. The aluminum particles may be further accompanied by alloy or mixture compositions of one or more of carbon, manganese, magnesium, cobalt, nickel, tin, iron, silicon, sodium, potassium, lithium, calcium, phosphorus, sulfur, zinc, copper, titanium, vanadium and chromium. The film may further comprise of polymer binders including, but not limited to carboxymethyl cellulose, styrene butadiene rubber, polyvinyl alcohol, polypropylene, poly-tetrafluoro ethylene, and conductive carbon additives. Such a film can be coated by various techniques including, but not limited to, doctor blade, slot die, electro-chemical deposition, co-extrusion and spin coating. The said film can be coated on to a conductive substrate including, but not limited to, carbon, stainless steel, nickel, titanium, tungsten, copper, chromium and aluminum. The thickness of the aluminum film comprising of nano/microparticles, including alloys or mixtures if any, can range from 10 nm to 1 mm.

In some embodiments, the aluminum anode may be deposited as a thin film. The film can be further composed of one or more of carbon, manganese, magnesium, cobalt, nickel, tin, iron, silicon, sodium, potassium, lithium, calcium, zirconium, phosphorus, sulfur, zinc, copper, titanium, vanadium and chromium. Such a film can be coated by various techniques including, but not limited to, physical vapor deposition, chemical vapor deposition, atomic layer deposition and thermal evaporation. The said film can be coated on to a conductive substrate including, but not limited to, carbon, stainless steel, nickel, titanium, tungsten, copper, chromium and aluminum. The thickness of the aluminum film, including alloys or mixtures if any, can range from 1 nm to 1 mm. The range of aluminum thickness will determine capacity matching between aluminum anode and manganese oxide cathode.

The aluminum or aluminum-based alloy or mixture may be further patterned or deposited in the form of nanostructures. For example, a porous structural template (as shown in FIG. 1) may be obtained by various techniques including, but not limited to, photolithography, reactive ion etching, plasma etching and glancing angle deposition. Some approaches involve deposition of aluminum and aluminum-based alloys and mixtures directly on a porous substrate, including, but not limited to, nanotubes, fibers, foams and meshes. Such a porous substrate comprises of one or more of conductive compositions including, but not limited to, carbon, nickel, stainless steel, titanium, tungsten, copper, chromium and aluminum.

Figure 2:
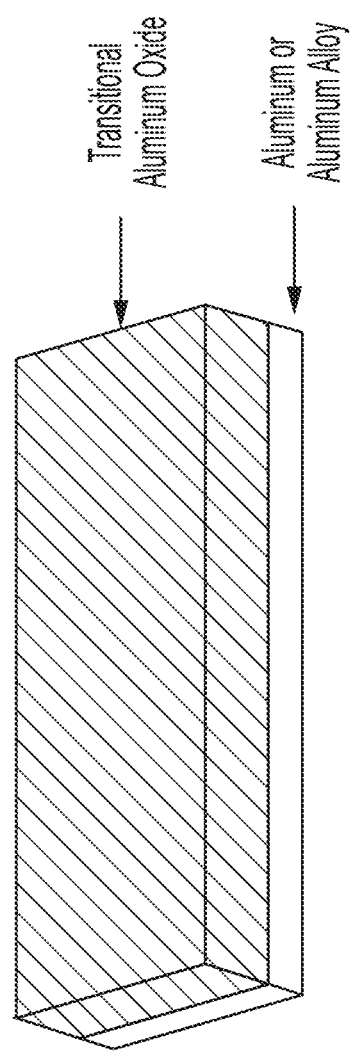
FIG. 2 shows an example of a transitional aluminum oxide region on an underlying aluminum substrate, according to illustrative embodiments of the present disclosure.

The aforementioned aluminum or aluminum-based anode may further comprise a transitional aluminum oxide layer, ranging from a thickness of 0.1 nm to 10 micrometers, for example as shown in FIG. 2. Such a transitional oxide may be in the form of a uniform thin film or patterned and may largely resemble the structure of the underlying aluminum. Such a transitional aluminum oxide layer may be formed, organically or otherwise, through one or a combination of approaches including, but not limited to chemical vapor deposition, thermal reaction, hydrothermal reaction, etching, electrochemical reaction or other chemical reactions such as those involving oxygen plasma and hydroxide treatment, among others.

Optional secondary composition of anode: The secondary composition of the anode may comprise distinct layers composed of one or a plurality of oxides including, for example, zirconium oxide, aluminum oxide, tungsten oxide, vanadium oxide, titanium oxide, zinc oxide, manganese oxide, iron oxide, tin oxide, silicon oxide, copper oxide and/or cobalt oxide. Thickness of these oxide layers may range from 0.1 nm to 100 micron, and the layers can be created through approaches such as physical vapor deposition, chemical vapor deposition, atomic layer deposition, electrochemical deposition and chemical reactions.

Figure 3B:
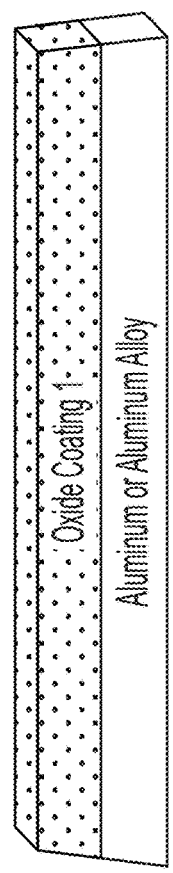
FIGS. 3A and 3B show examples of a distinct layer of an oxide film or coating on an aluminum or aluminum-based anode, according to illustrative embodiments of the present disclosure.
Figure 3A:
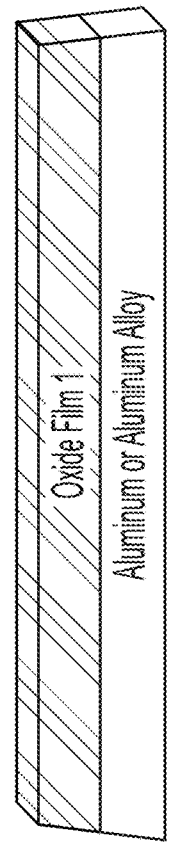

The oxides may be deposited in the form of thin films (e.g., as shown in FIG. 3A) or coatings of nanoparticles, microparticles or a combination of nanoparticles and microparticles (e.g., as shown in FIG. 3B). A thin film of an oxide may be deposited by techniques including, but not limited to, physical vapor deposition, chemical vapor deposition, atomic layer deposition, and thermal evaporation. On the other hand, coatings of nanoparticles and/or microparticles may be deposited by techniques including, but not limited to, doctor blade, slot die, electrochemical deposition, co-extrusion and spin coating. In addition, the coating may further comprise a polymer binder, for example, carboxymethyl cellulose, styrene butadiene rubber, polyvinyl alcohol, polypropylene, poly-tetrafluoro ethylene, and/or conductive carbon additives.

In some embodiments, the underlying aluminum or aluminum-based anode may be coated with a plurality of oxide layers, including films (e.g., as shown in FIG. 4A), coatings (e.g., as shown in FIG. 4B) or combination of both.

Figure 5B:
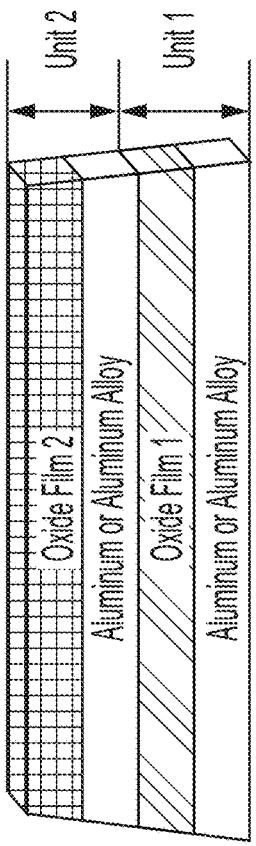
FIGS. 5A-5C show repeating units comprising aluminum or aluminum-based underlying anode and layers of oxide films or coatings, according to illustrative embodiments of the present disclosure.
Figure 5C:
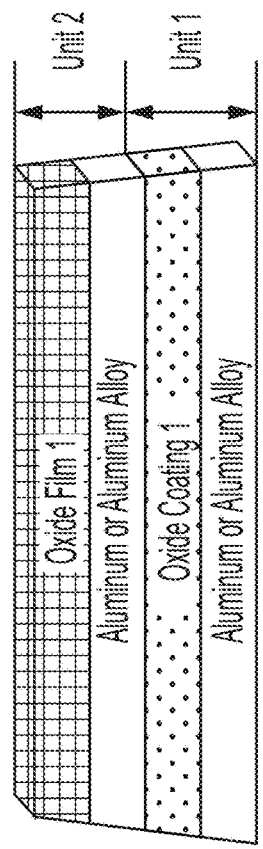
Figure 5A:
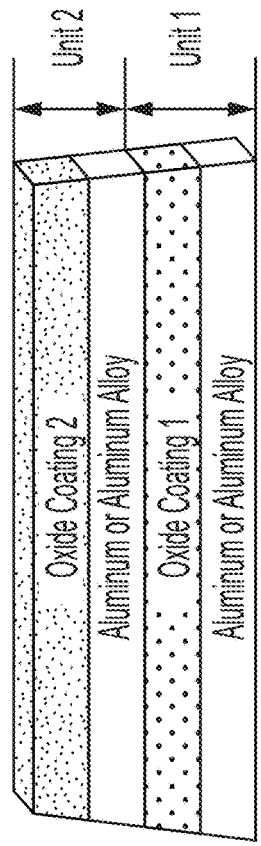

In some embodiments, aluminum or aluminum-based anode (where aluminum-based refers to one or more of aluminum alloy, aluminum and a passivation layer or aluminum and multiple passivation layers, aluminum and an oxide layer or aluminum and multiple oxide layers, aluminum with a native oxide layer, aluminum with a transitional oxide layer and other such combinations) and an oxide film or coating may be used as repeating units. Each unit may comprise the same or different oxide composition and the same or different thickness. Examples are shown in FIGS. 5A-5C where FIG. 5A shows two of the same units, FIG. 5B shows two different units (having films differing in composition), and FIG. 5C shows two different units (one having an oxide coating and one having an oxide film). Some such approaches would help with scalability, improve mechanical, chemical and electrochemical stability of the anode composition and allow for an efficient utilization and improved rate capability of the anode.

Figure 6B:
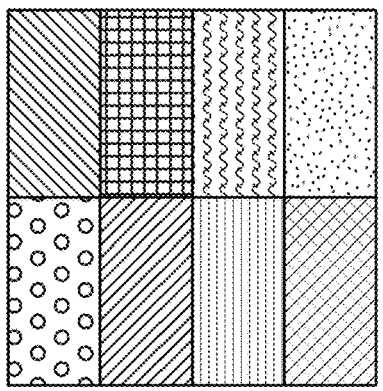
FIGS. 6A-6B show examples of underlying aluminum or aluminum-based anode coated with a plurality of oxides, each of which resides on the same substrate, according to illustrative embodiments of the present disclosure.
Figure 6A:
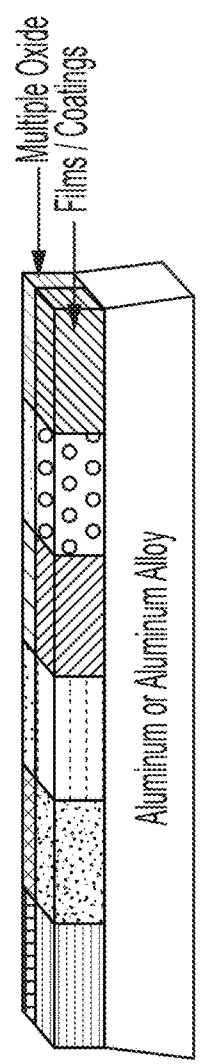

In some embodiments, the underlying surface of aluminum or aluminum-based anode may be coated with a plurality of oxide films, oxide particles or a combination of the two, where each oxide shares the same underlying substrate, for example as shown in FIGS. 6A-6B. Such a coating can be achieved effectively through approaches including, but not limited to, photolithography and the use of masks during individual oxide depositions.

Figure 7:
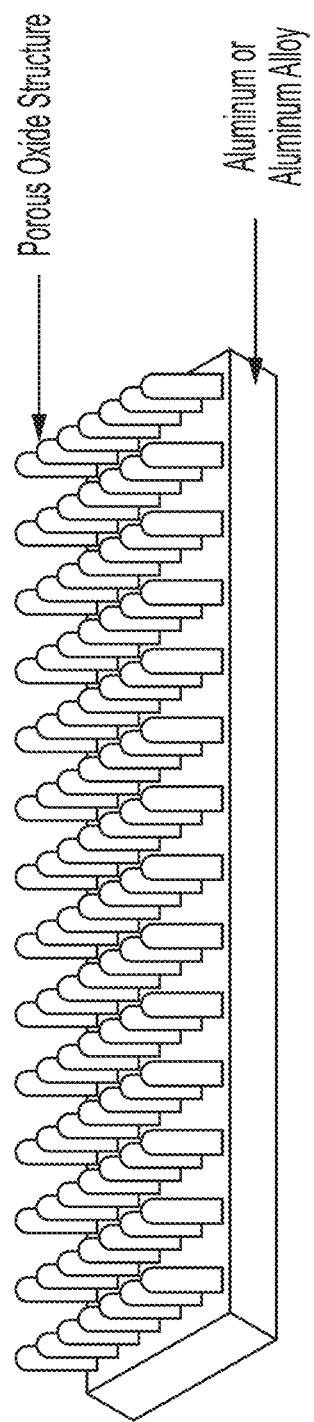
FIG. 7 shows an example of porous oxide column-like structures deposited on an underlying aluminum or aluminum-based anode, according to illustrative embodiments of the present disclosure.

In addition to films and coatings comprising of oxide particles, coatings may also include porous oxide structures such as fibers, nanotubes and nanocolumns, for example as shown in FIG. 7. Such an oxide structure can be deposited through techniques including, but not limited to, glancing angle deposition, physical vapor deposition, chemical vapor deposition, atomic layer deposition, lithography, photolithography, e-beam lithography, die-stamping, sintering, hot press, electrochemical deposition and hydrothermal reactions.

Figure 8A:
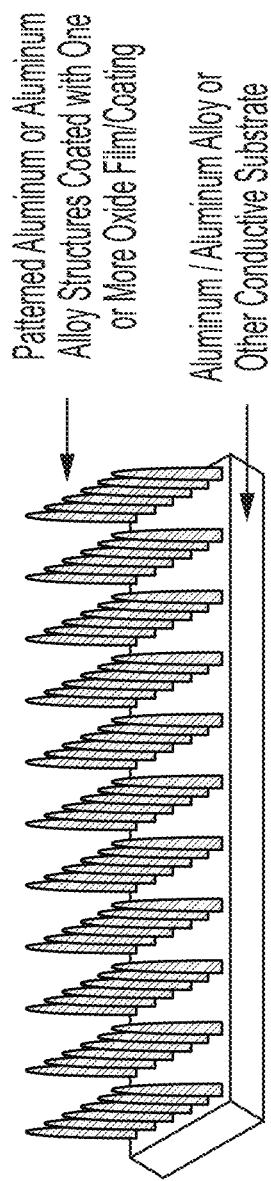
FIG. 8A shows an oxide film or coating on patterned aluminum or aluminum-based anode structures protruding from an underlying aluminum or aluminum-based alloy (or other conductive) substrate, according to illustrative embodiments of the present disclosure.
Figure 8C:
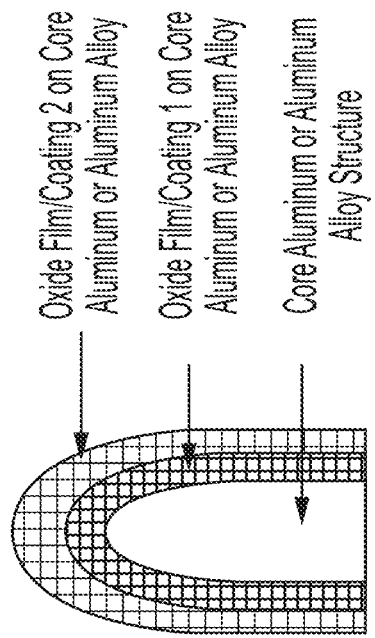
FIG. 8C shows an example of a plurality of oxide films or coatings on an aluminum or aluminum-based alloy structure (e.g., from FIG. 8A), according to illustrative embodiments of the present disclosure.
Figure 8B:
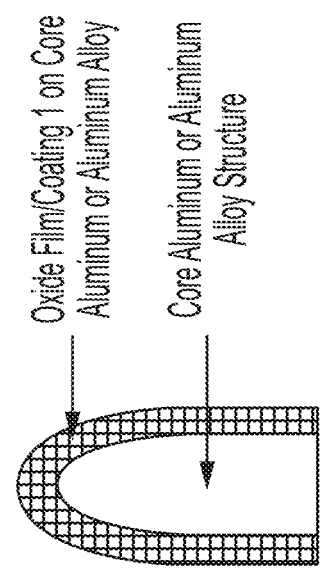
FIG. 8B shows an example of a single oxide film or coating on an aluminum or aluminum-based alloy structure (e.g., from FIG. 8A), according to illustrative embodiments of the present disclosure.

In some embodiments, oxides may also be coated and/or deposited directly on a porous aluminum or aluminum-based anode, for example as shown in FIGS. 8A-8B. Such a deposition method may involve one or more techniques including, but not limited to, physical vapor deposition, chemical vapor deposition, atomic layer deposition, hydrothermal reaction, electrochemical reaction, electrochemical deposition, thermal reaction and/or other similar chemical reactions. In some approaches, an oxide layer may be coated on an underlying aluminum or aluminum-based anode in the form of film or a layer comprising of nanoparticles, microparticles or a combination of both and then be subjected to some form of etching, including, but not limited to, plasma etching, reactive ion etching and/or buffer oxide etching. Further, a plurality of oxide layers can be coated on to the core aluminum or aluminum-based anode structure, for example as shown in FIG. 8C. In some approaches, the oxide layer may be grown organically, as a transitional oxide, on a porous aluminum substrate. Such an oxide layer will primarily comprise aluminum oxide and may or may not include oxides of other alloyed materials present along with the underlying aluminum anode. Such a transitional aluminum oxide layer may be formed, organically or otherwise, through one or a combination of approaches including, for example, chemical vapor deposition, thermal reaction, lithography, die-stamping, hot press, hydrothermal reaction, etching, electrochemical reaction and/or other chemical reactions such as those involving oxygen plasma and hydroxide treatment, among others.

Beyond oxides, other layers of films or particles that may be desirable in the proposed aqueous aluminum ion system include, for example, sulfides, sulfates, nitrides, nitrates, phosphides, phosphates and halides of elements including, but not limited to, zirconium, tungsten, vanadium, titanium, zinc, manganese, iron, tin, silicon, copper and cobalt. Further, an underlying aluminum or aluminum-based anode may be coated with layers including one or a combination of sulfides, sulfates, nitrides, nitrates, phosphides, phosphates and halides of elements including, but not limited to, zirconium, tungsten, vanadium, titanium, zinc, manganese, iron, tin, silicon, copper and cobalt.

In addition, an underlying aluminum or aluminum-based anode may be coated by one or more layers of polymers including, but not limited to monomers, oligomers, and polymers or copolymers of Parylene, polyvinyl alcohol, alginic acid, alginate (sodium, calcium, aluminum, potassium, magnesium, zinc), quinone, hydroquinone, quinoline, hydroxyquinoline, alizarin, and/or alizarin Red S; and/or the corresponding derivatives. These monomers, oligomers, and/or polymers can be deposited on the surface of the aluminum film with thickness of the polymer layer ranging from 0.1 nm to 100 micrometers. The polymer layers can have a surface coverage between 1% and 100% of the area of the underlying aluminum film. Techniques used to deposit these polymers can include chemical vapor deposition, spin-coating, doctor blade, co-extrusion and slot-die, among others.

Moreover, the underlying aluminum or aluminum-based anode may be coated by one or a plurality of layers including oxides, include sulfides, sulfates, nitrides, nitrates, phosphides, phosphates, halides, monomers, oligomers, and polymers or copolymers of Parylene, polyvinyl alcohol, alginic acid, alginate (sodium, calcium, aluminum, potassium, magnesium, zinc), quinone, hydroquinone, quinoline, hydroxyquinoline, alizarin, and/or alizarin Red S; and/or the corresponding derivatives.

Surface SEI Layer on Aluminum Anode:

The aluminum, aluminum alloy or aluminum compound anode may include a surface layer that comprises (e.g., consists) of one or more or a combination of oxygen, hydrogen, nitrogen, sulfur, phosphorus, halogens (fluorine, chlorine, bromine, iodine), carbon and one or more metals (including but not limited to one or more of sodium, potassium, lithium, calcium, magnesium, manganese, zinc, titanium, indium, tin, copper, vanadium, silicon, cobalt, chromium). In certain embodiments, the surface layer comprises (e.g., consists of) an aluminum, oxygen and/or hydrogen complex. In some embodiments, the surface layer comprises (e.g., consists of) an aluminum, metal, oxygen and hydrogen complex, wherein the metal may comprise one or more of sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, cobalt, tellurium, antimony, arsenic, tungsten, and selenium. In certain embodiments, this surface layer can vary in structure and composition during electrochemical cycling, including charge, discharge and rest.

In certain embodiments, $Al^{3+}$ ion from the anode surface may coordinate in the electrolyte to form complexes of varying size, for example polyoxometalate clusters, $Al_{13}$ and $Al_{30}$ Keggin-type complexes, but not limited to this size or degree of order. These complexes may comprise either exclusively aluminum, oxygen, and hydrogen, such as $Al_xO_yH_z$; or together with other metals in the form $X_nAl_xO_yH_z$, wherein X may be any metal or combination of metals from the group comprising: sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, cobalt, tellurium, antimony, arsenic, tungsten, and selenium.

At the anode these complexes may form a surface layer, which is of a varying composition during charge, discharge, and rest. This layer can be of a varying density and crystalline order, ranging from highly ordered layers and clusters to completely amorphous. The metallic aluminum stored within the anode may interact with this surface layer to enable the mobility of both electrons and a variety of aluminum ions (e.g., $Al^t$, $Al^{3+}$, $Al^{3+}$, $Al(OH)_4^{1-}$) as charge carriers.

It should be noted that in general, these complexes may exist at the surface, interior, or any combination therein, of the anode, cathode, separator, or anywhere in the electrolyte. These clusters and/or networks may exist during charge, discharge, and or rest, or any combination therein.

Current Collector Substrate for Anode:

In certain embodiments, a solution comprising aluminum and alloy particles, an aluminum or aluminum alloy film, or an aluminum-based compound may be deposited directly onto a current collector, for example by means of doctor-blade coating, slot-die coating, comma coating, spray coating or spin coating. Aluminum, aluminum alloy or aluminum-based compound may also be deposited on to a current collector through physical or chemical vapor deposition techniques or through atomic layer deposition.

The current collector substrate may be carbon or other conductive metal or metal oxide substrates including, but not limited to tin, tin oxide, indium, indium tin oxide, tungsten, vanadium, stainless steel, nickel, zinc, aluminum, copper, chromium, titanium, bismuth, silver, gold, platinum, iron, iron oxide and molybdenum. In certain embodiments, the current collector substrate is further coated with one or more of a film, wherein the film comprises of carbon, metals and/or their corresponding metal oxides (including but not limited to tin, tin oxide, indium, indium tin oxide, tungsten, vanadium, stainless steel, nickel, zinc, aluminum, copper, chromium, titanium, bismuth, silver, gold, platinum, iron, iron oxide and molybdenum) and polymers (including but not limited to PTFE, PVDF, parylene, poly(3,4-ethylenedioxythiophene) (PEDOT), polyaniline, polypropylene and cellulose). In certain embodiments, the films improve adhesion. In certain embodiments, the films improve electron conductivity. In certain embodiments, the films are impermeable to one or more ions, wherein the ions include but are not limited to metallic ions such as calcium, potassium, aluminum, lithium, sodium, magnesium, manganese, cobalt, chromium, nickel, zinc and iron. In some embodiments, the films are impermeable to ionic complexes including one or more or a combination of complexes with oxygen, complexes with hydrogen (including hydroxides and oxidehydroxide), complexes with nitrogen (including nitrides, nitrates), complexes with phosphorus (including phosphides, phosphates), complexes with sulfur (including sulfides, sulfates), and complexes with halides.

Cathode

In certain preferred embodiments, the cathode is primarily composed of a manganese oxide structure, a layered aluminosilicate, or an aluminum-accepting polymer, along with a conductive additive to improve charge distribution and contact with the current collector and a polymer binder to adhere the electrode to the current collector and maintain physical interconnection of the electrode and conductive additive particles, while allowing for electrolyte penetration. The cathode, binder and conductive additive is typically mixed in a solvent such as water, N-methyl pyrrolidone, ethanol, among others, and coated on to a current collector substrate through means including, but not limited to, doctor blade and slot-die. The as-coated cathode is allowed to dry and may or may not be calendered to increase mechanical strength and density. The thickness of the cathode can range between 10 nm and 1 mm. A manganese oxide may comprise one or more of $MnO$, $MnO_2$, $Mn_xO_y$ and manganese having a state of Mn(II), Mn(II-x), Mn(III), Mn(III-x), Mn(IV), Mn(IV-x), Mn(V), Mn(V-x), Mn(VI), Mn(VI-x), Mn(VII) or Mn(VII-x), where x is between 0 and 1.

Manganese oxide is synthesized through a reaction between two or more of the following precursors: salts of a manganese wherein the anion is sulfate, nitrate, chloride, acetate, phosphate, perchlorate, fluoride, or bromide. The precursor may also be a permanganate of sodium or potassium. These precursors are reacted with an appropriate mixture of base such as but not limited to lithium hydroxide, sodium hydroxide, potassium hydroxide, calcium hydroxide, along with a source of oxygen such as dissolved oxygen gas, hydrogen peroxide, or other peroxides and oxygen rich molecules. The presence of an external oxidant chemical catalyst may or may not be included. Following this redox chemical reaction, the as-obtained product may or may not be subjected to hydrothermal treatment.

In some embodiments, a binder-free cathode is deposited on a current collector substrate using methods including, but not limited to, chemical vapor deposition, physical vapor deposition, atomic layer deposition, spin-coating, atomic layer deposition and/or electrochemical deposition. The thickness of such a cathode can range between 1 nm and 1 mm.

Material Properties of a Manganese Oxide:

Manganese oxide may possess a turbostratic structure or a highly oriented layout comprising several manganese oxide sheets. The particles may be composed of sheets ranging from 10 nm to 500 micrometers in dimension. These sheet layers may be converted to a variety of spinel, tunnel, sandwich, or encapsulated and entrapped structures, which may or may not contain guest ions or molecules or a combination of guest ions and guest molecules. Possible guest ions include, but are not limited to, one or a plurality of sodium, lithium, potassium, calcium, zinc, bismuth, copper, lead, cobalt, nickel, magnesium, aluminum, hydrogen, hydronium, hydroxide, oxide-hydroxide, sulfate, sulfide, nitride, nitrate, phosphide, phosphate and acetate. Possible guest molecules include, but are not limited to, one or a plurality of water, oxides, hydroxides, oxide-hydroxides, sulfides, sulfates, nitrides, nitrates, phosphides and/or phosphates of sodium, lithium, potassium, calcium, magnesium, aluminum, manganese.

In addition, these sheets can be subjected to a spheroidization process to yield a spherical structural morphology. The particles may be composed of spheres ranging from 10 nm to 500 micrometers in diameter. It is also possible to have a mixture of spherical and sheet-like morphology of a manganese oxide. The material may be either a structured material which accepts guest ions, guest molecules or a combination of both, or a regular ordered crystalline material that contains sites/vacancies that accept guest ions, guest molecules or a combination of both.

The interlayer distance (d-spacing [001]) of a manganese oxide ranges between 1 Å and 50 Å. Exfoliation of the interlayer distance is achieved through an ion exchange process including, but not limited to, one, more or a combination of the following ions: lithium, calcium, aluminum, sodium, magnesium and potassium. A wide variety of pillaring agents can also be employed, including but not limited to polyoxometallates (POMs), amphiphilic molecules, and both polar and non-polar organic molecules. The aforementioned ions and/or molecules are inserted between manganese oxide sheets, thereby expanding the interlayer d-spacing in order to accommodate the ions, and in turn increasing the surface area of the materials. These ions/atoms/molecules may exist in their ionic form through weak physical or chemical bonding with manganese oxide or react with one, more or a combination of groups formed during the synthesis process including but not limited to manganese hydroxide, manganese oxide hydroxide, hydroxide, chloride, sulfate, acetate, phosphate and nitrate, leading to a further increase in the interlayer d-spacing. These ions or their respective stable compounds may remain between the sheets of a manganese oxide or they may be removed through several cycles of washing. These guest ions, pillaring agents, and molecules may exist at edge sites, triple corner sharing or similar vacancies, or anywhere in the normal crystalline plane of the manganese oxide.

Structural Configuration of Cathodes:

Manganese oxide may be deposited on a conductive substrate as a thin film or a coating comprising of nanoparticles, microparticles or a combination of nanoparticles and microparticles. A thin film of a manganese oxide may be deposited by techniques including, but not limited to, physical vapor deposition, chemical vapor deposition, atomic layer deposition and thermal evaporation. On the other hand, coatings of nanoparticles and/or microparticles may be deposited by techniques including, but not limited to, doctor blade, slot die, electrochemical deposition, comma coating, and spin coating or other similar manufacturing methods. In addition, coatings may further comprise polymer binders including, but not limited to carboxymethyl cellulose, styrene butadiene rubber, polyvinyl alcohol, alginate, polypropylene, poly-tetrafluoro ethylene, and/or conductive carbon additives.

Conductive substrates on which the cathode may be deposited (or coated) include, but are not limited to, foils and plates of stainless steel, copper, carbon, silver, gold, platinum, tin, vanadium, zinc, tin oxide, indium, indium tin oxide, aluminum, nickel, tungsten, chromium and titanium. In addition, the foils and plates may be coated with thin films of adhesion promoters, conductivity promoters or a combination of adhesion promoters and conductivity promoters.

Figure 9A:
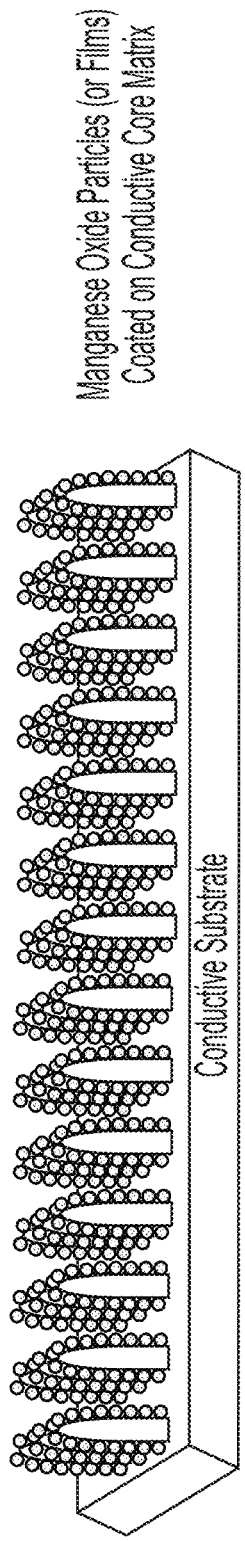
FIG. 9A shows manganese oxide particles coated on a porous conductive matrix comprising a conductive substrate (e.g., foil or plate) and an array of conductive structures, according to illustrative embodiments of the present disclosure.
Figure 9C:
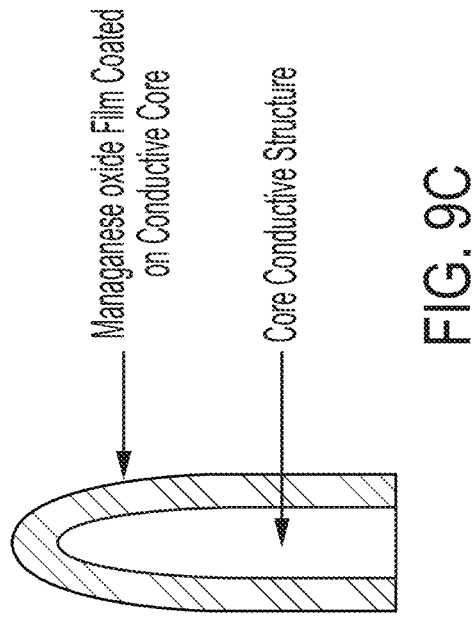
FIG. 9C shows a cross section of a manganese oxide film coated on a core conductive structure, according to illustrative embodiments of the present disclosure.
Figure 9B:
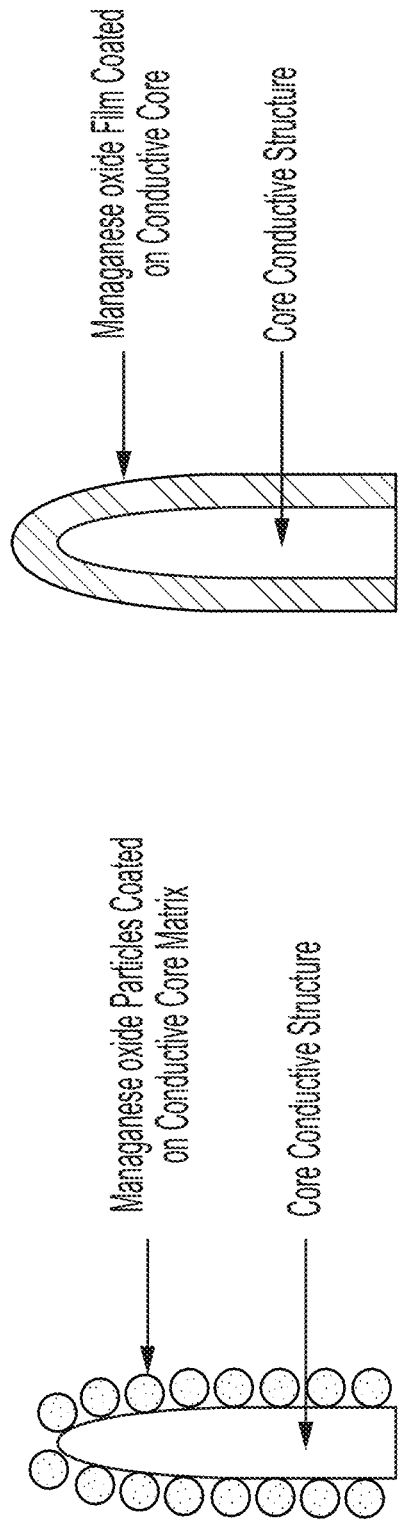
FIG. 9B shows a cross section of manganese oxide particles coated on a core conductive structure (e.g., as in FIG. 9A), according to illustrative embodiments of the present disclosure.

In certain embodiments, the conductive substrate is a porous structure such as mesh, foam, fibers or nanostructures and/or microstructures, for example, of one or a plurality of the following: stainless steel, carbon, silver, gold, platinum, tin, vanadium, zinc, tin oxide, indium, indium tin oxide, copper, aluminum, nickel, tungsten, chromium and titanium. FIGS. 9A-9C show examples of such cathodes. In FIG. 9A, a matrix of conductive core fibers or nanostructures and/or microstructures is coated with manganese oxide particles (or films). Details of single structures from such a matrix are shown in FIGS. 9B-9C. FIGS. 10A-10B also show examples of coated porous structures.

Figure 11:
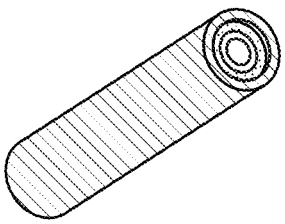
FIG. 11 shows an example of manganese oxide films deposited on an external or internal surface of a carbon nanotube (CNT), according to illustrative embodiments of the present disclosure.
Figure 11:
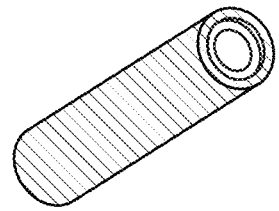
Figure 11:
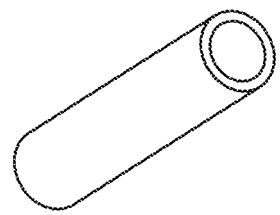

In some embodiments, the cathode may be coated on a high surface area, porous carbon, including but not limited to, one or more of carbon nanotubes (CNT), fullerenes, graphene and/or partially reduced graphene oxide. The high surface area, porous carbon may serve as a stand-alone film and current collector, may be grown directly on a conductive substrate, or may be added into a slurry to be coated on to a current collector substrate. Manganese oxide may be coated on such conductive carbon additives through slurry-based approaches or thin film deposition techniques, for example in morphologies shown in FIG. 11.

In some approaches, porosity may be achieved in the cathodes through the use of sacrificial materials such as one or more polymers including, but not limited to monomers, oligomers, and polymers or copolymers of, alizarin, amidinate, quinone, alginate, zeolite, quinoline, hydroxyquinone, crown ethers, and hydroxyquinoline, or other similar chelating or coordinating complexes, silicon, copper, cobalt, chromium, nickel, iron and oxides, hydroxides, sulfates, nitrates and phosphates of silicon, copper, cobalt, chromium nickel and iron. The sacrificial material can be co-deposited with manganese oxide (such as simultaneous thermal evaporation, simultaneous sputtering and co-extrusion) or mixed with manganese oxide, conductive carbon and polymer binders in a slurry that is then coated on to a conductive current collector. The sacrificial material can be removed ex situ through processes including, but not limited to, etching, plasma, thermal treatment, ion-exchange and chemical reactions where the sacrificial polymer forms an insoluble precipitate and can be removed through washing. In some approaches, the sacrificial material can be removed in situ during storage or operation of the electrochemical cell through processes such as ion-exchange.

Aluminum-accepting polymers: Apart from manganese oxide or aluminosilicates, certain polymers are also presently found to be viable candidates for the electrochemical cell. Such polymers may include, but are not limited to, monomers, oligomers, and polymers or copolymers of, alizarin, alginate, amidinate, quinone, quinoline, hydroxyquinone, crown ethers, and hydroxyquinoline and other coordinating or chelating complexes. These polymers may further exist in the form of complexes with one or more ions including, but not limited to lithium, sodium, lead, chromium, copper, bismuth, cobalt, zinc, potassium, aluminum, calcium, magnesium, manganese, iron, cobalt, titanium, tin, vanadium and tungsten. Further, the ions forming monomeric, oligomeric, polymeric and copolymeric complexes may also participate in the electrochemical reaction through an ion exchange process with aluminum ions from the electrolyte and/or the aluminum source electrode during charge and vice versa during discharge.

Phase of Cathode Material:

In certain embodiments, a cathode comprises one or more phases of a manganese oxide where the one or more phases include, but are not limited to, one or more of alpha, beta, lambda (k), Ramsdellite, amorphous, gamma, delta and epsilon (c). In some embodiments, a cathode comprises a primary phase of a manganese oxide and one or more of a secondary and a tertiary phase of a (e.g., the) manganese oxide. In some cases, a cathode may comprise four or more phases of a manganese oxide. The concentration of each phase present can be 100 wt. % for single-phased compositions or range, for example, from 0.1 wt. % to 99.9 wt. % for multi-phase compositions. For example, in certain embodiments the primary phase constitutes at least 40 wt. % of a cathode. In some embodiments, other present phases (e.g., secondary and, optionally, tertiary) constitute less than 50 wt. % of the cathode. In certain embodiments, one or more phase undergoes transition to one or more other phase(s) during charge and/or discharge of an electrochemical cell. In some embodiments, the cathode comprises one or more structures (e.g., particles) that comprise a manganese oxide and the manganese oxide is largely (e.g., at least 70 wt %, at least 80 wt %, or at least 90 wt %) delta phase manganese oxide. In some embodiments, cathodes that use delta phase manganese oxide or a higher percentage of delta phase manganese oxide perform better than cathodes that use other phase(s) of manganese oxide, including those where another phase of manganese oxide (e.g., gamma phase) reversibly transitions phases during charge cycling (e.g., between gamma and delta phase).

In addition to the phase, manganese oxide may also be defined, at least in part, by its structure. This may include one or a combination of layered structures (e.g., phyllomanganate), tunnel structures (e.g., tectomanganate), spinels, ramsdellites and amorphous. In some embodiments, the cathode comprises a manganese oxide wherein manganese is coordinated octahedrally to six oxygen atoms wherein none, any, or all of the oxygens can be replaced with hydroxides or Reutschi vacancies (e.g., protonated Mn vacancies).

In some embodiments, a manganese oxide in the cathode may comprise of manganese of one or more oxidation states selected from the group consisting of Mn(II), Mn(II-x), Mn(III), Mn(III-x), Mn(IV), Mn(IV-x), Mn(V), Mn(V-x), Mn(VI), Mn(VI-x), Mn(VII) and Mn(VII-x), where x is between 0 and 1.

Current Collector Substrate for Cathode:

In some embodiments, the current collector substrate is carbon or other conductive metal or metal oxide substrates including, but not limited to tin, tin oxide, indium, indium tin oxide, tungsten, vanadium, stainless steel, nickel, zinc, aluminum, copper, chromium, titanium, bismuth, silver, gold, platinum, iron, iron oxide and molybdenum. In certain embodiments, the current collector substrate is further coated with one or more of a film, wherein the film comprises of carbon, metals and/or their corresponding metal oxides (including but not limited to tin, tin oxide, indium, indium tin oxide, tungsten, vanadium, stainless steel, nickel, zinc, aluminum, copper, chromium, titanium, bismuth, silver, gold, platinum, iron, iron oxide and molybdenum) and polymers (including but not limited to PTFE, PVDF, parylene, PEDOT, polyaniline, polypropylene and cellulose). In certain embodiments, the films improve adhesion. In certain embodiments, the films improve electron conductivity. In certain embodiments, the films are impermeable to one or more ions, wherein the ions include but are not limited to metallic ions such as calcium, potassium, aluminum, lithium, sodium, magnesium, manganese, cobalt, chromium, nickel, zinc and iron. In other embodiments, the films are impermeable to ionic complexes including one or more or a combination of complexes with oxygen, complexes with hydrogen (including hydroxides and oxide-hydroxide), complexes with nitrogen (including nitrides, nitrates), complexes with phosphorus (including phosphides, phosphates), complexes with sulfur (including sulfides, sulfates), and complexes with halides.

Binder Composition

Figure 12:
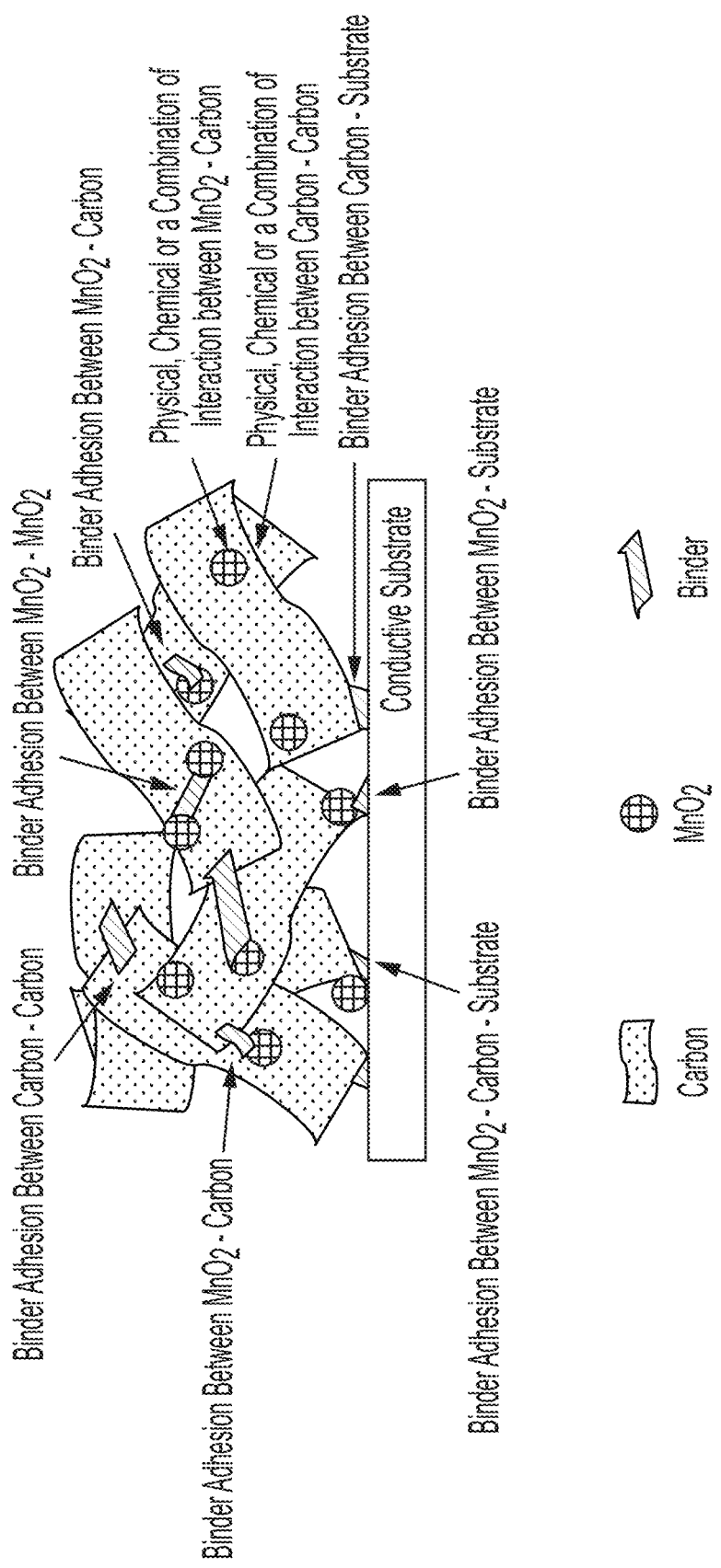
FIG. 12 shows a binder used in a slurry-based electrode composition, according to illustrative embodiments of the present disclosure.

In some embodiments, a polymer binder is selected to ensure both cohesion between active electrode particles and adhesion to the conductive carbon particles as well as adhesion between the electrode structure and the current collector substrate, for example as shown in FIG. 12. The ratio of the polymer binder is typically between 0.5 to 50-weight % of the total electrode solids.

Useable polymer binders include, but are not limited to one or more of cellulose and its derivatives such as carboxymethyl cellulose and cellulose acetate, styrene, styrene butadiene rubber and other similar butadiene rubbers, polysulfone, alginate (alginic acid, calcium alginate, sodium alginate, aluminum alginate, zinc alginate, magnesium alginate, and similarly multivalent ion cross-linked derivatives and combinations therein), alizarin and its derivatives such as alizarin red S, quinone, hydroquinone, quinoline, hydroquinoline, and polyvinyl alcohol. These monomer, oligomer, and polymer and copolymer binders may further comprise of ionic complexes with one or more ions including, but not limited to, lithium, sodium, potassium, aluminum, calcium, magnesium, manganese, iron, cobalt, titanium, tin, vanadium and tungsten. The ionic complexes may further be formed through in situ or ex situ ion exchange steps. An in situ ion exchange would involve an exchange of ions from one or more of the electrolytes, aluminum source electrode and aluminum host electrode either prior to cycling through osmotic, electrophoretic, or similar driving forces, or during the formation cycle of the battery chemistry. An ex situ ion exchange would involve an exchange of ions from a solution during the slurry formulation process, whereby the aqueous slurry would contain relevant salts to enable the ion exchange process. The purpose of the ion exchange process is to ensure improved mechanical robustness of the binders and hence, of the electrode structure.

Figure 13:
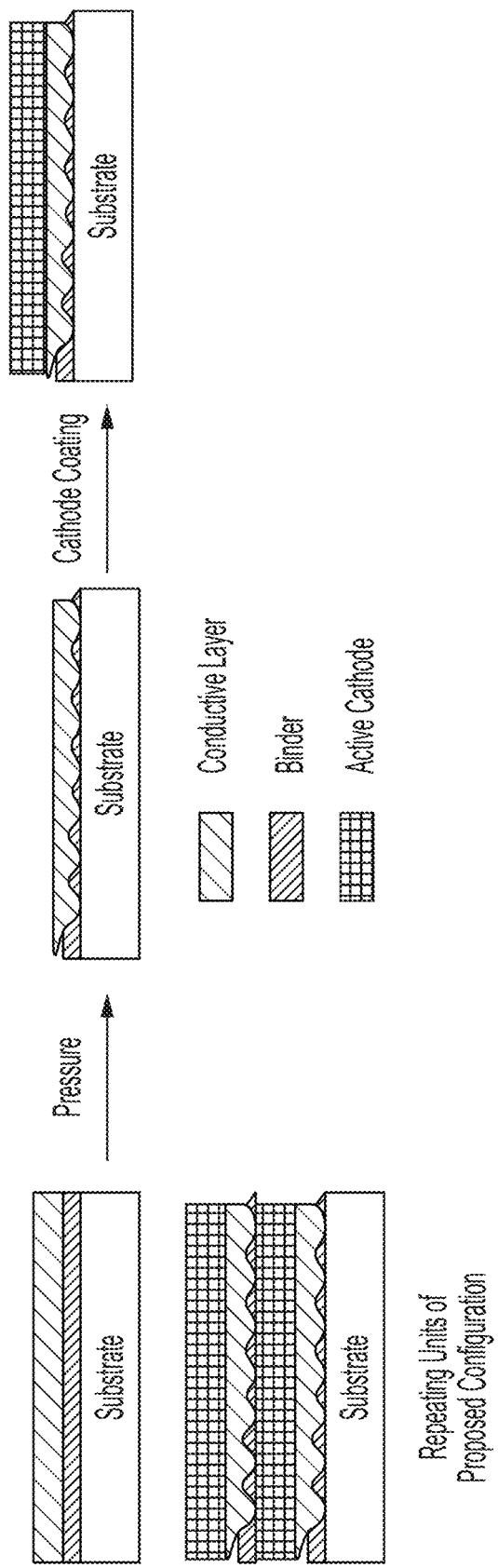
FIG. 13 shows a process of making a binder-conductive layer-active cathode structural configuration (top) and an example of a configuration with multiple repeating units of binder-conductive layer-active cathode (bottom), according to illustrative embodiments of the present disclosure.

In some approaches, the binder may be coated on to a conductive substrate as a thin film, with thickness ranging between 1 nm and 10 micrometers. A conductive layer, such as carbon, tin, titanium, chromium, nickel, gold, silver, platinum and other similar materials is then coated on top of the binder film, with thickness ranging between 1 nm and 10 micrometers. The composition is then subjected to pressure through processes including, but not limited to, compressive force, tensile force, shearing, hot pressing, sintering and calendering. Following this, the active cathode materials (manganese oxide, aluminosilicates, polymers) are coated directly on top of the carbon film. Such a configuration can also be used as repeating units to achieve scalability, improve electrode utilization and increase rate capability, for example as shown in FIG. 13 (showing a process (top) for making multiple repeat units (bottom) is shown).

If the adhesion between the active cathode material and the underlying conductive substrate is not ideal, a second layer of binder may be used to coat the conductive layer, followed by coating of the active cathode material and finally, subjecting this multi-layer structure to a pressure, as described above.

It may also be possible to eliminate the use of a conductive layer from the aforementioned approaches and coat the active cathode material directly on to the thin binder film, followed by subjecting this configuration to pressure, as described above.

Alginate Binders:

In some embodiments, a cathode includes a binder. In some embodiments, a cathode includes an alginate binder. An alginate binder may be combined with another binder, such as PVP. In some embodiments where alginate is present (e.g., in a cathode), a multivalent ion is included. Useable multivalent ions include, but are not limited to, ions of manganese, magnesium, calcium, zinc, barium and aluminum. In some embodiments, a monovalent ion is included. For example, a binder may include alginate and ions of one or more of lithium, sodium, and potassium. Ions that can be used in ionic pre-treatments for cathodes including a binder, such as PVP-alginate, include but are not limited to ions of sodium, potassium, magnesium, manganese, aluminum, calcium, barium, strontium and zinc. Inclusion of an ion (e.g., a multivalent or monovalent ion) with a binder may induce mechanical strengthening and/or electrochemical stability.

Other polymer binders may be used with a monovalent and/or multivalent ion. Some examples include, but are not limited to, polyvinylidene difluoride (PVDF), PTFE, polyaniline, epoxies, carboxymethyl cellulose, rubber, styrene butadiene rubber, polyacrylic acid, polyvinyl alcohol and polyvinyl propylene. The solvents in which such binders are dispersed (e.g., during cathode fabrication) may include but are not limited to water, n-methyl pyrrolidone, ketones, glycols, dimethyl sulfoxide (DMSO) and esters. A co-solvent may be additionally used. Useable co-solvents include but not limited to water, n-methyl pyrrolidone, ketones, glycols, DMSO and esters.

Hybrid Battery-Capacitor

A hybrid battery-capacitor can be implemented using any of the aforementioned composition of anode, cathode, and/ or electrolyte. Such a system may involve one or a plurality of a pseudocapacitor additive, including but not limited to graphene, graphene oxide, carbon nanotubes, fullerenes, carbon aerogels, vanadium oxide, titanium oxide, molybdenum oxide, ruthenium oxide, polypyrrole and poly(3,4-ethylenedioxythiophene) and/or a dielectric additive, including but not limited to titanium oxide, silicon oxide, zirconium oxide, parylene or other conjugated polymers, polystyrene and polypropylene. The pseudocapacitor or dielectric material may comprise of 0.1 weight % to 90 weight % of the net electrode weight and can be in the form of thin films, nanostructures, microstructures, particles or a combination of one or more of such structures.

An example of such a battery-capacitor hybrid concept is described as follows:

Anode Structure: An aluminum foil is coated with a thin film of zirconium oxide, followed by a film of aluminum and finally, a film of aluminum oxide, for example as shown in FIG. 14 panel (A).

Cathode Structure: A stainless-steel current collector substrate is coated with a thin film of aluminum, followed by a thin film of aluminum oxide. A thin film of a manganese oxide cathode is then deposited on top of the stainless-steel-aluminum-zirconium oxide structure, for example as shown in FIG. 14 panel (B).

Figure 14:
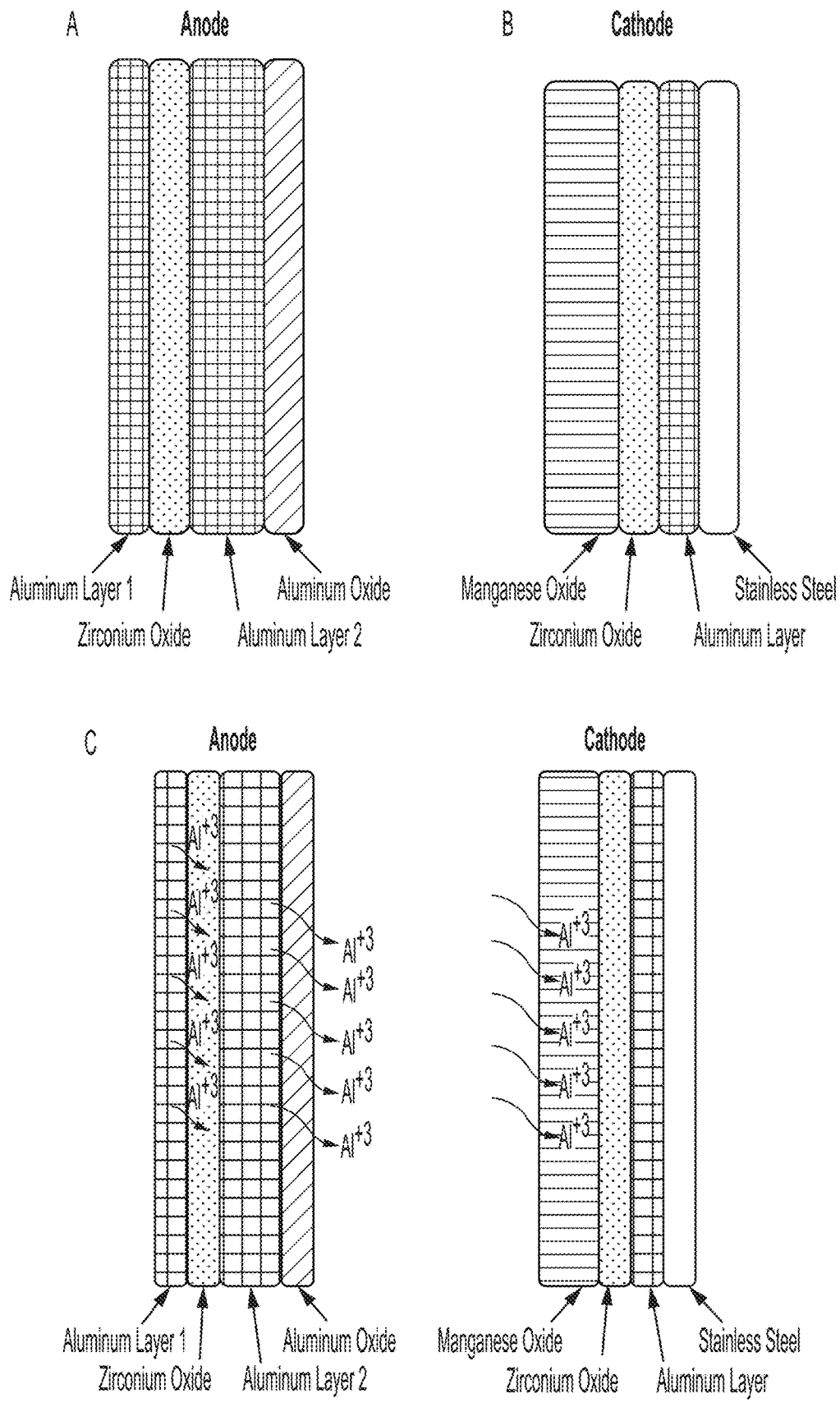
FIG. 14 shows (A) structural composition of a viable hybrid battery-capacitor anode, (B) structural composition of a viable hybrid battery-capacitor cathode, (C) shows reaction chemistry during discharge (involving transport of aluminum ions from anode to cathode), and (D) shows reaction chemistry during discharge (involving transport of aluminum ions from cathode to anode), according to illustrative embodiments of the present disclosure.
Figure 14:
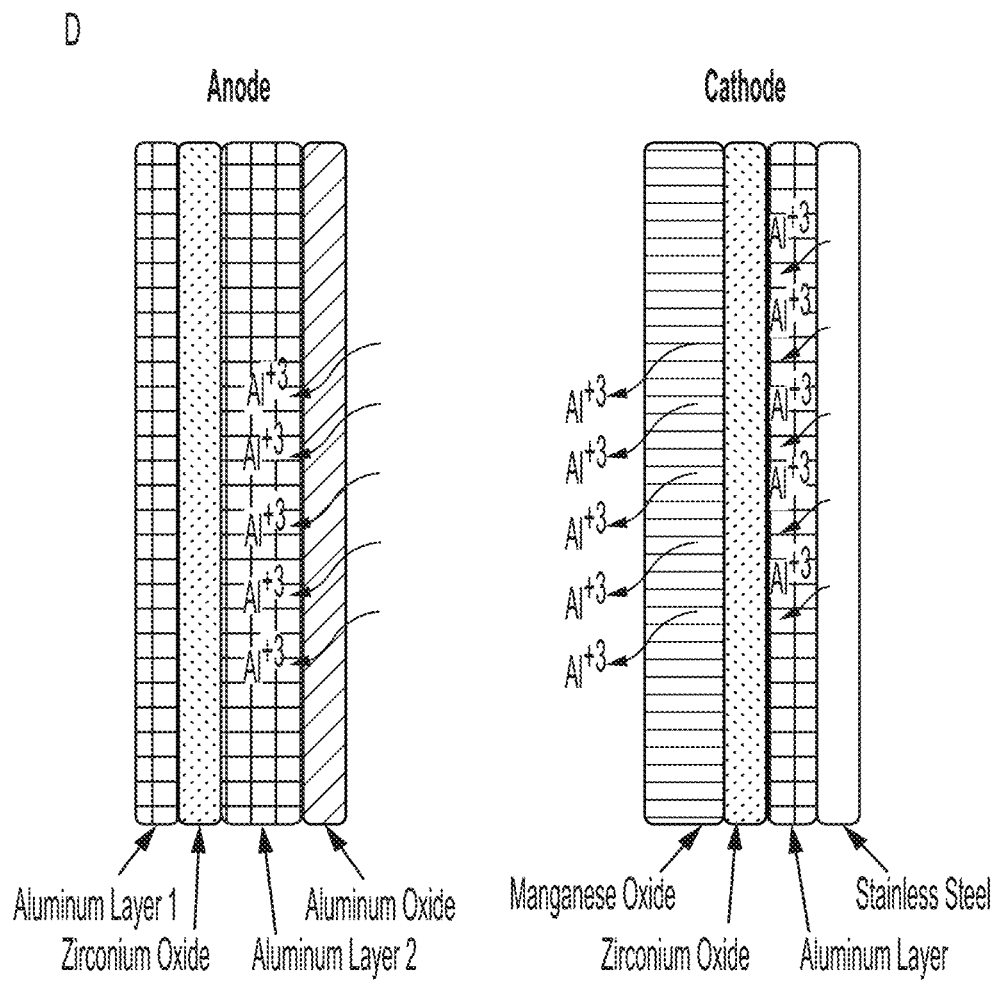

Anode Reactions During Discharge (shown, for example, in FIG. 14 panel (C)): When aluminum ions are transported from the anode to the cathode during discharge, zirconium oxide acts as a dielectric layer with aluminum layer-1 acting as the source of aluminum ions for the dielectric. Aluminum layer-2 acts as the source of aluminum ions for battery-reaction kinetics, involving a transport of these ions from the anode to the cathode. Aluminum oxide layer acts as a protective oxide layer to prevent corrosion and undesirable side-reactions with underlying aluminum.

Cathode Reactions During Charge (shown, for example, in FIG. 14 panel (D)): When aluminum ions are transported from the manganese oxide cathode back to the aluminum anode during charge, zirconium oxide layer acts as the dielectric layer and the underlying aluminum film acts as the source of aluminum ions for the dielectric.

Dielectric kinetics permit very fast charge-discharge while battery kinetics contribute to high energy densities. Such a system would therefore be able to combine both high power densities and high energy densities.

EXAMPLES

In order that the disclosure may be more fully understood, the following examples are set forth. It should be understood that these examples are for illustrative purposes only and are not to be construed as limiting in any manner, for example with respect to any claim. Unless otherwise clear from context, features from any one or more examples can be combined with features from any one or more other examples and/or with any one or more other features disclosed herein.

Example 1: Experimental Data for Aqueous Aluminum Ion Battery

Figure 15:
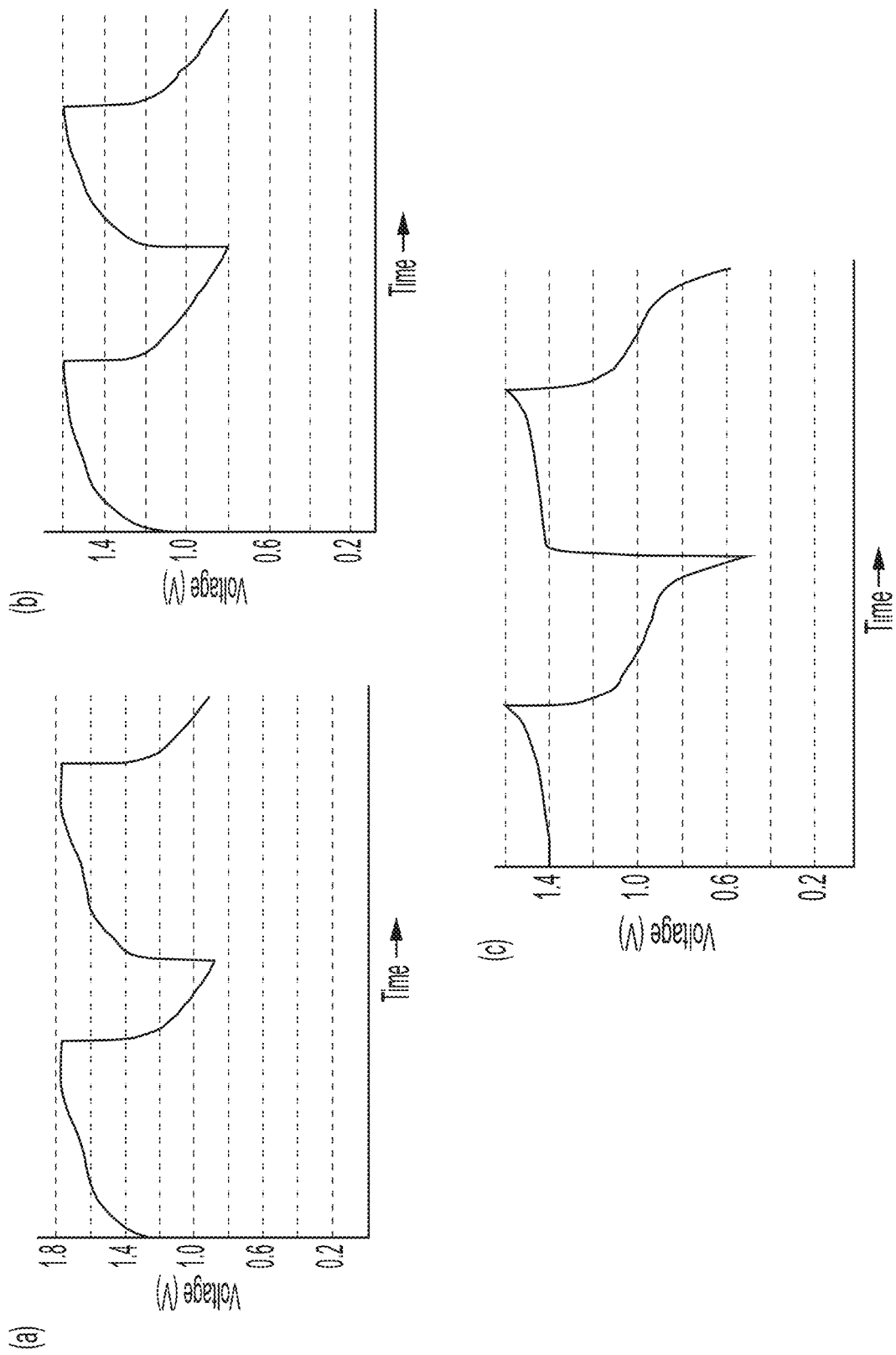
FIG. 15 shows voltage profiles of a hydrated sodium-inserted manganese oxide cathode assembled against a polished aluminum anode and cycled at a constant current density of ~20 µA/cm$^2$, according to illustrative embodiments of the present disclosure.

FIG. 15 shows voltage profiles of a hydrated sodium-inserted manganese oxide cathode assembled against a polished aluminum anode and cycled at a constant current density of ~20 $\mu A/cm^2$. The electrolyte composition is 0.1 M $Al(NO_3)_3$+2 M $LiNO_3$, corresponding to a pH in the range 3-3.5. As the particle size of manganese oxide is reduced, a more prominent voltage plateau becomes evident, corresponding to a subsequent increase in charge storage capacity as well as rate capability. Particles with dimensions ranging less than (a) 45 μm and between (b) 20-45 μm typically deliver capacities between 50 and 150 mAh/g, sometimes higher than 200 mAh/g, at rates of C/4 and slower (a rate of C/n indicates charge or discharge in n hours). When the particle size is (c) <1 μm, manganese oxide cathodes can deliver capacities in excess of 150 mAh/g, often higher than 200 mAh/g, at rates of C/2 and slower.

In certain embodiments, the battery operates in a pH range of 3-5, although it is possible to cover a much wider range of pH. For example, low pH (0.1-3) as well as higher pH (>3) may have certain advantages for certain embodiments—for example, it is believed an acidic electrolyte increases ionic mobility and aluminum diffusion kinetics while a basic electrolyte improves ion transportation kinetics and ionic stability in the electrolyte.

Figure 16:
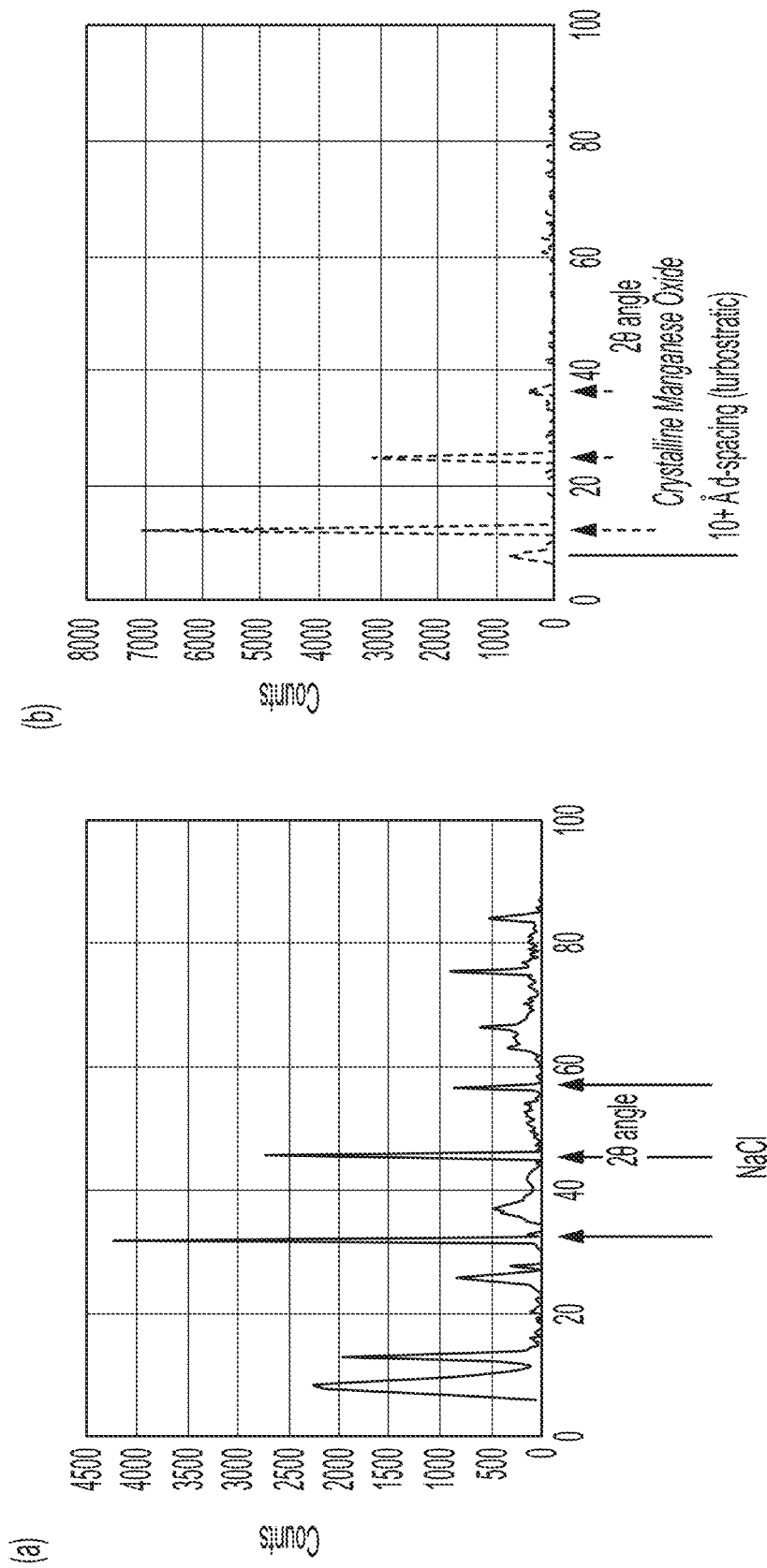
FIG. 16 shows X-ray diffraction results showing the presence of (a) sodium chloride residue in as-synthesized manganese oxide, and (b) evidence of high inter-sheet spacing, according to illustrative embodiments of the present disclosure.

The manganese oxide is synthesized from permanganate and manganese salt precursors, and guest ions are introduced to exfoliate the host material using bases and peroxide precursors, where the manganese oxide is a δ phase. Guest ions (e.g., sodium, potassium, aluminum, and/or other guest ions) are inserted through a wet chemical reaction to occupy interstitial sites, resulting in an exfoliation of the structure, as evidenced by an increase in inter-sheet spacing. FIG. 16 panels (a), (b) are graphs of x-ray diffraction results showing the presence of (a) sodium chloride residue in as-synthesized manganese oxide prepared through a reaction between a manganese salt and sodium permanganate; (b) following thorough washing steps, crystal structure of a manganese oxide becomes distinct, with clear evidence of a very high inter-sheet spacing.

Figure 17:
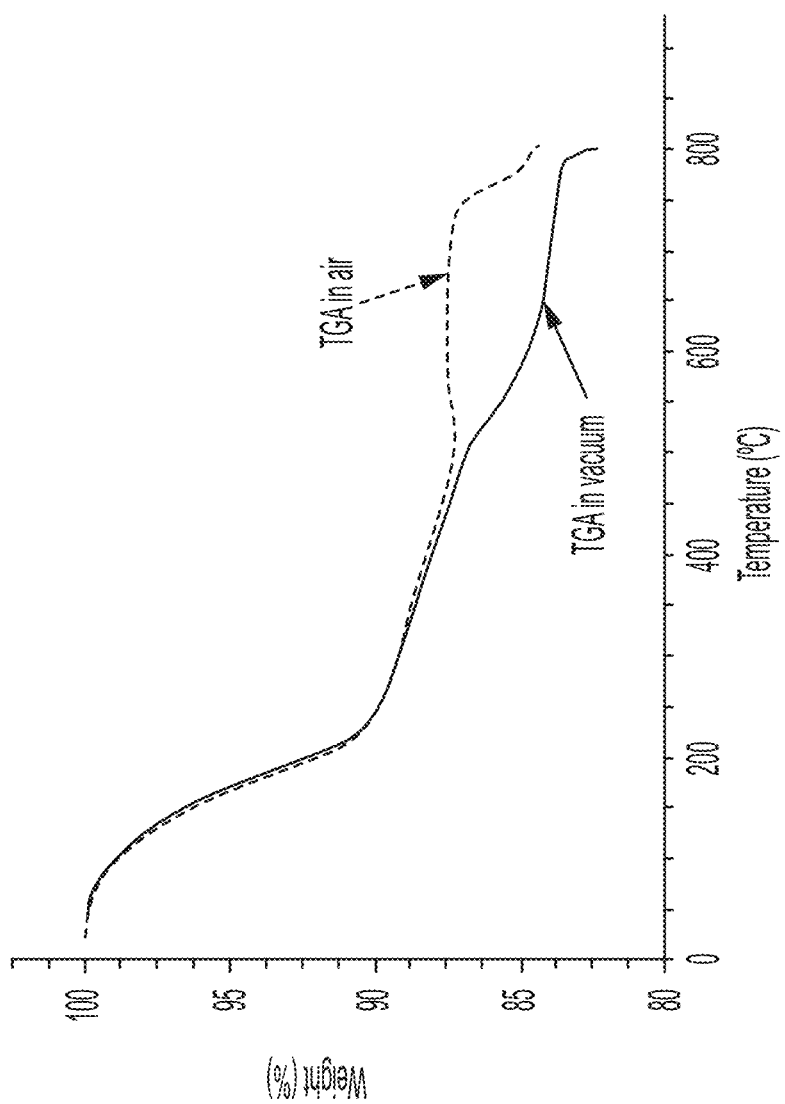
FIG. 17 shows thermogravimetric analysis (TGA) results providing evidence of water crystals within manganese oxide structure, according to illustrative embodiments of the present disclosure.

FIG. 17 is a graph showing results of a thermogravimetric analysis (TGA) in air and vacuum, confirming a significant concentration of water crystals within the manganese oxide structure. TGA in vacuum at 120° C. revealed a 7% loss in weight. In addition, TGA also indicates a loss of oxygen in an inert atmosphere up to 800° C. However, in air, TGA shows momentary gain of oxygen at 750° C., quickly followed by loss of water/oxygen at 800° C.

Example 2: Actual Transportation of Aluminum Ions Between the Electrodes

Several coin cells were assembled, each constituting the following components: (1) A cathode comprising 80 wt. % manganese oxide, 10 wt. % conductive carbon and 10 wt. % sodium carboxymethyl cellulose (CMC)-styrene butadiene rubber (SBR) binders (in a ratio of 1:1 wt./wt.); (2) an aluminum anode; (3) a glass microfiber separator; and an electrolyte composed of aluminum and lithium nitrate salts dissolved in grade II deionized water. Each coin cell was cycled for 10-50 charge-discharge steps to attain a uniform electrochemical equilibration. Following this, one group of cells were discharged (insertion of aluminum ions into manganese oxide cathode) for 8 hours, a second group of cells were discharged for 20 hours, a third group of cells were discharged for 32 hours and a fourth group of cells were discharged for 40 hours. All cells were disassembled at the end of their discharge times and the cathodes were washed with deionized water to remove salt traces from the surface. Scanning electron microscopy (SEM) and energy dispersive spectroscopy (EDS) were used to analyze the depth of penetration of aluminum ions into the manganese oxide cathode.

Figure 18:
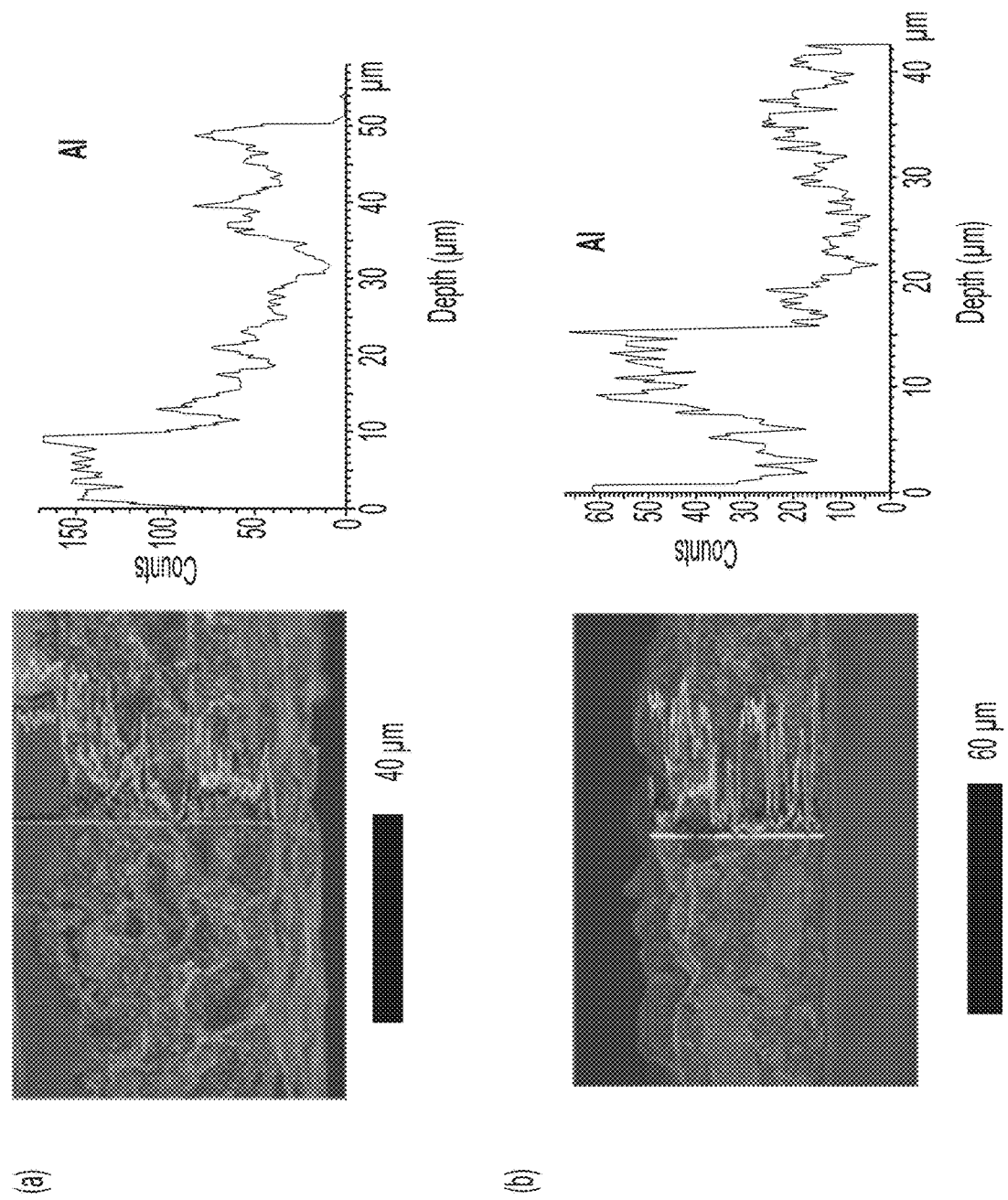
FIG. 18 shows cross-sectional scanning electron microscopy (SEM) images of cathode (left) and energy-dispersive spectroscopy (EDS) mapping of aluminum ions (right) after (a) 8 hours discharge, (b) 20 hours discharge, (c) 32 hours discharge, and (d) 40 hours discharge, according to illustrative embodiments of the present disclosure.
Figure 18:
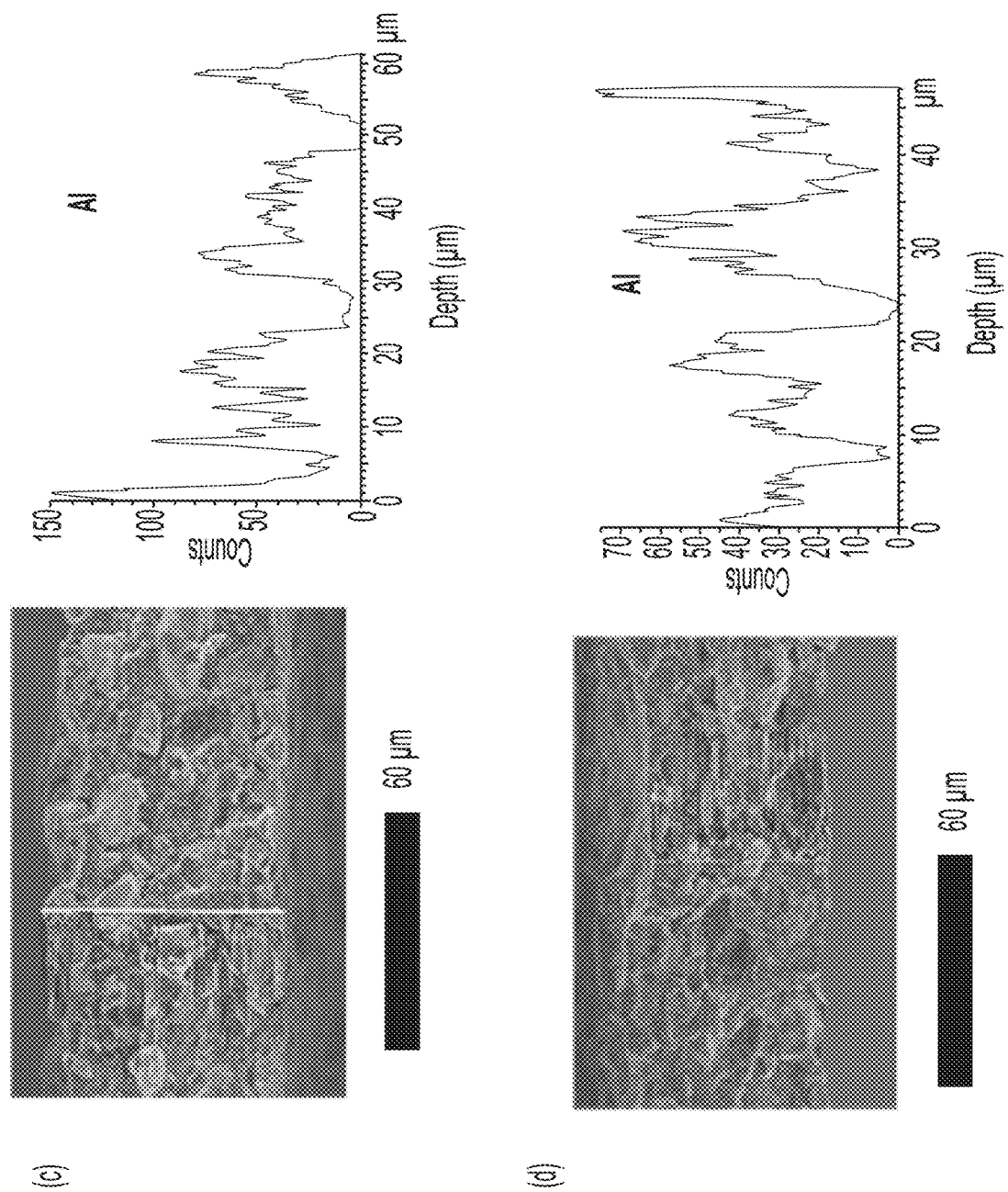

Cross-section SEM and EDS analyses clearly confirms insertion of aluminum ions into the cathode. Further, the depth of insertion as a function of discharge rate is visibly evident. It is understandable that shorter discharge times (such as 8 h, 20 h) will not allow aluminum ions to diffuse through the entire cross-sectional thickness of the cathode, as shown in FIG. 18 panels (a) and (b), where there is an accumulation of aluminum ions at the surface. However, as the discharge times are increased to 32 h and 40 h, allowing aluminum ions to diffuse deeper into the cathode, EDS profile clearly depicts a gradual insertion and distribution of aluminum ions through the bulk of the cathode, as shown in FIG. 18 panels (c) and (d). Tracing and mapping aluminum ions within the cathode as a function of discharge times conclusively proves actual physical transport of aluminum ions into the cathode.

Example 3: Aluminum Alloy Anode

Figure 19:
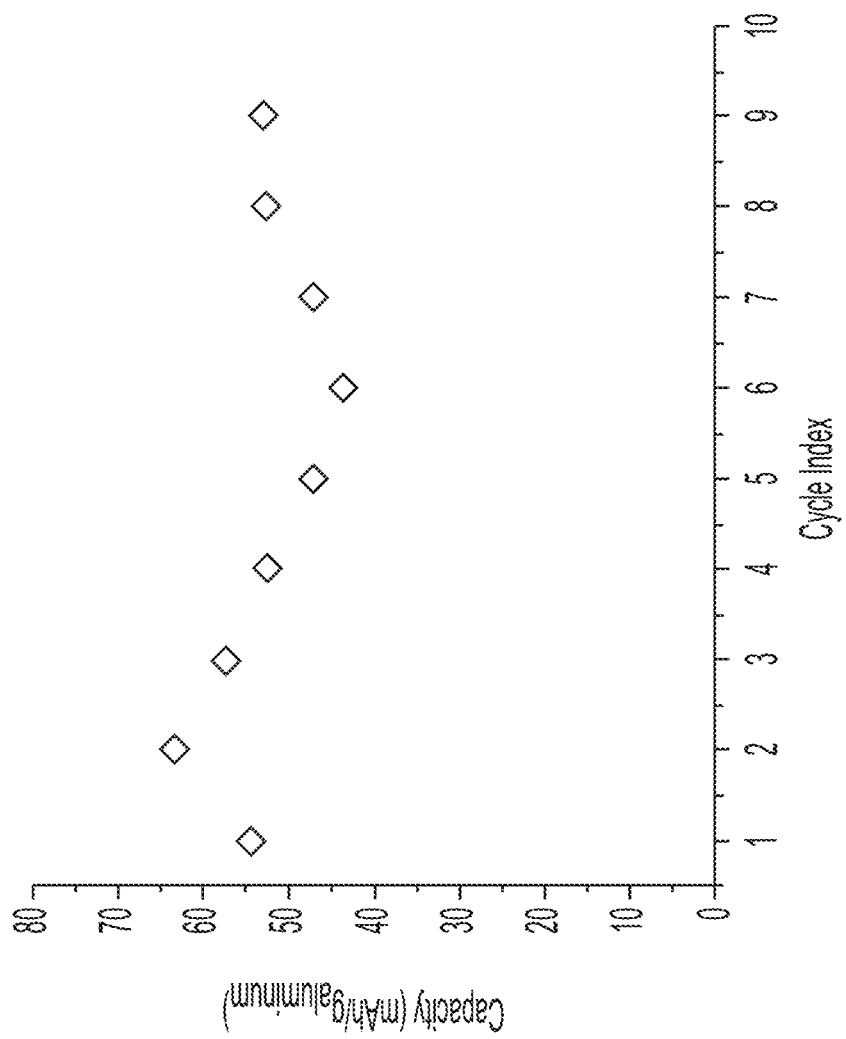
FIG. 19 shows capacity as a function of cycle index of an aluminum-manganese alloy anode, according to illustrative embodiments of the present disclosure.

In certain embodiments, an anode comprises an aluminum alloy that comprises one or more non-aluminum elements. An aluminum based alloy anode comprising 97 at. % aluminum and 3 at. % manganese was tested as an anode material. The electrolyte comprised of 13 wt. % lithium sulfate, 1.6 wt. % aluminum sulfate, 0.2 wt. % magnesium hydroxide, 3.1 wt. % N-methyl pyrrolidone and 0.1 wt. % magnesium ethoxide in an aqueous solution. The anode was tested against a manganese oxide cathode and a glass microfiber separator was used to isolate the two electrodes. The cell developed an average capacity of ~50 mAh/g at a charge-discharge rate of C/20, as shown in FIG. 19.

Example 4: Guest Ions/Molecules within Manganese Oxide Structure

Figure 20:
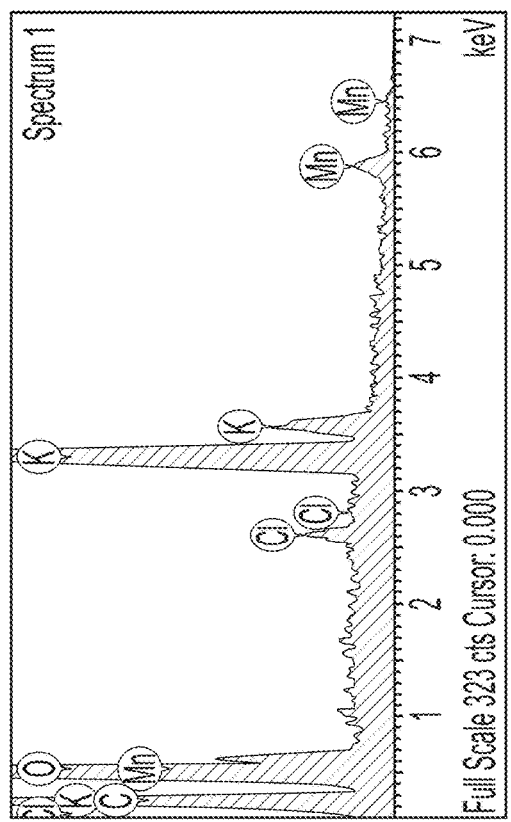
FIG. 20 shows (a) from left to right, top view SEM image and EDS mapping of manganese oxide with potassium guest atoms, and (b) voltage profile of a cell comprising manganese oxide with potassium guest atoms as the active cathode material, according to illustrative embodiments of the present disclosure.
Figure 20:
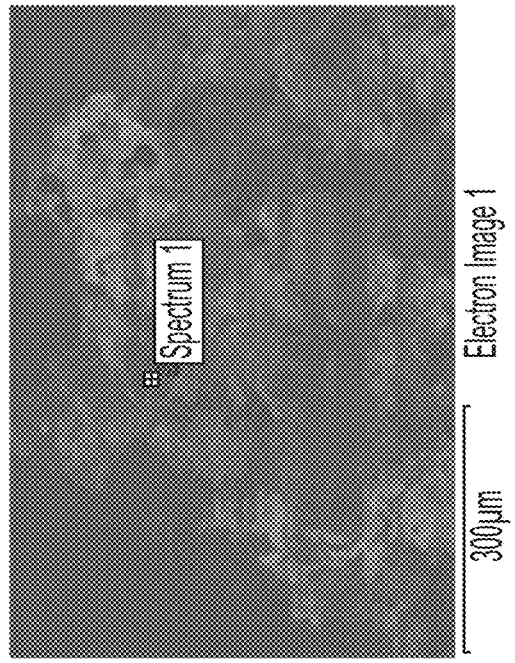
Figure 20:
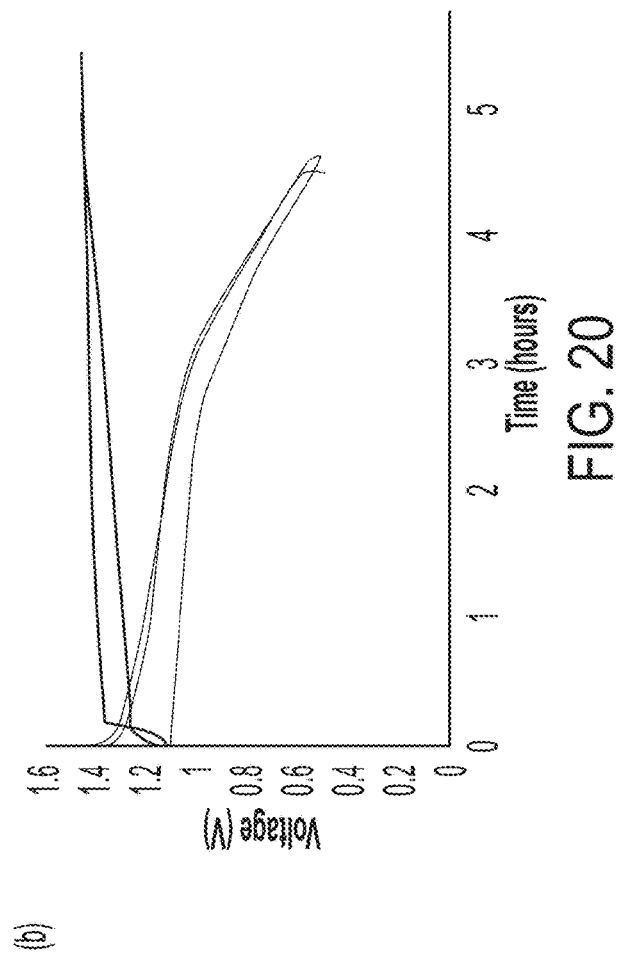

In certain embodiments, a cathode comprises one or more guest ions and/or molecules stored between sheets of a material (e.g., a manganese oxide). In one method, potassium was introduced as a guest ion through an ion exchange process with a chemically leached lithium manganese oxide cathode. First, a 1M HCl solution was used to chemically leach lithium from lithium manganese oxide. Following this, the chemically leached lithium manganese oxide cathode was washed several times. Finally, a solution of 0.1-5 M KOH was used as the medium for the ion exchange process. FIG. 20 panel (a) shows SEM and EDS elemental concentrations of as-synthesized manganese oxide with potassium guest ions. EDS results are summarized in Table 1 below.

Manganese oxide with potassium guest atoms were cycled as cathodes in coin cell configurations. The anode was a battery grade aluminum metal foil (purity 99.5% or higher) and the electrolyte consisted of aluminum and lithium nitrate salts in Grade II deionized water. Glass microfiber was used as the separator. The cathode delivered a reversible capacity of ~40 mAh/g at a charge-discharge rate of 4.5 hours (voltage profile shown in FIG. 20 panel (b)).

TABLE 1

| Element | Weight % | Atomic % |
| --- | --- | --- |
| C (K) | 4.84 | 12.71 |
| K (K) | 32.50 | 26.20 |
| Cl (K) | 1.20 | 1.07 |
| O (K) | 17.74 | 34.95 |
| Mn (K) | 43.71 | 25.08 |

Example 5: Binder Composition

Figure 21:
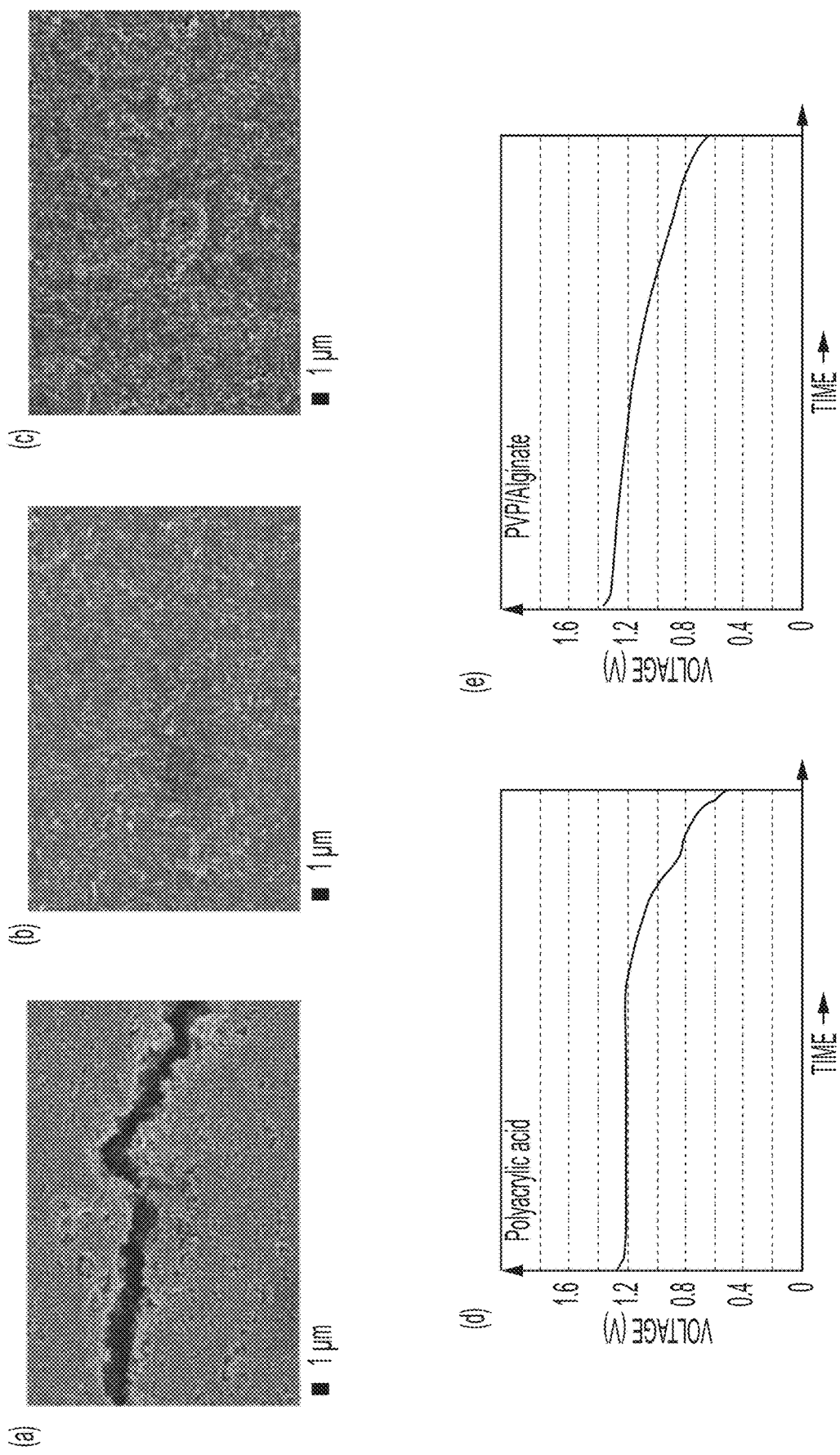
FIG. 21 shows SEM images of cathodes synthesized with (a) polyvinylpyrrolidone (PVP) binder, (b) PVP and alginate binders, and (c) polyacrylic acid binders, and discharge voltage profiles, as a function of time, with (d) polyacrylic acid binders, and (e) PVP/alginate binders, according to illustrative embodiments of the present disclosure.

In some embodiments, a cathode comprises a binder. The binder may physically maintain (e.g., adhere) one or more structures (e.g., particles) in contact with a current collector. In one example, an alginate and polyvinyl propylene (PVP) binder combination was used to prepare manganese oxide cathodes. A cathode coating prepared with just PVP binder served as a control experiment. SEM images show the presence of micron-scale porosity for cathodes coated with PVP binders, as shown in FIG. 21 panel (a). On the other hand, when alginate is combined with PVP, the cathode structure appears denser, as shown in FIG. 21 panel (b). PVP and alginate were found to work together to improve dispersion of conductive carbon, and adhesion and cohesion between active particles and conductive carbon, respectively.

Cells assembled using manganese oxide prepared with PVP binders and PVP-alginate binders were tested against an aluminum anode. In addition, cathodes incorporating polyacrylic acid-based (PAA-based) binders, with similar dense coating properties, were also tested as a baseline (FIG. 21 panel (c)). Cathodes incorporating PAA binders cycled at a stable voltage of 1.2 V, as shown in FIG. 21 panel (d), while cathodes with PVP-alginate binders displayed a discharge voltage profile with a gradual slope, with an average operating potential of ~0.9 V-1.1 V, as shown in FIG. 21 panel (e).

In an extension of this experiment, the cathode coated with PVP-alginate binders were immersed in a bath comprising 3 M manganese nitrate. In the presence of multivalent ions such as ions of manganese, alginate was found to exhibit an improved mechanical strength. Without wishing to be bound to any particular theory, the improved mechanical strength can likely be attributed to alginate's ability to form ionic associations within its structure and bonding networks between chains. Other usable multivalent ions include, but are not limited to, ions of magnesium and aluminum. Similar observations were also achieved with some monovalent ions including ions of lithium, sodium, and potassium. Ions that can be used in ionic pre-treatments for cathodes including a binder, such as PVP-alginate, include but are not limited to ions of sodium, potassium, magnesium, manganese, aluminum, calcium, barium, strontium and zinc.

In addition, other polymer binders have also been found to combine with monovalent and/or multivalent ions to induce mechanical strengthening and/or electrochemical stability. Some examples include, but are not limited to, polyvinylidene difluoride (PVDF), PTFE, polyaniline, epoxies, carboxymethyl cellulose, rubber, styrene butadiene rubber, polyacrylic acid, polyvinyl alcohol and polyvinyl propylene. The solvents in which such binders are dispersed may include but are not limited to water, n-methyl pyrrolidone, ketones, glycols, dimethyl sulfoxide (DMSO) and esters. A co-solvent may be additionally used. Useable co-solvents include but are not limited to water, n-methyl pyrrolidone, ketones, glycols, DMSO and esters.

Example 6: Patterned Anode Structure

Figure 22:
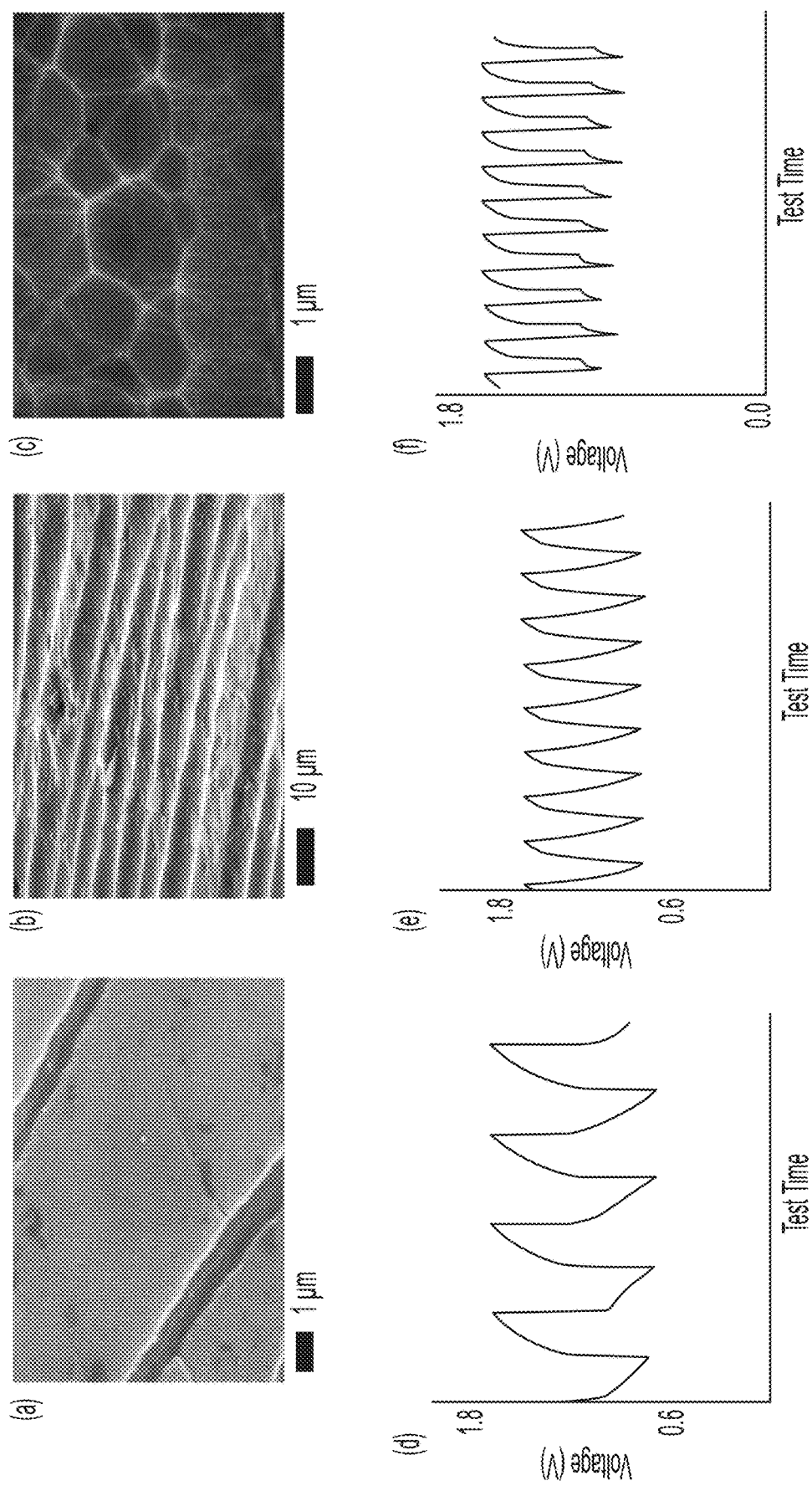
FIG. 22 shows (a), (b) SEM images of patterned aluminum anode; (c) SEM image of an un-patterned polished aluminum anode, (d), (e) voltage profile of cells with patterned aluminum anodes, and (f) voltage profiles of cell with un-patterned aluminum anode, according to illustrative embodiments of the present disclosure.

An anode may include an oxide layer (e.g., a transitional aluminum oxide layer). In one example, patterned aluminum anodes (SEM images in FIG. 22 panels (a), (b)) are used against standard cathodes comprising manganese oxide active material, conductive carbon and CMC-SBR binders. A control experiment is used, wherein the anode is comprised of an un-patterned aluminum anode (SEM image in FIG. 22 panel (c)) and the cathode comprises of a manganese oxide active material, conductive carbon and CMC-SBR binders.

Cells were cycled under constant current densities of 10 $\mu A/cm^2$. The voltage profiles of patterned aluminum anodes show a steady charge-discharge behavior for cycles 69-77 (FIG. 22 panel (d)) and cycles 30-34 (FIG. 22 panel (e)). On the other hand, voltage profile of un-patterned aluminum anode shows marked voltage hysteresis and noise between cycles 91-99 (FIG. 22 panel (f)). These profiles were consistent over the entire cycling range and specific ranges are depicted only for clarity.

Patterned aluminum anodes were found to facilitate efficient and uniform ion diffusion into and out of the structure. Without wishing to be bound by any particular theory, it is generally believed that high surface area, as achieved through patterning and other similar approaches, would lead to thicker solid electrolyte interface films attributed to the presence of a higher surface area. This in turn would result in increased impedance and internal resistance and lead to an overall drop in ion diffusion kinetics and capacity. However, unexpectedly, the electrochemical environment and the precise cell composition were instead observed to promote reaction kinetics in the proposed battery technology.

Example 7: Secondary Composition of Anode

An anode may include one or more oxide thin film(s) and/or coatings (e.g., of nanoparticles and/or microparticles). In one example, an aluminum anode was sputter coated with a 60 nm film of zirconium oxide. The aluminum-zirconium oxide composite anode was tested in a three-electrode system against a manganese oxide (in this case $MnO_2$) counter electrode and Ag/AgCl reference electrode. The electrolyte consisted of aluminum and lithium salts dissolved in grade II deionized water.

Figure 23:
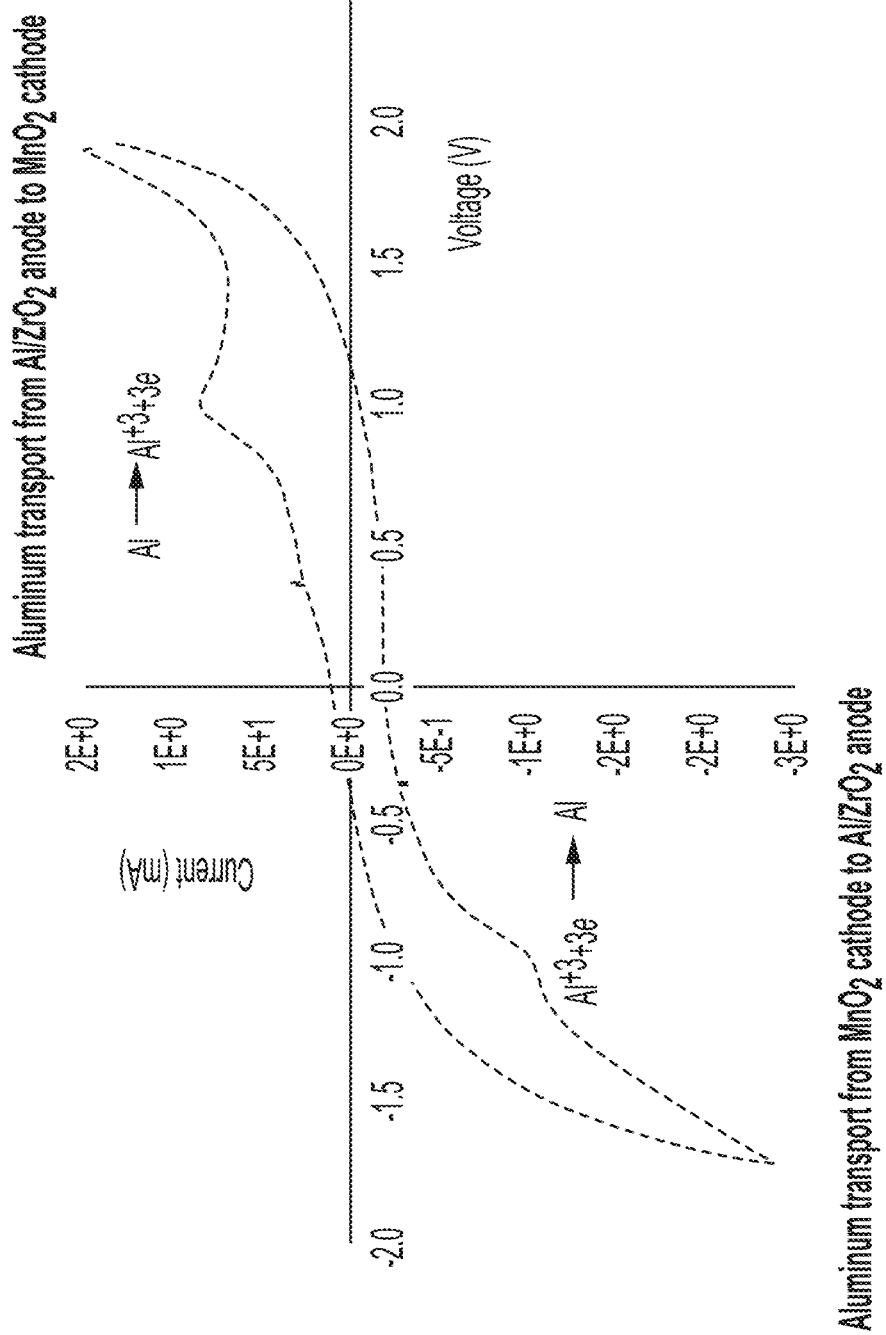
FIG. 23 shows cyclic voltammetry of a three-electrode system comprising aluminum/zirconium oxide working electrode, manganese oxide counter electrode and Ag/AgCl reference electrode, according to illustrative embodiments of the present disclosure.

Cyclic voltammetry shows clear redox peaks at ±1V (vs Ag/AgCl), corresponding to aluminum extraction from anode and insertion into the cathode, as shown in FIG. 23.

Example 8: Secondary Composition of Anode

Figure 24:
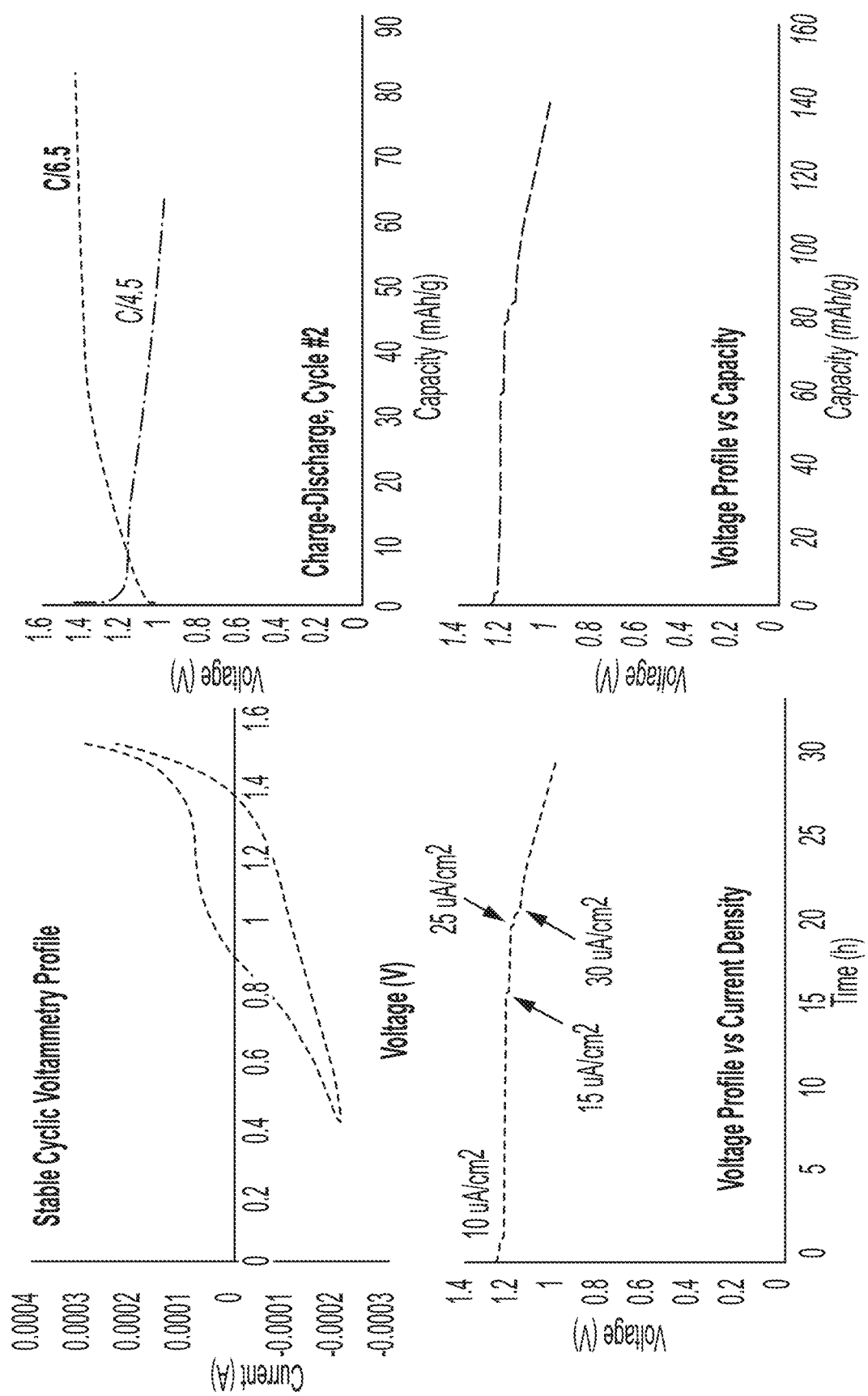
FIG. 24 shows cycling voltammetry and charge-discharge voltage profiles of aluminum anode spray coated with zirconium oxide, according to illustrative embodiments of the present disclosure.

In another test, aluminum anode was coated with zirconium oxide, using aerosol spray coating. The anode-zirconium oxide composite measured ~70 μm in thickness. The anode-zirconium oxide composite was then calendered to reduce the cross-sectional thickness to ~40 μm. Cells were assembled against manganese oxide cathodes and cycled at different current densities. The nominal voltage was measured to read 1.18 V at 20 $\mu A/cm^2$, 1.15 V at 25 $\mu A/cm^2$ and 1.16 V at 30 $\mu A/cm^2$. FIG. 24 shows an overview of electrochemical performance of aluminum anode coated with a film of zirconium oxide including a cyclic voltammetry profile (top left), charge-discharge profile (top right), voltage profile vs. current density (bottom left), and voltage profile vs. capacity (bottom right).

Example 9: Secondary Composition of Anode

In another test, aluminum anode was coated with a 50 nm film of parylene-N. The coating was achieved using a chemical vapor deposition technique to coat a 70-100 nm film of parylene-N, followed by a thermal annealing process to reduce the thickness to ~50 nm. Parylene-coated aluminum anodes were tested against manganese oxide cathodes in simple coin cell configurations.

Figure 25:
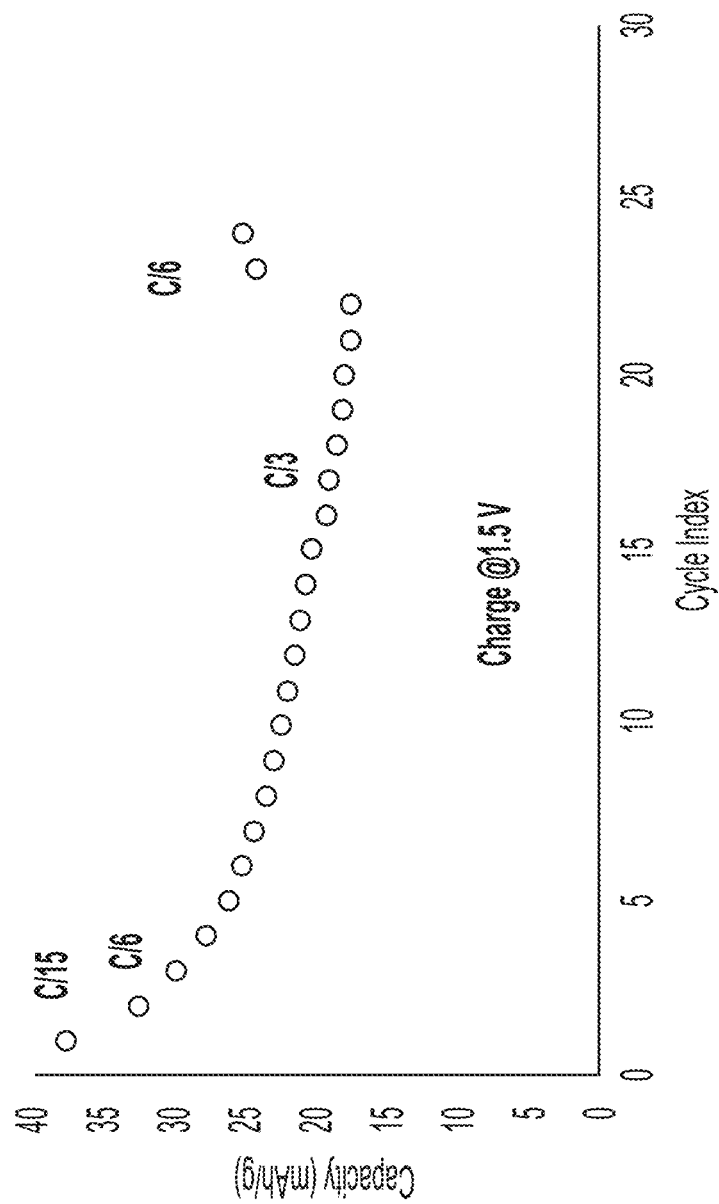
FIG. 25 shows capacity as a function of cycle index at charge-discharge rates of 15 h, 6 h and 3 h where charging was carried out at a constant voltage of 1.5 V, according to illustrative embodiments of the present disclosure.

Parylene-coated aluminum anodes delivered up to 190 mAh/g at a charge-discharge rate of C/70. At slower rates of C/3, C/6 and C/15, the capacity contribution ranged between 20 mAh/g and 40 mAh/g, as shown in FIG. 25.

Example 10: Patterned Substrate for Cathodes

Figure 26:
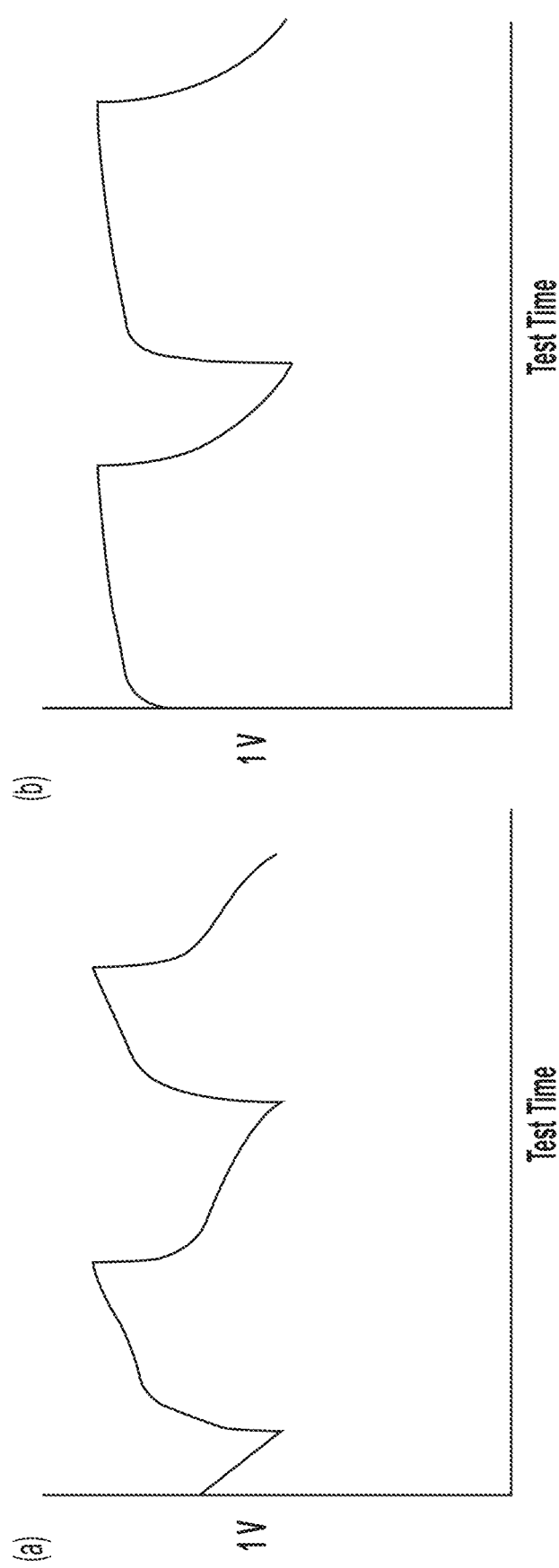
FIG. 26 shows a charge-discharge profile of a manganese oxide cathode coated on a porous conductive substrate at rates of (a) C/2.5, and (b) C/0.5, according to illustrative embodiments of the present disclosure.

In some embodiments, the cathode is coated on a high surface area, porous carbon. In one example, a manganese oxide cathode (80 wt. %) was combined with conductive carbon (10 wt. %) and CMC-SBR binders (net 10 wt. %) into an aqueous slurry and dip-coated on to a pyrolytic graphite foam. Such cathodes were then assembled against aluminum anodes separated by a glass microfiber membrane. The cells were cycled at C/2.5 and C/0.5 (charge-discharge in 2.5 hours and 30 minutes respectively) and delivered 47 mAh/g and 21.5 mAh/g respectively while still maintaining an average operating potential of ~1V, as shown in FIG. 26 panels (a), (b).

Example 11: Performance of Cathode as a Function of the Crystal Structure and Phase In order to assess influence of the structure of manganese oxide cathodes, several phases of a manganese oxide (e.g., $MnO_2$) were tested including, but not limited to, beta ($\beta$), delta ($\delta$) and gamma ($\gamma$) and combinations thereon. Typically, the cathodes with specific phase composition was mixed in an aqueous slurry comprising 10 wt. % binder (CMC-SBR) and 10 wt. % conductive carbon. The slurry was then mixed to achieve a stable, uniform dispersion and coated on a current collector substrate such as aluminum, graphite foil, copper, nickel or stainless steel. The cathodes were tested against aluminum metal foil anodes and the two electrodes were separated by glass microfiber membranes. The cells were discharged at current densities ranging between 10 $\mu A/cm^2$ and 30 $\mu A/cm^2$.

Figure 27:
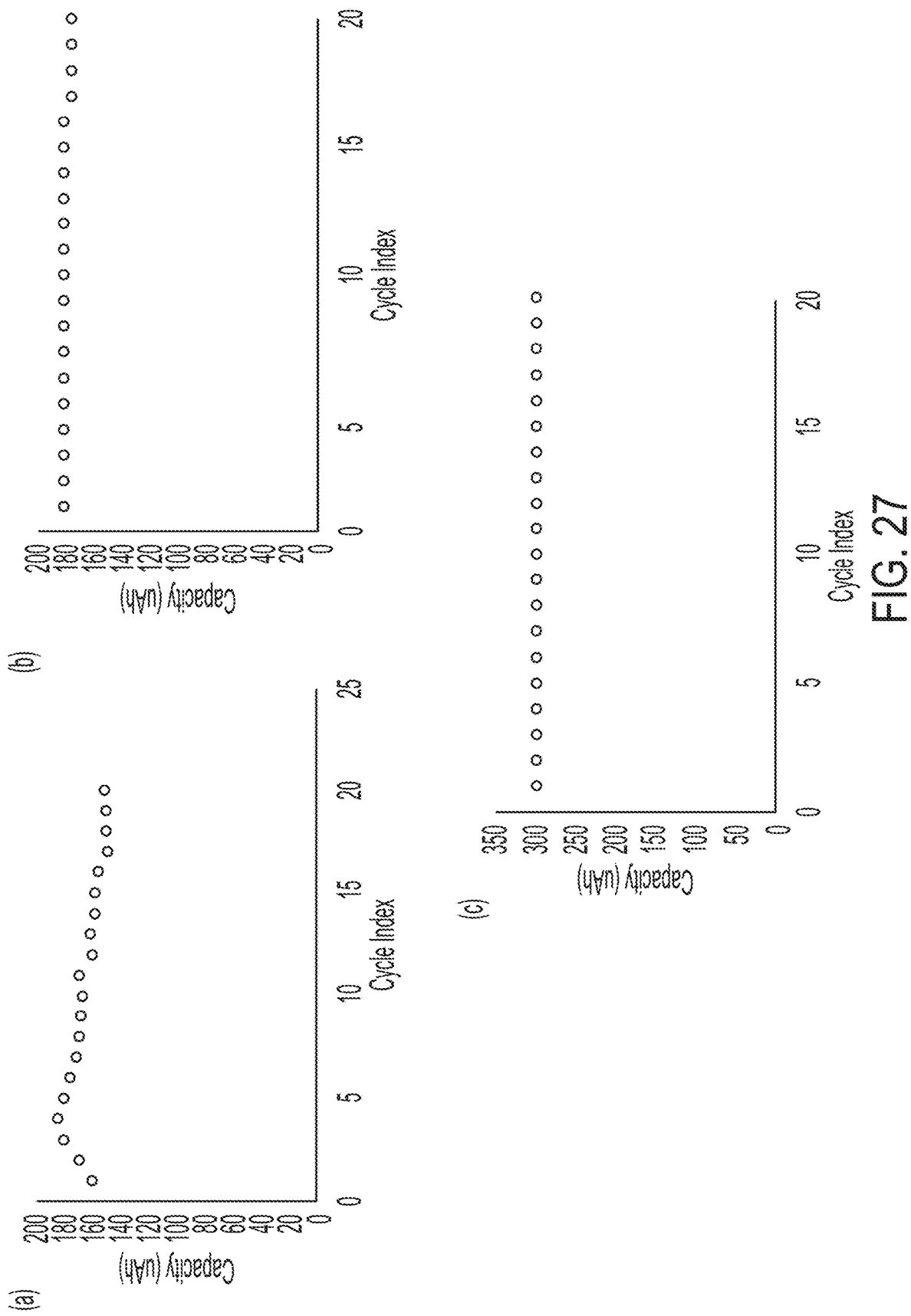
FIG. 27 shows discharge capacity as a function of cycle index for manganese oxide cathodes in (a) beta (β) and alpha (α) phase, (b) mostly (e.g., at least 70%) delta (δ) phase; and (c) mostly (e.g., at least 70%) gamma (γ) phase, according to illustrative embodiments of the present disclosure.

Manganese oxide cathodes composed of mostly (e.g., at least 70%) beta phase delivered a reversible capacity ranging between 160 and ~180 $\mu$Ah, as shown in FIG. 27 panel (a), at a charge-discharge rate of C/6. FIG. 27 panel (b) shows mostly (e.g., at least 70%) a delta ($\delta$) phase manganese oxide delivering a reversible capacity of ~180 $\mu$Ah at a charge-discharge rate of C/8. FIG. 27 panel (c) shows mostly (e.g., at least 70%) a gamma ($\gamma$) phase manganese oxide delivering a reversible capacity of ~300 $\mu$Ah at a charge-discharge rate of ~C/10.

Example Distinctions from Other Approaches

There are certain distinctive features of various embodiments of the aqueous aluminum ion batteries described herein—for example, the manganese oxide cathode. As explained herein, the structural morphology of the cathode includes for example, its porosity, wettability, shape of particles (e.g., spherical, sheet-like, etc.), particle dimensions, among others. These features contribute to overall performance of the battery. Wettability is important, for example, since a poorly wettable electrode may lead to a dielectric effect, thereby significantly altering the reaction mechanism. In certain embodiments, lithiophorite structures and/or birnessite structures are employed in the cathode.

In various embodiments, the manganese oxide structure is layered and contains one or more guest ions such as $Na^+$, $K^+$, $Al^{3+}$, and the like. However, these guest ions (or in some cases, guest molecules) are inserted into manganese oxide only to facilitate an expansion of the manganese oxide structure (e.g., resulting in inter-sheet spacing greater than 10 Å). In certain preferred embodiments, at the end of the exfoliation, a great majority of the guest ions/molecules are removed (e.g., through osmosis) such that there is no visible trace of guest ion post removal. In certain embodiments, the manganese oxide structure does not incorporate copper or bismuth ions, in any form.

In certain embodiments where some guest ions/molecules are retained in the manganese oxide structure, the guest ions/molecules do not actively participate in the electrochemical reaction. Instead, the guest ions/molecules help prop open the manganese oxide structure in order to increase aluminum ion storage capacity (e.g., where a higher inter-sheet spacing correspondingly increases charge storage capability). The absence of guest ion participation is apparent from an experimentally observed voltage window that precludes any significant reaction of sodium, potassium and other guest ions. On the other hand, the operating window clearly lies within the known range for aluminum ion participation (~1.6 V).

In certain embodiments, the diffusion coefficient of the manganese oxide structure is quite high, e.g., at least $1\times10^{-12}$ $cm^2$/sec, e.g., at least $1\times10^{-10}$ $cm^2$/sec, e.g., at least $1\times10^{-9}$ $cm^2$/sec. In certain embodiments, the diffusion coefficient of the manganese oxide structure is between $1.7\times10^{-10}$ $cm^2$/sec and $7\times10^{-9}$ $cm^2$/sec.

Figure 28:
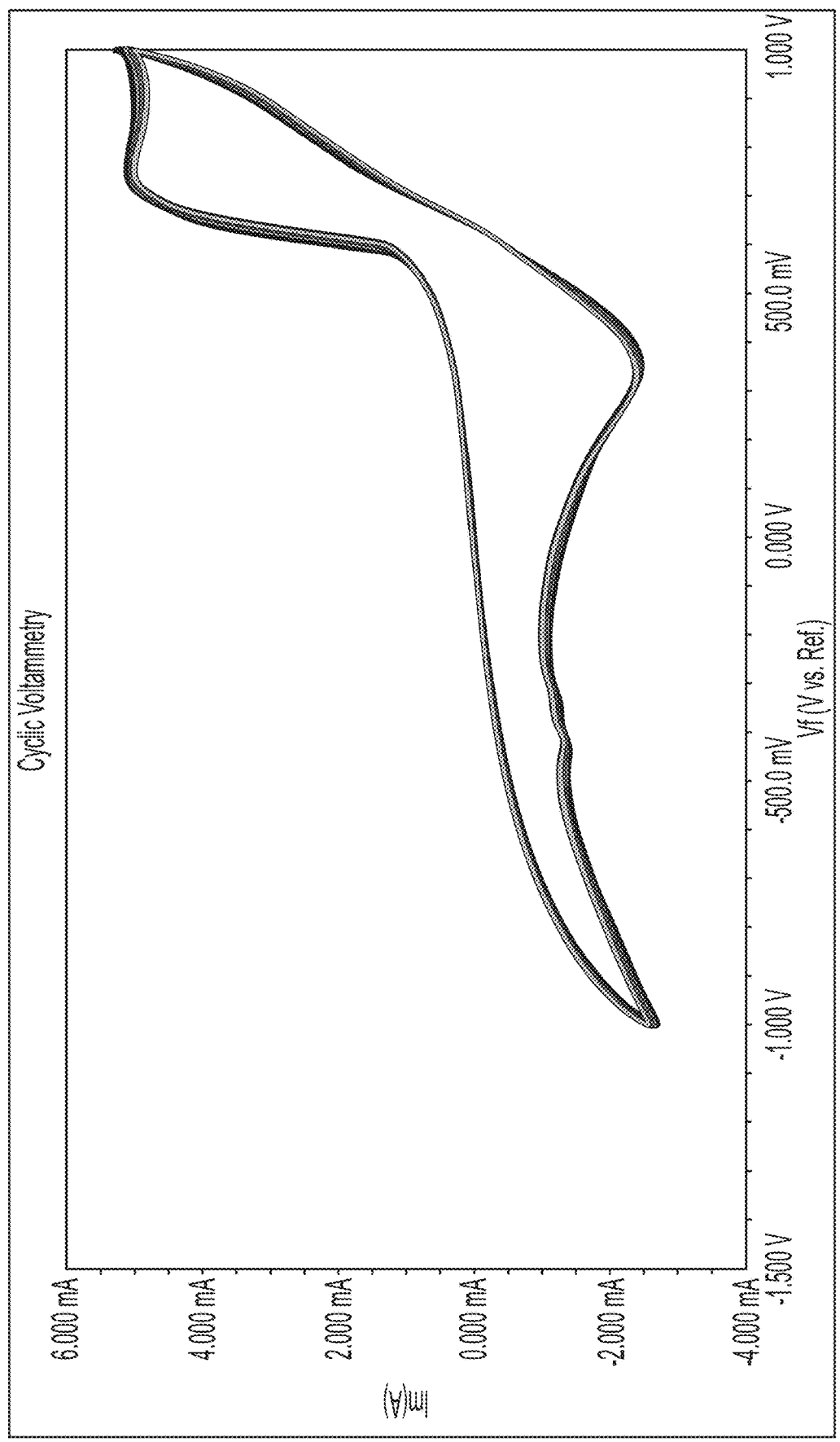
FIG. 28 shows cyclic voltammetry in a three-electrode setup of potassium-manganese oxide cathode against aluminum anode (Pt reference electrode) where only a single pair of distinct and repeatable redox peaks is observed (0.7 V vs. Pt and 0.4 V vs. Pt), according to illustrative embodiments of the present disclosure.
Figure 29B:
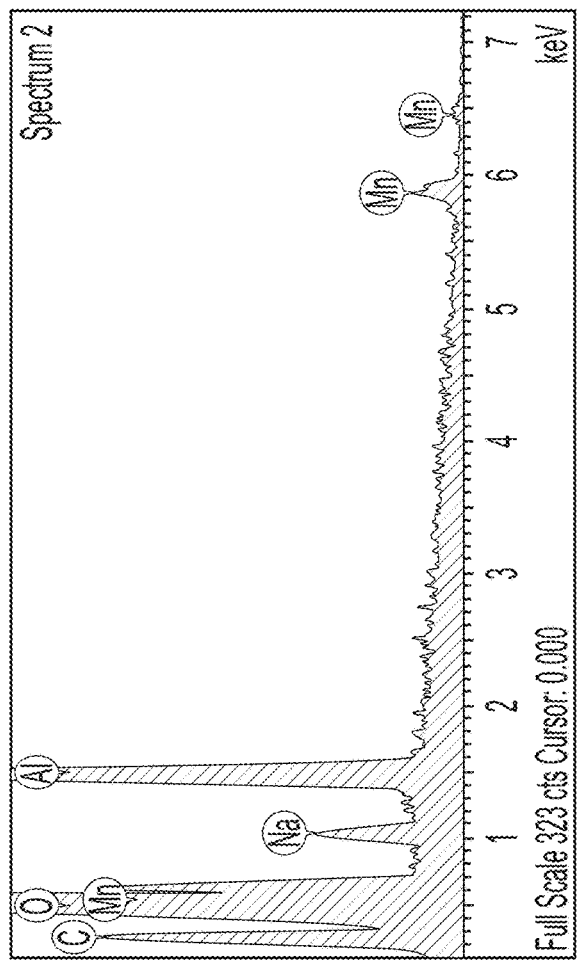
FIGS. 29A-29B shows elemental analysis confirming the presence of sodium in a sodium-manganese oxide cathode even after being filled with aluminum ions, according to illustrative embodiments of the present disclosure.
Figure 29A:
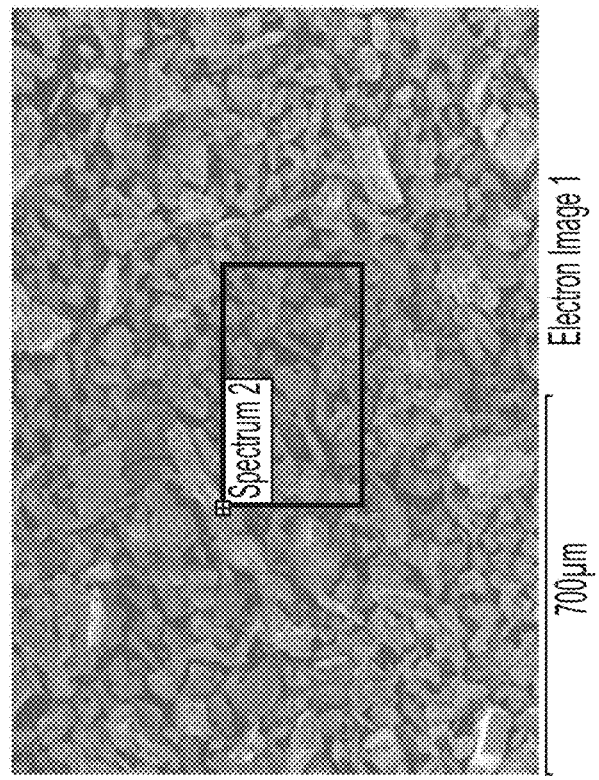

Experiments performed for manganese oxide cathodes with various guest ions unremoved from the host manganese oxide structure, including $K^+$ and $Na^+$, show only a single redox peak during cyclic voltammetry (FIG. 28). In addition, energy dispersive x-ray analysis (EDS) confirms the presence of guest elements in a fully "aluminated" (aluminum inserted in manganese oxide) state (FIGS. 29A-29B, Table 2). Pristine sodium-manganese oxide shows ~7.1 atomic % sodium elemental concentration, further agreeing with the hypothesis that in certain embodiments of the sodium-manganese oxide cathode described herein, guest ions are not removed to accommodate aluminum ions.

TABLE 2

| Element | Weight % | Atomic % |
| --- | --- | --- |
| C (K) | 4.90 | 10.87 |
| Na (K) | 1.16 | 1.35 |
| Al (K) | 8.14 | 8.05 |
| O (K) | 32.25 | 53.74 |
| Mn (K) | 53.55 | 25.99 |

Figure 30B:
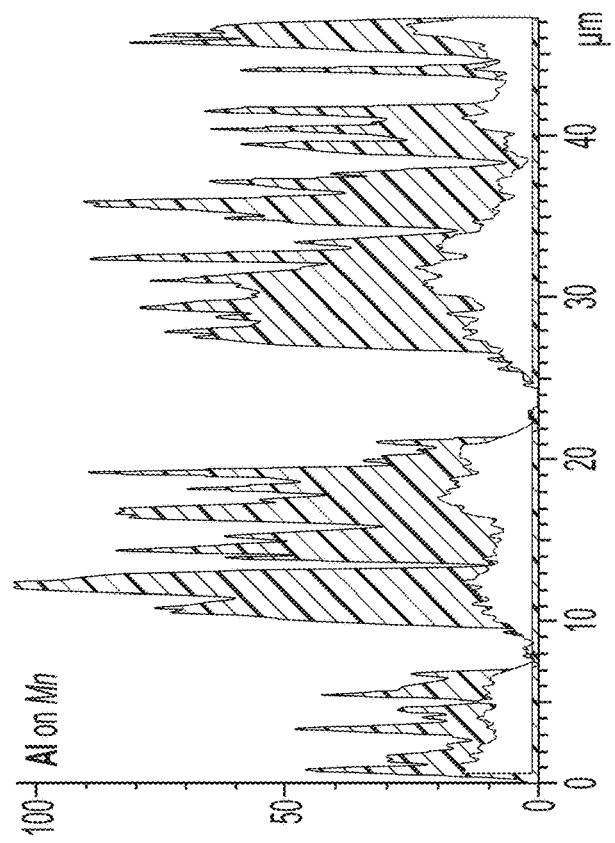
FIG. 30B shows EDS mapping showing that aluminum insertion does not rely on exchange of guest ions for a sodium-manganese oxide cathode, according to illustrative embodiments of the present disclosure.
Figure 30A:
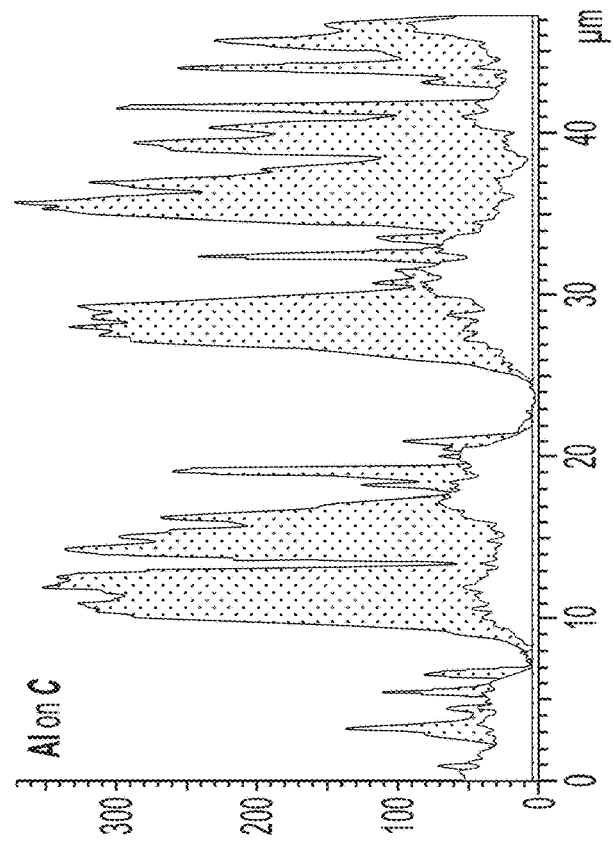
FIG. 30A shows EDS mapping showing that aluminum insertion does not rely on exchange of guest ions for a pyrolytic graphite cathode, according to illustrative embodiments of the present disclosure.

To further demonstrate that the aluminum ions in certain embodiments of the cathode described herein do not replace guest ions or molecules, tests were carried out with partially exfoliated pyrolytic graphite cathodes. As seen in FIGS. 30A-30B, aluminum ions could successfully insert and interact with carbon, although the capacities were significantly lower than the values obtained with sodium-manganese oxide and potassium-manganese oxide (the lower capacity may be attributed to the smaller inter-sheet spacings of pyrolytic graphite). If exchange of guest ions governed aluminum insertion kinetics, pyrolytic graphite cathodes would not have shown such an activity. It is also believed the choice of electrolyte, pH, anode-cathode combination (hence the operating voltage window) and the specific types of anode and cathode may contribute toward establishing a unique interaction mechanism that relies on a stable hydroxide, oxide-hydroxide (etc.) induced aluminum charge being transported between the two electrodes. It is possible that once hydroxide/oxide-hydroxide surrounded aluminum ions (such as Al(OH)$_4^{1-}$) reach the cathode, sodium or potassium guest ions interact with the oxides/hydroxides (forming, for example, NaOH, KOH, NaOOH, etc.) while the aluminum ion is neutralized and stored in the manganese oxide sheets, thereby avoiding the need to release guest ions into the electrolyte.

In various embodiments, an excess of aluminum salt in the electrolyte is avoided—for example, no greater than 375 g per 1 kg of water, e.g., no greater than 200 g per 1 kg water, no greater than 100 g per 1 kg water, no greater than 50 g per 1 kg water, or about 37.5 g per 1 kg water—such that aluminum salt from the electrolyte does not actively participate in the electrochemical reaction. Rather, aluminum ions from an aluminum anode is relied upon, and not the electrolyte salt.

In various embodiments, an aluminum anode is utilized, e.g., where aluminum is an active electrode material (e.g., source of Al$^{+3}$). In certain embodiments, the aluminum anode is anodized. In certain embodiments, there is a barrier layer on the aluminum anode, e.g., including oxide and/or passivation layers. In certain embodiments, a graphene (or carbon, in general) passivation layer is used. The barrier layer may influence performance such as aluminum ion diffusion and/or aluminum stabilization in an electrochemical environment. In certain embodiments, an aluminum anode is used in a battery with an acidic electrolyte. In certain embodiments, the anode comprises a highly polished aluminum foil, e.g., wherein the absence of surface defects and irregularities promotes uniform reaction and avoids localized charge concentration.

In certain embodiments, the electrolyte does not comprise halogen ions. In this way, the corrosive nature of halogens can be avoided, and hydroxides can be used instead of halides as charge carriers.

In certain embodiments, the cathode has a bimodal distribution of particles (e.g., manganese oxide particles). For example, the cathode may contain a first portion of particles having particle size about 20 micrometers (±20%) and a second portion of particles having particle size about 0.5 micrometers (±20%), said first and second portions making up at least 80% of the particles of the cathode (as shown, for example, in FIG. 31).

Certain embodiments of the present disclosure were described above. It is, however, expressly noted that the present disclosure is not limited to those embodiments, but rather the intention is that additions and modifications to what was expressly described in the present disclosure are also included within the scope of the disclosure. Moreover, it is to be understood that the features of the various embodiments described in the present disclosure were not mutually exclusive and can exist in various combinations and permutations, even if such combinations or permutations were not made express, without departing from the spirit and scope of the disclosure. Having described certain implementations of aqueous aluminum ion batteries, hybrid battery-capacitors, cathode compositions, anode compositions, binder compositions, and methods of their manufacture and use, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. An anode for an aluminum-ion battery, the anode comprising:
   one or more structures; and
   a plurality of oxide structures protruding from the one or more structures, wherein each of the one or more structures comprises one or more aluminum-containing members selected from the group consisting of aluminum, an aluminum alloy, and an aluminum composite, wherein the anode is from 0.001 wt. % to 100 wt. % aluminum.

2. The anode of claim 1, wherein the anode comprises a surface layer comprising one or more of aluminum, oxygen, hydrogen, nitrogen, lithium, manganese, magnesium, and carbon.

3. The anode of claim 1, wherein each of the one or more structures comprises an aluminum alloy or mixture that comprises one or more non-aluminum members selected from the group consisting of sodium, lithium, calcium, potassium, magnesium, zirconium, lead, bismuth, titanium, vanadium, tin, copper, silver, gold, platinum, mercury, scandium, sulfur, silicon, iron, silicon, nickel, manganese, chromium, cerium, germanium, gallium, thallium, hafnium, indium, rhodium, ruthenium, molybdenum, palladium, strontium, yttrium, barium, cadmium, iridium, tantalum, cobalt, tellurium, antimony, arsenic, tungsten, and selenium.

4. The anode of claim 1, comprising a film comprising the one or more structures, wherein each of the one or more structures is a particle.

5. The anode of claim 4, wherein the film further comprises a polymer binder in physical contact with the plurality of particles, wherein the polymer binder is selected from the group consisting of carboxymethyl cellulose, styrene butadiene rubber, polyvinyl alcohol, polypropylene, and polytetrafluoroethylene.

6. The anode of claim 1, wherein the film further comprises one or more conductive carbon additives.

7. The anode of claim 1, wherein the one or more structures comprises a thin film, the thin film having a thickness in a range from 1 nm to 1 mm.

8. The anode of claim 1, wherein the one or more structures comprises a foil having a polished surface.

9. The anode of claim 1, wherein the one or more structures comprises a porous structure.

10. The anode of claim 1, further comprising a non-native transitional aluminum oxide layer.

11. The anode of claim 10, wherein the non-native transitional aluminum oxide layer has thickness within at least one of the following ranges:
   (i) no less than 1 nm;
   (ii) from 1 nm to 10 nm;
   (iii) from 5 nm to 20 nm;
   (iv) from 20 nm to 50 nm;
   (v) from 50 nm to 250 nm;
   (vi) from 100 nm to 500 nm;
   (vii) from 500 nm to 1 micrometer; and
   (viii) from 1 micrometer to 10 micrometers.

12. The anode of claim 1, comprising a plurality of oxide films, wherein each of the plurality of oxide films comprises a different oxide.

13. The anode of claim 1, comprising a plurality of oxide layers of the same or different type.

14. The anode of claim 1, wherein the plurality of oxide structures are a plurality of oxide pillars.

15. The anode of claim 14, wherein the plurality of oxide pillars are porous.

16. The anode of claim 14, wherein the plurality of oxide pillars comprise one or more of fibers, nanotubes, and nanocolumns.

17. The anode of claim 14, wherein the plurality of oxide pillars are formed by physical vapor deposition, chemical vapor deposition, atomic layer deposition, hydrothermal reaction, electrochemical reaction, electrochemical deposition, or thermal reaction.

18. The anode of claim 14, wherein the plurality of oxide pillars are formed by depositing a film and etching the film, wherein the etching comprises plasma etching, wet chemical etching, reactive ion etching, or buffer oxide etching.

19. The anode of claim 1, further comprising a non-oxide film disposed on the one or more structures.

20. The anode of claim 19, wherein the non-oxide film comprises one or more non-oxide members selected from the group consisting of a sulfide of an element, a sulfate of the element, a nitride of the element, a nitrate of the element, a phosphide of the element, a phosphate of the element, and a halide of the element,
wherein the element is selected from the group consisting of zirconium, tungsten, indium, chromium, cobalt, magnesium, iron, nickel, vanadium, titanium, zinc, manganese, iron, tin, silicon, sulfur, copper, hafnium and cobalt.

21. The anode of claim 19, wherein the non-oxide film is a thin film.

22. The anode of claim 19, wherein the non-oxide film is a coating comprising a plurality of non-oxide particles.

23. The anode of claim 1, comprising a polymer layer disposed on the one or more structures.

24. The anode of claim 23, wherein the polymer layer comprises one or more members selected from the group consisting of: parylene, polyvinyl alcohol, alginic acid, PTFE, polyethylene oxide, cellulose (and its derivatives), polysulfone (PES), a polymer of one or more acrylates, alginate, quinone, hydroquinone, quinolone, hydroxyquinoline, and alizarin.

25. The anode of claim 1, further comprising an oxide film disposed on the one or more structures.

26. The anode of claim 25, wherein the oxide film is a thin film.

27. The anode of claim 25, wherein the oxide film is a coating comprising a plurality of oxide particles.

28. The anode of claim 27, wherein the oxide film further comprises a polymer binder selected from the group consisting of carboxymethyl cellulose, styrene butadiene, polyvinyl alcohol, polypropylene, and polytetrafluorethylene.

29. The anode of claim 27, wherein the oxide film further comprises one or more conductive carbon additives.

* * * * *